(12) United States Patent
Sheen et al.

(10) Patent No.: US 9,690,539 B2
(45) Date of Patent: Jun. 27, 2017

(54) SPEAKER CALIBRATION USER INTERFACE

(71) Applicant: Sonos, Inc., Santa Barbara, CA (US)

(72) Inventors: Timothy Sheen, Brighton, MA (US); Dayn Wilberding, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 14/826,873

(22) Filed: Aug. 14, 2015

(65) Prior Publication Data

US 2016/0011850 A1    Jan. 14, 2016

Related U.S. Application Data

(63) Continuation-in-part of application No. 14/696,014, filed on Apr. 24, 2015.

(51) Int. Cl.
*H04R 29/00* (2006.01)
*G06F 3/16* (2006.01)
(Continued)

(52) U.S. Cl.
CPC ............ *G06F 3/162* (2013.01); *G06F 3/0484* (2013.01); *G06F 3/0488* (2013.01); *G06F 3/165* (2013.01);
(Continued)

(58) Field of Classification Search
CPC ........ H04S 7/301; G06F 3/165; G06F 3/0484; G06F 3/0488
See application file for complete search history.

(56) References Cited

U.S. PATENT DOCUMENTS 4,306,113 A    12/1981 Morton
4,342,104 A    7/1982 Jack
(Continued)

FOREIGN PATENT DOCUMENTS

EP    0772374 A2    5/1997
EP    1133896 B1    8/2002
(Continued)

OTHER PUBLICATIONS

"AudioTron Quick Start Guide, Version 1.0", Voyetra Turtle Beach, Inc., Mar. 2001, 24 pages.
(Continued)

*Primary Examiner* — Regina N. Holder
(74) *Attorney, Agent, or Firm* — McDonnell Boehnen Hulbert & Berghoff LLP

(57) ABSTRACT

An example implementation may involve a control device displaying a prompt to initiate a calibration sequence that involves calibration of a playback device for a given environment in which the playback device is located. The example implementation may also involve the control device displaying (i) a prompt to prepare a playback device for calibration within a given environment, (ii) a prompt to prepare the given environment for calibration of the playback device, and/or (iii) a prompt to prepare the control device for calibration of the playback device. The example implementation may also involve a control device displaying a selectable control, that, when selected, initiates calibration of the playback device. The example implementation may further involve a control device initiating calibration of the playback device.

20 Claims, 34 Drawing Sheets

(51) Int. Cl.
  *G06F 3/0488* (2013.01)
  *G06F 3/0484* (2013.01)
  *H04S 7/00* (2006.01)

(52) U.S. Cl.
  CPC ........... *H04R 29/001* (2013.01); *H04S 7/301* (2013.01); *H04R 2227/005* (2013.01); *H04R 2227/007* (2013.01)

(56) References Cited

U.S. PATENT DOCUMENTS

| | | | |
|---|---|---|---|
| 4,504,704 A | 3/1985 | Ohyaba et al. |
| 4,592,088 A | 5/1986 | Shimada |
| 4,631,749 A | 12/1986 | Rapaich |
| 4,694,484 A | 9/1987 | Atkinson et al. |
| 4,995,778 A | 2/1991 | Brussel |
| 5,218,710 A | 6/1993 | Yamaki et al. |
| 5,255,326 A | 10/1993 | Stevenson |
| 5,323,257 A | 6/1994 | Abe et al. |
| 5,386,478 A | 1/1995 | Plunkett |
| 5,440,644 A | 8/1995 | Farinelli et al. |
| 5,553,147 A | 9/1996 | Pineau |
| 5,581,621 A | 12/1996 | Koyama et al. |
| 5,761,320 A | 6/1998 | Farinelli et al. |
| 5,910,991 A | 6/1999 | Farrar |
| 5,923,902 A | 7/1999 | Inagaki |
| 6,032,202 A | 2/2000 | Lea et al. |
| 6,111,957 A | 8/2000 | Thomasson |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,573,067 B1 | 6/2003 | Dib-Hajj et al. |
| 6,611,537 B1 | 8/2003 | Edens et al. |
| 6,631,410 B1 | 10/2003 | Kowalski et al. |
| 6,639,989 B1 | 10/2003 | Zacharov et al. |
| 6,643,744 B1 | 11/2003 | Cheng |
| 6,704,421 B1 | 3/2004 | Kitamura |
| 6,721,428 B1 | 4/2004 | Allred et al. |
| 6,757,517 B2 | 6/2004 | Chang |
| 6,766,025 B1 | 7/2004 | Levy et al. |
| 6,778,869 B2 | 8/2004 | Champion |
| 6,798,889 B1 | 9/2004 | Dicker et al. |
| 6,862,440 B2 | 3/2005 | Sampath |
| 6,916,980 B2 | 7/2005 | Ishida et al. |
| 6,931,134 B1 | 8/2005 | Waller, Jr. et al. |
| 6,985,694 B1 | 1/2006 | De Bonet et al. |
| 6,990,211 B2 | 1/2006 | Parker |
| 7,039,212 B2 | 5/2006 | Poling et al. |
| 7,058,186 B2 | 6/2006 | Tanaka |
| 7,072,477 B1 | 7/2006 | Kincaid |
| 7,103,187 B1 | 9/2006 | Neuman |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,289,637 B2 | 10/2007 | Montag et al. |
| 7,295,548 B2 | 11/2007 | Blank et al. |
| 7,312,785 B2 | 12/2007 | Tsuk et al. |
| 7,477,751 B2 | 1/2009 | Lyon et al. |
| 7,483,538 B2 | 1/2009 | McCarty et al. |
| 7,483,540 B2 | 1/2009 | Rabinowitz et al. |
| 7,489,784 B2 | 2/2009 | Yoshino |
| 7,490,044 B2 | 2/2009 | Kulkarni |
| 7,492,909 B2 | 2/2009 | Carter et al. |
| 7,519,188 B2 | 4/2009 | Berardi et al. |
| 7,529,377 B2 | 5/2009 | Nackvi et al. |
| 7,571,014 B1 | 8/2009 | Lambourne et al. |
| 7,590,772 B2 | 9/2009 | Marriott et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,664,276 B2 | 2/2010 | McKee Cooper |
| 7,676,044 B2 | 3/2010 | Sasaki et al. |
| 7,689,305 B2 | 3/2010 | Kreifeldt et al. |
| 7,742,740 B2 | 6/2010 | Goldberg et al. |
| 7,769,183 B2 | 8/2010 | Bharitkar et al. |
| 7,796,068 B2 | 9/2010 | Raz et al. |
| 7,835,689 B2 | 11/2010 | Goldberg et al. |
| 7,853,341 B2 | 12/2010 | McCarty et al. |
| 7,925,203 B2 | 4/2011 | Lane et al. |
| 7,949,140 B2 | 5/2011 | Kino |
| 7,949,707 B2 | 5/2011 | McDowall et al. |
| 7,961,893 B2 | 6/2011 | Kino |
| 7,987,294 B2 | 7/2011 | Bryce et al. |
| 8,005,228 B2 | 8/2011 | Bharitkar et al. |
| 8,014,423 B2 | 9/2011 | Thaler et al. |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,063,698 B2 | 11/2011 | Howard |
| 8,074,253 B1 | 12/2011 | Nathan |
| 8,103,009 B2 | 1/2012 | McCarty et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,139,774 B2 | 3/2012 | Berardi et al. |
| 8,144,883 B2 | 3/2012 | Pdersen |
| 8,160,276 B2 | 4/2012 | Liao et al. |
| 8,160,281 B2 | 4/2012 | Kim et al. |
| 8,170,260 B2 | 5/2012 | Reining et al. |
| 8,175,292 B2 | 5/2012 | Aylward et al. |
| 8,175,297 B1 | 5/2012 | Ho et al. |
| 8,194,874 B2 | 6/2012 | Starobin et al. |
| 8,229,125 B2 | 7/2012 | Short |
| 8,233,632 B1 | 7/2012 | MacDonald et al. |
| 8,234,395 B2 | 7/2012 | Millington |
| 8,238,547 B2 | 8/2012 | Ohki et al. |
| 8,238,578 B2 | 8/2012 | Aylward |
| 8,243,961 B1 | 8/2012 | Morrill |
| 8,265,310 B2 | 9/2012 | Berardi et al. |
| 8,270,620 B2 | 9/2012 | Christensen |
| 8,279,709 B2 | 10/2012 | Choisel et al. |
| 8,281,001 B2 | 10/2012 | Busam et al. |
| 8,290,185 B2 | 10/2012 | Kim |
| 8,291,349 B1 | 10/2012 | Park et al. |
| 8,300,845 B2 | 10/2012 | Zurek et al. |
| 8,306,235 B2 | 11/2012 | Mahowald |
| 8,325,931 B2 | 12/2012 | Howard et al. |
| 8,325,935 B2 | 12/2012 | Rutschman |
| 8,331,585 B2 | 12/2012 | Hagen et al. |
| 8,332,414 B2 | 12/2012 | Nguyen et al. |
| 8,391,501 B2 | 3/2013 | Khawand et al. |
| 8,401,202 B2 | 3/2013 | Brooking |
| 8,433,076 B2 | 4/2013 | Zurek et al. |
| 8,452,020 B2 | 5/2013 | Gregg et al. |
| 8,463,184 B2 | 6/2013 | Dua |
| 8,483,853 B1 | 7/2013 | Lambourne |
| 8,488,799 B2 | 7/2013 | Goldstein et al. |
| 8,503,669 B2 | 8/2013 | Mao |
| 8,527,876 B2 | 9/2013 | Wood et al. |
| 8,577,045 B2 | 11/2013 | Gibbs |
| 8,577,048 B2 | 11/2013 | Chaikin et al. |
| 8,600,075 B2 | 12/2013 | Lim |
| 8,620,006 B2 | 12/2013 | Berardi et al. |
| 8,731,206 B1 | 5/2014 | Park |
| 8,755,538 B2 | 6/2014 | Kwon |
| 8,819,554 B2 | 8/2014 | Basso et al. |
| 8,831,244 B2 | 9/2014 | Apfel |
| 8,855,319 B2 | 10/2014 | Liu et al. |
| 8,879,761 B2 | 11/2014 | Johnson et al. |
| 8,903,526 B2 | 12/2014 | Beckhardt et al. |
| 8,914,559 B2 | 12/2014 | Kalayjian et al. |
| 8,930,005 B2 | 1/2015 | Reimann |
| 8,934,647 B2 | 1/2015 | Joyce et al. |
| 8,934,655 B2 | 1/2015 | Breen et al. |
| 8,965,033 B2 | 2/2015 | Wiggins |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 8,995,687 B2 | 3/2015 | Marino, Jr. et al. |

(56) References Cited

U.S. PATENT DOCUMENTS

| | | |
|---|---|---|
| 8,996,370 B2 | 3/2015 | Ansell |
| 9,020,153 B2 | 4/2015 | Britt, Jr. |
| 9,084,058 B2 | 7/2015 | Reilly et al. |
| 9,100,766 B2 | 8/2015 | Soulodre |
| 9,106,192 B2 | 8/2015 | Sheen et al. |
| 9,215,545 B2 | 12/2015 | Dublin et al. |
| 9,219,460 B2 | 12/2015 | Bush |
| 9,288,597 B2 | 3/2016 | Carlsson et al. |
| 9,300,266 B2 | 3/2016 | Grokop |
| 9,319,816 B1 | 4/2016 | Narayanan |
| 9,467,779 B2 | 10/2016 | Iyengar et al. |
| 9,472,201 B1 | 10/2016 | Sleator |
| 9,489,948 B1 | 11/2016 | Chu et al. |
| 9,609,383 B1 | 3/2017 | Hirst |
| 9,615,171 B1 | 4/2017 | O'Neill et al. |
| 2001/0042107 A1 | 11/2001 | Palm |
| 2001/0043592 A1 | 11/2001 | Jimenez et al. |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2003/0002689 A1 | 1/2003 | Folio |
| 2003/0157951 A1 | 8/2003 | Hasty |
| 2003/0161479 A1 | 8/2003 | Yang et al. |
| 2003/0179891 A1 | 9/2003 | Rabinowitz et al. |
| 2004/0024478 A1 | 2/2004 | Hans et al. |
| 2004/0237750 A1 | 12/2004 | Smith et al. |
| 2005/0031143 A1 | 2/2005 | Devantier et al. |
| 2005/0063554 A1 | 3/2005 | Devantier et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0032357 A1 | 2/2006 | Roovers et al. |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0032895 A1* | 2/2007 | Nackvi ............... H04R 5/00 700/94 |
| 2007/0038999 A1 | 2/2007 | Millington et al. |
| 2007/0086597 A1 | 4/2007 | Kino |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0069378 A1 | 3/2008 | Rabinowitz et al. |
| 2008/0098027 A1 | 4/2008 | Aarts |
| 2008/0136623 A1 | 6/2008 | Calvarese |
| 2008/0144864 A1 | 6/2008 | Huon |
| 2008/0175411 A1 | 7/2008 | Greve |
| 2009/0024662 A1 | 1/2009 | Park et al. |
| 2009/0047993 A1 | 2/2009 | Vasa |
| 2009/0063274 A1 | 3/2009 | Dublin, III et al. |
| 2009/0110218 A1 | 4/2009 | Swain |
| 2009/0138507 A1 | 5/2009 | Burckart et al. |
| 2009/0196428 A1 | 8/2009 | Kim |
| 2009/0252481 A1 | 10/2009 | Ekstrand |
| 2009/0304205 A1 | 12/2009 | Hardacker et al. |
| 2010/0128902 A1 | 5/2010 | Liu et al. |
| 2010/0135501 A1 | 6/2010 | Corbett et al. |
| 2010/0142735 A1 | 6/2010 | Yoon et al. |
| 2010/0146445 A1 | 6/2010 | Kraut |
| 2010/0162117 A1 | 6/2010 | Basso et al. |
| 2010/0195846 A1 | 8/2010 | Yokoyama |
| 2010/0272270 A1 | 10/2010 | Chaikin et al. |
| 2010/0296659 A1 | 11/2010 | Tanaka |
| 2010/0323793 A1 | 12/2010 | Andall |
| 2011/0007904 A1 | 1/2011 | Tomoda et al. |
| 2011/0007905 A1 | 1/2011 | Sato et al. |
| 2011/0087842 A1 | 4/2011 | Lu et al. |
| 2011/0091055 A1 | 4/2011 | Leblanc |
| 2011/0170710 A1 | 7/2011 | Son |
| 2011/0234480 A1 | 9/2011 | Fino et al. |
| 2012/0051558 A1 | 3/2012 | Kim et al. |
| 2012/0127831 A1 | 5/2012 | Gicklhorn et al. |
| 2012/0148075 A1 | 6/2012 | Goh et al. |
| 2012/0183156 A1 | 7/2012 | Schlessinger et al. |
| 2012/0243697 A1 | 9/2012 | Frye |
| 2012/0263325 A1 | 10/2012 | Freeman et al. |
| 2012/0268145 A1 | 10/2012 | Chandra et al. |
| 2012/0283593 A1 | 11/2012 | Searchfield et al. |
| 2012/0288124 A1 | 11/2012 | Fejzo et al. |
| 2013/0010970 A1 | 1/2013 | Hegarty et al. |
| 2013/0028443 A1 | 1/2013 | Pance et al. |
| 2013/0051572 A1 | 2/2013 | Goh et al. |
| 2013/0066453 A1 | 3/2013 | Seefeldt |
| 2013/0108055 A1 | 5/2013 | Hanna et al. |
| 2013/0129122 A1 | 5/2013 | Johnson et al. |
| 2013/0202131 A1 | 8/2013 | Kemmochi et al. |
| 2013/0211843 A1 | 8/2013 | Clarkson |
| 2013/0216071 A1 | 8/2013 | Maher et al. |
| 2013/0223642 A1 | 8/2013 | Warren et al. |
| 2013/0230175 A1 | 9/2013 | Bech et al. |
| 2013/0259254 A1 | 10/2013 | Xiang et al. |
| 2013/0279706 A1 | 10/2013 | Marti |
| 2013/0305152 A1 | 11/2013 | Griffiths et al. |
| 2013/0315405 A1 | 11/2013 | Kanishima et al. |
| 2013/0329896 A1 | 12/2013 | Krishnaswamy et al. |
| 2014/0003622 A1 | 1/2014 | Ikizyan et al. |
| 2014/0003625 A1 | 1/2014 | Sheen et al. |
| 2014/0003626 A1 | 1/2014 | Holman et al. |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0037097 A1 | 2/2014 | Labosco |
| 2014/0064501 A1 | 3/2014 | Olsen et al. |
| 2014/0079242 A1 | 3/2014 | Nguyen et al. |
| 2014/0112481 A1 | 4/2014 | Li et al. |
| 2014/0126730 A1 | 5/2014 | Crawley et al. |
| 2014/0161265 A1 | 6/2014 | Chaikin et al. |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0270282 A1 | 9/2014 | Tammi et al. |
| 2014/0273859 A1 | 9/2014 | Luna et al. |
| 2014/0279889 A1 | 9/2014 | Luna |
| 2014/0285313 A1 | 9/2014 | Luna et al. |
| 2014/0286496 A1 | 9/2014 | Luna et al. |
| 2014/0294200 A1 | 10/2014 | Baumgarte et al. |
| 2014/0310269 A1 | 10/2014 | Zhang et al. |
| 2014/0321670 A1 | 10/2014 | Nystrom et al. |
| 2014/0323036 A1 | 10/2014 | Daley et al. |
| 2014/0341399 A1 | 11/2014 | Dusse et al. |
| 2014/0344689 A1 | 11/2014 | Scott et al. |
| 2014/0355768 A1 | 12/2014 | Sen et al. |
| 2014/0355794 A1 | 12/2014 | Morrell et al. |
| 2015/0011195 A1 | 1/2015 | Li |
| 2015/0031287 A1 | 1/2015 | Pang et al. |
| 2015/0032844 A1 | 1/2015 | Tarr et al. |
| 2015/0036847 A1 | 2/2015 | Donaldson |
| 2015/0036848 A1 | 2/2015 | Donaldson |
| 2015/0043736 A1 | 2/2015 | Olsen et al. |
| 2015/0063610 A1 | 3/2015 | Mossner |
| 2015/0078586 A1 | 3/2015 | Ang et al. |
| 2015/0078596 A1 | 3/2015 | Sprogis |
| 2015/0092959 A1 | 4/2015 | Agustin et al. |
| 2015/0100991 A1 | 4/2015 | Risberg et al. |
| 2015/0146886 A1 | 5/2015 | Baumgarte |
| 2015/0201274 A1 | 7/2015 | Ellner et al. |
| 2015/0208184 A1 | 7/2015 | Tan et al. |
| 2015/0229699 A1 | 8/2015 | Liu |
| 2015/0281866 A1 | 10/2015 | Williams et al. |
| 2015/0289064 A1 | 10/2015 | Jensen et al. |
| 2015/0382128 A1 | 12/2015 | Ridihalgh et al. |
| 2016/0007116 A1 | 1/2016 | Holman |
| 2016/0014509 A1 | 1/2016 | Hansson et al. |
| 2016/0021458 A1 | 1/2016 | Johnson et al. |
| 2016/0021473 A1* | 1/2016 | Riggi ............... H04R 3/04 381/59 |

(56) References Cited

U.S. PATENT DOCUMENTS

| | | | |
|---|---|---|---|
| 2016/0021481 | A1 | 1/2016 | Johnson et al. |
| 2016/0029142 | A1 | 1/2016 | Isaac |
| 2016/0165297 | A1 | 6/2016 | Jamal-Syed et al. |
| 2016/0330562 | A1 | 11/2016 | Crockett |
| 2017/0086003 | A1 | 3/2017 | Rabinowitz et al. |
| 2017/0105084 | A1 | 4/2017 | Holman |

FOREIGN PATENT DOCUMENTS

| | | | |
|---|---|---|---|
| EP | 1389853 | A1 | 2/2004 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2429155 | A1 | 3/2012 |
| EP | 1825713 | B1 | 10/2012 |
| EP | 2591617 | B1 | 6/2014 |
| EP | 2835989 | A2 | 2/2015 |
| EP | 2860992 | A1 | 4/2015 |
| KR | 1020060116383 | | 11/2006 |
| KR | 1020080011831 | | 2/2008 |
| WO | 0153994 | A2 | 7/2001 |
| WO | 0182650 | A2 | 11/2001 |
| WO | 03093950 | A2 | 11/2003 |
| WO | 2004066673 | A1 | 8/2004 |
| WO | 2007016465 | A2 | 2/2007 |
| WO | 2013016500 | A1 | 1/2013 |
| WO | 2015024881 | A1 | 2/2015 |
| WO | 2015178950 | A1 | 11/2015 |

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc Scatternet for affordable and highly functional wireless connectivity" Core, Version 1.0 A, Jul. 26, 1999, 1068 pages.
Bluetooth. "Specification of the Bluetooth System: Wireless connections made easy" Core, Version 1.0 B, Dec. 1, 1999, 1076 pages.
"Constellation Acoustic System: a revolutionary breakthrough in acoustical design" Meyer Sound Laboratories, Inc., 2012, 32 pages.
"Constellation Microphones," Meyer Sound Laboratories, Inc., 2013, 2 pages.
Co-pending US patent application No. US201414481505, filed on Sep. 9, 2014.
Co-pending US patent application No. US201414481522, filed on Sep. 9, 2014.
Co-pending US patent application No. US201514696014, filed on Apr. 24, 2015.
Co-pending US patent application No. US201514696366, filed on Apr. 24, 2015
Co-pending US patent application No. US201514811587, filed on Jul. 28, 2015.
Dell, Inc. "Dell Digital Audio Receiver: Reference Guide" Jun. 2000, 70 pages.
Dell, Inc. "Start Here" Jun. 2000, 2 pages.
Final Office Action mailed on Dec. 18, 2014, issued in connection with U.S. Appl. No. 13/340,126, filed Dec. 29, 2011, 12 pages.
First Action Interview Pilot Program Pre-Interview Communication mailed on Oct. 7, 2015, issued in connection with U.S. Appl. No. 14/216,306, filed on Mar. 17, 2014, 5 pages.
International Bureau, International Preliminary Report on Patentability, mailed Sep. 24, 2015, issued in connection with International Application No. PCT/US2014/030560, filed on Mar. 17, 2014, 7 pages.
International Searching Authority, International Search Report and Written Opinion mailed on Jun. 5, 2015, issued in connection with International Application No. PCT/US2015/021000, filed on Mar. 17, 2015, 12 pages.
International Searching Authority, International Search Report and Written Opinion mailed on Jun. 16, 2015, issued in connection with International Application No. PCT/US2015/020993, filed on Mar. 17, 2015, 11 pages.
Jo, J. et al., "Synchronized One-to-many Media Streaming with Adaptive Playout Control," Proceedings of SPIE, 2002, pp. 71-82, vol. 4861.
Jones, Stephen. "Dell Digital Audio Receiver: Digital upgrade for your analog stereo" Analog Stereo. Jun. 24, 2000 retrieved Jun. 18, 2014, 2 pages.
Louderback, Jim. "Affordable Audio Receiver Furnishes Homes With MP3" TechTV Vault. Jun. 28, 2000 retrieved Jul. 10, 2014, 2 pages.
Non-Final Office Action mailed on Jun. 2, 2014, issued in connection with U.S. Appl. No. 13/340,126, filed Dec. 29, 2011, 14 pages.
Non-Final Office Action mailed on Oct. 14, 2015, issued in connection with U.S. Appl. No. 14/216,325, filed Mar. 17, 2014, 7 pages.
Notice of Allowance mailed on Mar. 11, 2015, issued in connection with U.S. Appl. No. 13/340,126, filed Dec. 29, 2011, 7 pages.
Notice of Allowance mailed on Oct. 29, 2015, issued in connection with U.S. Appl. No. 14/216,306, filed Mar. 17, 2014, 9 pages.
Palm, Inc. "Handbook for the Palm VII Handheld" May 2000, 311 pages.
Presentations at WinHEC 2000 May 2000, 138 pages.
Ross, Alex. "Wizards of Sound: Retouching acoustics, from the restaurant to the concert hall" The New Yorker, Feb. 23, 2015. Web. Feb. 26, 2015.
UPnP; "Universal Plug and Play Device Architecture"; Jun. 8, 2000; version 1.0; Microsoft Corporation; pp. 1-54.
Burger, Dennis, "Automated Room Correction Explained" hometheaterreview.com, Nov. 18, 2013, Retrieved Oct. 10, 2014, 3 pages.
Daddy, B., "Calibrating Your Audio with a Sound Pressure Level (SPL) Meter," Blue-ray.com, Feb. 22, 2008 Retrieved Oct. 10, 2014, 15 pages.
International Searching Authority, International Search Report and Written Opinion mailed on Nov. 18, 2015, issued in connection with International Application No. PCT/US2015/048954, filed on Sep. 8, 2015, 11 pages.
Microsoft; Corporation., "Using Microsoft Outlook 2003", Cambridge College, 2003.
Motorola., "Simpleti, Wireless Digital Audio Receiver, Installation and User Guide", Dec. 31, 2001, 111 pages.
Mulcahy, John, "Room EQ Wizard: Room Acoustics Software" REW 2014 Retrieved Oct. 10, 2014, 4 pages.
Non-Final Action mailed on Jan. 29, 2016, issued in connection with U.S. Appl. No. 14/481,511, filed Sep. 9, 2014, 10 pages.
Non-Final Office Action mailed on Nov. 21, 2014, issued in connection with U.S. Appl. No. 13/536,493, filed Jun. 28, 2012, 20 pages.
Notice of Allowance mailed on Apr. 10, 2015, issued in connection with U.S. Appl. No. 13/536,493, filed Jun. 28, 2012, 8 pages.
PRISMIQ; Inc., "PRISMIQ Media Player User Guide", 2003, 44 pages.
First Action Interview Pilot Program Pre-Interview Communication mailed on Feb. 16, 2016, issued in connection with U.S. Appl. No. 14/681,465, filed Apr. 8, 2015, 5 pages.
Notice of Allowance mailed on Feb. 26, 2016, issued in connection with U.S. Appl. No. 14/921,762, filed Oct. 23, 2015, 7 pages.
Notice of Allowance mailed on Apr. 12, 2016, issued in connection with U.S. Appl. No. 14/681,465, filed Apr. 8, 2015, 13 pages.
Non-Final Office Action mailed on Jun. 21, 2016, issued in connection with U.S. Appl. No. 14/678,248, filed Apr. 3, 2015, 10 pages.
Notice of Allowance mailed on Jun. 3, 2016, issued in connection with U.S. Appl. No. 14/921,799, filed Oct. 23, 2015, 8 pages.
Notice of Allowance mailed on Jun. 23, 2016, issued in connection with U.S. Appl. No. 14/921,781, filed Oct. 23, 2015, 8 pages.
Non-Final Office Action mailed on Dec. 7, 2015, issued in connection with U.S. Appl. No. 14/921,762, filed Oct. 23, 2015, 5 pages.
Notice of Allowance mailed on Dec. 7, 2015, issued in connection with U.S. Appl. No. 14/216,325, filed Mar. 17, 2014, 7 pages.

(56) References Cited

OTHER PUBLICATIONS

Non-Final Office Action mailed on Sep. 12, 2016, issued in connection with U.S. Appl. No. 14/811,587, filed Jul. 28, 2015, 24 pages.
Notice of Allowance mailed on Sep. 12, 2016, issued in connection with U.S. Appl. No. 15/066,072, filed Mar. 10, 2016, 7 pages.
Notice of Allowance mailed on Jul. 26, 2016, issued in connection with U.S. Appl. No. 14/481,511, filed Sep. 9, 2014, 12 pages.
Non-Final Office Action mailed on Jul. 6, 2016, issued in connection with U.S. Appl. No. 15/070,160, filed Mar. 15, 2016, 6 pages
Non-Final Office Action mailed on Jul. 7, 2016, issued in connection with U.S. Appl. No. 15/066,049, filed Mar. 10, 2016, 6 pages.
Non-Final Office Action mailed on Jul. 8, 2016, issued in connection with U.S. Appl. No. 15/066,072, filed Mar. 10, 2016, 6 pages.
Non-Final Office Action mailed on Jul. 20, 2016, issued in connection with U.S. Appl. No. 14/682,182, filed Apr. 9, 2015, 13 pages.
Non-Final Office Action mailed on Jul. 27, 2016, issued in connection with U.S. Appl. No. 14/696,014, filed Apr. 24, 2015, 11 pages.
Non-Final Office Action mailed on Jul. 28, 2016, issued in connection with U.S. Appl. No. 14/884,001, filed Oct. 15, 2015, 8 pages.
International Searching Authority, International Search Report and Written Opinion mailed on Jul. 4, 2016, issued in connection with International Application No. PCT/US2016/028994, filed on Apr. 22, 2016, 12 pages.
International Searching Authority, International Search Report and Written Opinion mailed on Jul. 5, 2016, issued in connection with International Application No. PCT/US2016/028997, filed on Apr. 22, 2016, 13 pages.
"auEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016],6 pages.
Gonzalez et al., "Simultaneous Measurement of Multichannel Acoustic Systems", J. Audio Eng. Soc.,, 2004, 52(1/2), 26-42.
International Searching Authority, International Preliminary Report on Patentability mailed on Sep. 29, 2016, issued in connection with International Application No. PCT/US2015/020993, filed on Mar. 17, 2015, 8 pages.
International Searching Authority, International Preliminary Report on Patentability mailed on Sep. 29, 2016, issued in connection with International Application No. PCT/US2015/021000, filed on Mar. 17, 2015, 9 pages.
International Searching Authority, International Search Report and Written Opinion mailed on Oct. 18, 2016, issued in connection with International Application No. PCT/US2016/043116, filed on Jul. 20, 2016, 14 pages.
International Searching Authority, International Search Report and Written Opinion mailed on Oct. 18, 2016, issued in connection with International Application No. PCT/US2016/043840, filed on Jul. 25, 2016, 14 pages.
International Searching Authority, International Search Report and Written Opinion mailed on Oct. 25, 2016, issued in connection with International Application No. PCT/US2016/043109, filed on Jul. 20, 2016, 12 pages.
Final Office Action mailed on Oct. 14, 2016, issued in connection with U.S. Appl. No. 14/682,182, filed Apr. 9, 2015, 16 pages.
Final Office Action mailed on Oct. 17, 2016, issued in connection with U.S. Appl. No. 14/678,248, filed Apr. 3, 2015, 22 pages.
Final Office Action mailed on Oct. 21, 2016, issued in connection with U.S. Appl. No. 14/696,014, filed Apr. 24, 2015, 13 pages.
Non-Final Office Action mailed on Nov. 4, 2016, issued in connection with U.S. Appl. No. 14/826,856, filed Aug. 14, 2015, 10 pages.
Non-Final Office Action mailed on Oct. 6, 2016, issued in connection with U.S. Appl. No. 14/678,263, filed Apr. 3, 2015, 30 pages.
Non-Final Office Action mailed on Oct. 25, 2016, issued in connection with U.S. Appl. No. 14/864,506, filed Sep. 24, 2015, 9 pages.
Notice of Allowance mailed on Nov. 2, 2016, issued in connection with U.S. Appl. No. 14/884,001, filed Oct. 15, 2015, 8 pages.

Notice of Allowance mailed on Nov. 9, 2016, issued in connection with U.S. Appl. No. 14/805,340, filed Jul. 21, 2015, 13 pages.
Notice of Allowance mailed on Sep. 16, 2016, issued in connection with U.S. Appl. No. 15/066,049, filed Mar. 10, 2016, 7 pages.
Notice of Allowance mailed on Aug. 19, 2016, issued in connection with U.S. Appl. No. 14/644,136, filed Mar. 10, 2015, 12 pages.
Notice of Allowance mailed on Sep. 23, 2016, issued in connection with U.S. Appl. No. 15/070,160, filed Mar. 15, 2016, 7 pages.
Notice of Allowance mailed on Oct. 26, 2016, issued in connection with U.S. Appl. No. 14/811,587, filed Jul. 28, 2015, 11 pages.
Preinterview First Office Action mailed on Oct. 6, 2016, issued in connection with U.S. Appl. No. 14/726,921, filed Jun. 1, 2015, 6 pages.
Supplemental Notice of Allowability mailed on Oct. 27, 2016, issued in connection with U.S. Appl. No. 14/481,511, filed Sep. 9, 2014, 6 pages.
European Patent Office, Extended European Search Report mailed on Jan. 5, 2017, issued in connection with European Patent Application No. 1576555.6, 8 pages.
European Patent Office, Office Action mailed on Dec. 15, 2016, issued in connection with European Application No. 15766998.7, 7 pages.
First Action Interview Office Action mailed on Jul. 12, 2016, issued in connection with U.S. Appl. No. 14/481,514, filed Sep. 9, 2014, 10 pages.
First Action Interview Office Action mailed on Jun. 30, 2016, issued in connection with U.S. Appl. No. 14/481,505, filed Sep. 9, 2014, 9 pages.
International Searching Authority, International Search Report and Written Opinion mailed on Nov. 23, 2015, issued in connection with International Application No. PCT/US2015/048942, filed on Sep. 8, 2015, 14 pages.
International Searching Authority, International Search Report and Written Opinion mailed on Nov. 23, 2015, issued in connection with International Application No. PCT/US2015/048944, filed on Sep. 8, 2015, 12 pages.
International Searching Authority, International Search Report and Written Opinion mailed on Nov. 23, 2016, issued in connection with International Patent Application No. PCT/US2016/052266, filed on Sep. 16, 2016, 11 pages.
"Denon 2003-2004 Product Catalog," Denon, 2003-2004, 44 pages.
Non-Final Office Action mailed on Feb. 3, 2016, issued in connection with U.S. Appl. No. 14/481,522, filed Sep. 9, 2014, 12 pages.
Non-Final Office Action mailed on Jan. 4, 2017, issued in connection with U.S. Appl. No. 15/207,682, filed Jul. 12, 2016, 6 pages.
Non-Final Office Action mailed on Dec. 9, 2016, issued in connection with U.S. Appl. No. 14/678,248, filed Apr. 3, 2015, 22 pages.
Non-Final Office Action mailed on Jul. 13, 2016, issued in connection with U.S. Appl. No. 14/940,779, filed Nov. 13, 2015, 16 pages.
Non-Final Office Action mailed on Dec. 14, 2016, issued in connection with U.S. Appl. No. 14/481,505, filed Sep. 9, 2014, 19 pages.
Non-Final Office Action mailed on Feb. 18, 2016, issued in connection with U.S. Appl. No. 14/644,136, filed Mar. 10, 2015, 10 pages.
Notice of Allowance mailed on Nov. 4, 2016, issued in connection with U.S. Appl. No. 14/481,514, filed Sep. 9, 2014, 10 pages.
Notice of Allowance mailed on Dec. 12, 2016, issued in connection with U.S. Appl. No. 14/805,140, filed Jul. 21, 2015, 24 pages.
Notice of Allowance mailed on Dec. 21, 2016, issued in connection with U.S. Appl. No. 14/682,182, filed Apr. 9, 2015, 8 pages.
Notice of Allowance mailed on Jul. 29, 2016, issued in connection with U.S. Appl. No. 14/481,522, filed Sep. 9, 2014, 11 pages.
Notice of Allowance mailed on Dec. 30, 2016, issued in connection with U.S. Appl. No. 14/696,014, filed Apr. 24, 2015, 13 pages.
Preinterview First Office Action mailed on May 17, 2016, issued in connection with U.S. Appl. No. 14/481,505, filed Sep. 9, 2014, 7 pages.
Preinterview First Office Action mailed on May 25, 2016, issued in connection with U.S. Appl. No. 14/481,514, filed Sep. 9, 2014, 7 pages.

(56) References Cited

OTHER PUBLICATIONS

U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music of media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SPEAKER CALIBRATION USER INTERFACE

CROSS REFERENCE TO RELATED APPLICATIONS

This application is related to U.S. patent application Ser. No. 13/536,493 filed Jun. 28, 2012, entitled "System and Method for Device Playback Calibration," U.S. patent application Ser. No. 14/216,306 filed Mar. 17, 2014, entitled "Audio Settings Based On Environment," and U.S. patent application Ser. No. 14/481,511 filed Sep. 9, 2014, entitled "Playback Device Calibration," which are incorporated herein in their entirety. This application is a continuation-in-part of U.S. patent application Ser. No. 14/696,014 filed Apr. 24, 2015, entitled "Speaker Calibration," which is also incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
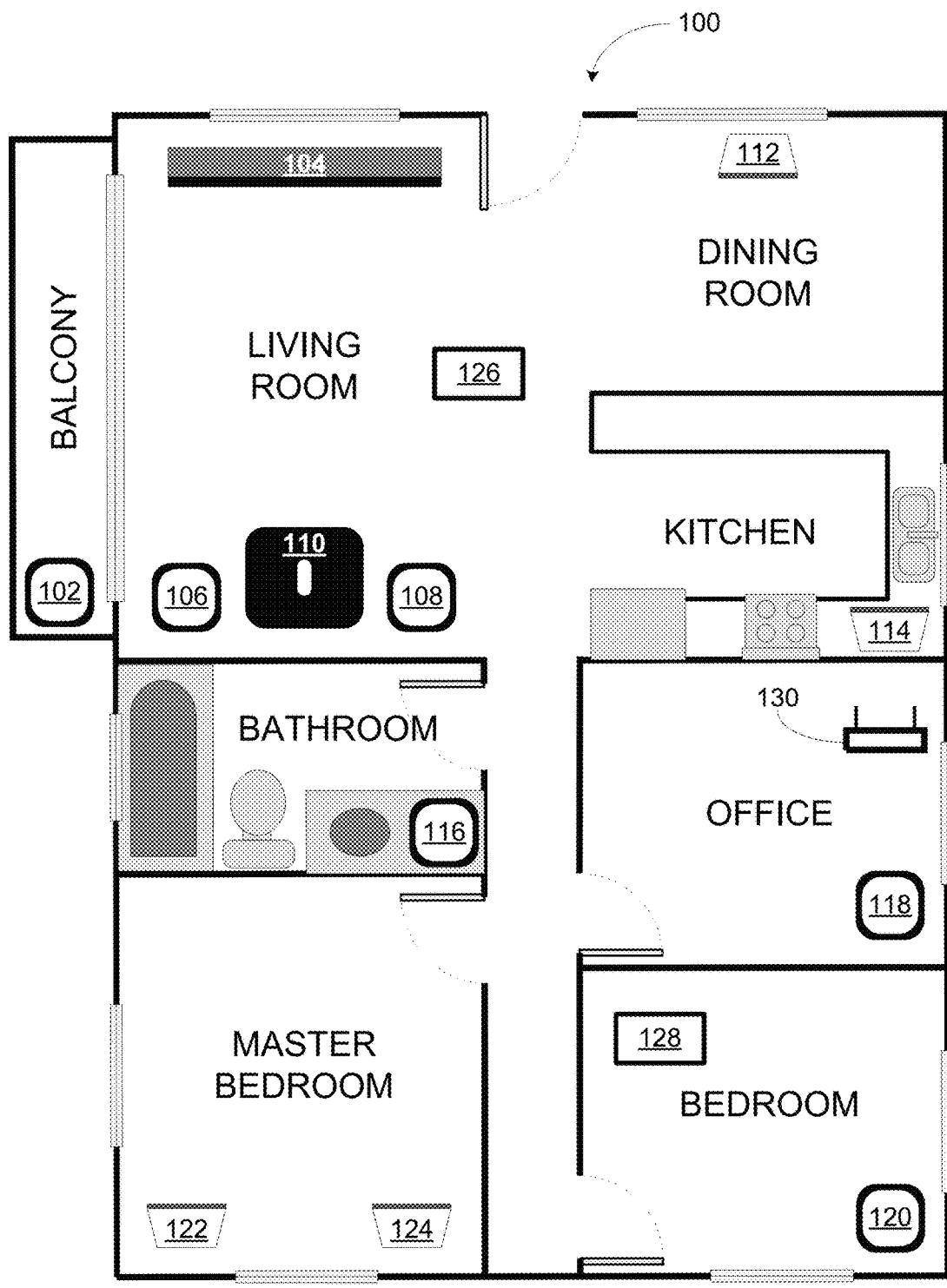
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, a control device (e.g., a smartphone or tablet computer) displaying a user interface to facilitate the calibration of a playback device within a given environment. By way of such a user interface, the control device may facilitate a calibration process. Some calibration procedures contemplated herein involve a control device detecting and analyzing sound waves (e.g., one or more calibration sounds) emitted by the playback device. In a first phase, the calibration process may involve preparing the playback device, the control device, and/or the environment for calibration of the playback device. A second phase of the calibration process may involve carrying out the calibration itself. The control device may display a prompt, or a series of prompts, that direct the user to assist in one or both phases of the calibration procedure.

A control device may display a prompt to initiate a calibration sequence. Such a prompt might include a selectable control that, when selected, starts a calibration sequence. Such a prompt might also include a selectable control that, when selected, defers the calibration sequence to a later time. The prompt may also indicate that the calibration procedure will offset acoustical characteristics of an environment such that, after calibration, playback by the playback device will be tuned to the environment. In some embodiments, the control device may display a plurality of concentric ellipsoids that are initially contorted and then become circular, which may convey that the calibration will correct for undesirable characteristics of the environment.

To prepare the playback device for calibration, a control device may provide prompts to position the playback device within the environment as the playback device will later be operated. An environment's acoustics may vary from physical location to physical location within the environment, so calibrating a playback device at a first physical location might not be helpful if the playback device will be listened to at a second physical location. In an attempt to get the playback device to be calibrated in its operating position, the control device may display a prompt to position the playback device in the physical location at which it will be operated. For instance, such a prompt may include a message asking for the playback device to be placed where it will live (i.e., operate)

To prepare the control device for calibration, the control device may provide a prompt to perform a step or steps to improve the acoustics of the microphone that will be detecting the calibration sounds emitted by the playback device. For instance, the control device may prompt to rotate the control device such that its microphone is oriented upwards, as such an orientation may improve the microphone sensitivity or other acoustic characteristics. As another example, the control device may prompt to remove any removable cases or covers that have been installed on the control devices. Cases or covers may negatively influence the microphones ability to sense sounds, as they may physically block or attenuate sound before the sound reaches the microphone. Within examples, the control device may prompt to perform other steps as well.

To prepare the environment for calibration, the control device may provide a prompt to perform one or more steps to reduce or eliminate environmental effects on the calibration. For instance, the control device may prompt to reduce ambient noise within an environment. Since the calibration involves the control device detecting calibration sounds emitted by the playback device, ambient noise may negatively influence the calibration procedure by affecting a microphone's ability to detect the calibration sounds.

The control device may detect the sound pressure level of noise in the environment, so as to determine whether the ambient noise in the environment is suitable for calibration. The control device may display an indication of the detected sound pressure level, perhaps as a meter indicating the sound pressure level of the environment and whether that level is less than an ambient noise threshold for calibration. In some examples, the meter may take the form of a plurality of concentric circles, with a portion of the concentric circles changing appearance to indicate the sound pressure level of the environment. For instance, a ratio between the total number of concentric circles and a number of highlighted circles may be proportional to the ratio between the detected sound pressure level of the environment and the ambient noise threshold for calibration, which may indicate how close the ambient noise of the environment is to the ambient noise threshold for calibration.

Within example embodiments, the first phase may include any combination of the above steps in preparing the playback device, the control device, and the environment. Moreover, these steps may be performed in any order. For instance, the control device may prompt to prepare the environment before the control device. Further, some examples might not include all of these steps. For example, some calibration procedures involve preparing the control device and the playback device but not necessarily the environment. In addition, preparing any of the described entities might not include all of the described examples of how such an entity may be prepared. By way of example, in some embodiments, a control device may prompt to rotate the control device and might not prompt to remove any cases.

After the first phase, the control device may proceed to calibration. In some embodiments, the control device might not initiate (or might not allow calibration to be initiated) until the control device has received an indication that preparation is completed. For instance, the control device may display a selectable control to initiate calibration upon detecting input data indicating that the playback device, control device, and environment have each been prepared for calibration. Then, upon detecting input data indicating a selection the displayed control, the control device may initiate calibration. For instance, the control device may transmit an instruction to the playback device that causes the playback device to begin emitting a calibration sound.

Some calibration procedures may be improved by the control device detecting the calibration sounds at multiple physical locations within the environment. As noted above, acoustics of an environment may vary from location to location within the environment. Detecting the calibration sounds at multiple physical locations within the environment may provide a better understanding of the environment as a whole. To facilitate detecting the calibration sounds at multiple physical locations, the control device may provide a prompt to perform a movement during the calibration procedure. The movement may involve the user carrying the control device around the room while the one or more playback devices under calibration emits calibration sounds. In this manner, the control device may detect the calibration sounds at multiple physical locations within the environment.

The control device may prompt such a movement by displaying a video or animation depicting an example movement around an environment. If the calibration procedure has never been performed, the control device might require that at least a portion of the video be played before the control device continues with the calibration procedure. Such a requirement may help to ensure that the control device is moved as suggested during the calibration. If a particular playback device, media playback system, control device, or user account has already viewed the video or animation, the control device may permit proceeding with calibration without necessarily viewing the required portion of the video or animation.

As noted above, some example calibration procedures may involve the control device instructing the playback device to begin emitting a calibration sound, which the control device may detect. While the playback device is emitting the calibration sound, the control device may display an indication that the control device is listening for the calibration sound. The control device may also display a progress bar indicating the duration of time remaining in the calibration interval (i.e. how long until the playback device finishes emitting the calibration sound). Such a progress bar may indicate how much longer that user should continue to move the control device, so as to capture the calibration sound at further locations within the environment. In some embodiments, a portion of the progress bar may blink or flash in synchrony with periods of the calibration sound, so as to indicate that multiple measurements are being captured by the control device. The progress bar might be circular, such that the bar forms a complete circle once the calibration interval has completed.

After detecting the calibration sound, the control device may analysis the detected sounds to determine a calibration profile that will offset at least a portion of the acoustic characteristics of the environment. This calibration profile may be applied to the playback device so as to calibrate the playback device to a desired equalization (e.g., a flat response). While the control device analyzes the detected calibration sounds, the control device may display an indication that the analysis is being performed, and perhaps also that the calibration will adapt the playback device's sound for its position within the environment. For instance, the control device may display a plurality of concentric ellipsoids that are contorted from a circular shape. Once the calibration is applied to the playback device, the control device may display the plurality of concentric ellipsoids in a circular shape, so as to indicate that the playback device has been calibrated.

In some embodiments, the control device may display an indication of the degree of calibration. For instance, the control device may indicate whether the calibration was a significant adjustment or a subtle adjustment. The degree of calibration depends upon the acoustics of the environment and the placement of playback device within that environment. For instance, a playback device that is positioned near and oriented towards a wall or other object might lead to a more significant adjustment than a playback device that is oriented into a room.

As indicated above, example techniques may involve using a control device to facilitate the calibration of a playback device within a given environment. In one aspect, a method is provided. The method may involve displaying (i) a prompt to initiate a calibration sequence that involves calibration of a playback device for a given environment, (ii) a prompt to prepare the playback device for calibration within the given environment, (iii) a prompt to prepare the given environment for calibration of the playback device, and (iv) a prompt to prepare the control device for calibration of the playback device. The method may also involve displaying a selectable control, that, when selected, initiates calibration of the playback device. The method may further involve initiating calibration of the playback device.

In another aspect, a device is provided. The device includes a network interface, at least one processor, a data storage, and program logic stored in the data storage and executable by the at least one processor to perform operations. The operations may include displaying (i) a prompt to initiate a calibration sequence that involves calibration of a playback device for a given environment, (ii) a prompt to prepare the playback device for calibration within the given environment, (iii) a prompt to prepare the given environment for calibration of the playback device, and (iv) a prompt to prepare the control device for calibration of the playback device. The operations may also include displaying a selectable control, that, when selected, initiates calibration of the playback device. The operations may further include initiating calibration of the playback device.

In yet another aspect, a non-transitory computer readable memory is provided. The non-transitory computer readable memory has stored thereon instructions executable by a computing device to cause the computing device to perform operations. The operations may include displaying (i) a prompt to initiate a calibration sequence that involves calibration of a playback device for a given environment, (ii) a prompt to prepare the playback device for calibration within the given environment, (iii) a prompt to prepare the given environment for calibration of the playback device, and (iv) a prompt to prepare the control device for calibration of the playback device. The operations may also include displaying a selectable control, that, when selected, initiates calibration of the playback device. The operations may further include initiating calibration of the playback device.

In another aspect, a method is provided. The method may involve sending, by a control device, an instruction that causes a playback device to emit a periodic calibration sound for a pre-determined calibration interval. The method may also involve detecting, via a microphone, the emitted calibration sound and displaying, on a graphical display, a progress bar that indicates a duration of time remaining in the calibration interval. The method may further involve displaying an indication that the playback device is being calibrated for its particular position within the given environment and sending an instruction that causes the playback device to play back media as adjusted by the determined calibration profile.

In yet another aspect, a device is provided. The device includes a network interface, at least one processor, a data storage, and program logic stored in the data storage and executable by the at least one processor to perform operations. The operations may include sending an instruction that causes a playback device to emit a periodic calibration sound for a pre-determined calibration interval. The operations may also include detecting, via a microphone, the emitted calibration sound and displaying, on a graphical display, a progress bar that indicates a duration of time remaining in the calibration interval. The operations may further include displaying an indication that the playback device is being calibrated for its particular position within the given environment and sending an instruction that causes the playback device to play back media as adjusted by the determined calibration profile.

In another aspect, a non-transitory computer readable memory is provided. The non-transitory computer readable memory has stored thereon instructions executable by a computing device to cause the computing device to perform operations. The operations may include sending an instruction that causes a playback device to emit a periodic calibration sound for a pre-determined calibration interval. The operations may also include detecting, via a microphone, the emitted calibration sound and displaying, on a graphical display, a progress bar that indicates a duration of time remaining in the calibration interval. The operations may further include displaying an indication that the playback device is being calibrated for its particular position within the given environment and sending an instruction that causes the playback device to play back media as adjusted by the determined calibration profile.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
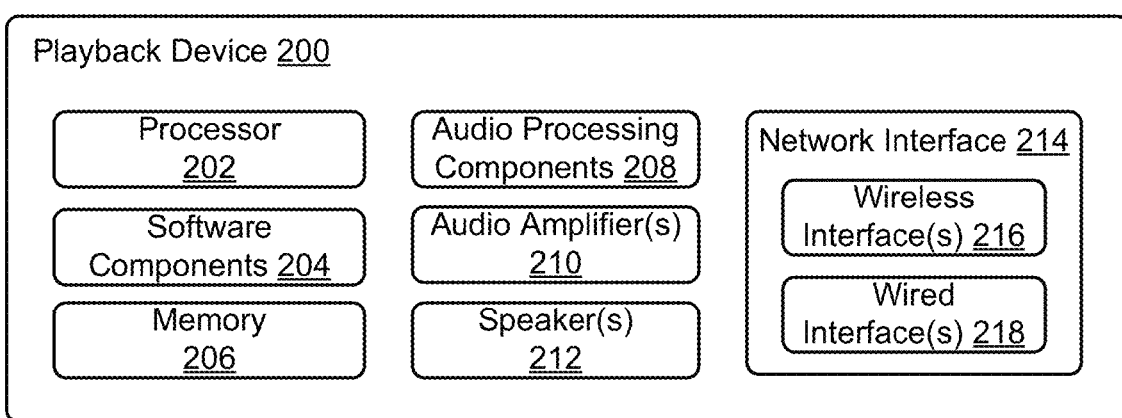
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
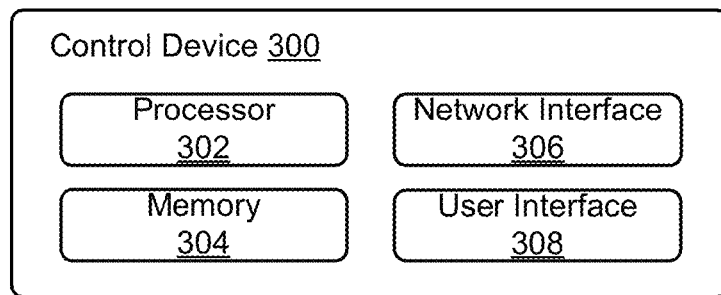
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
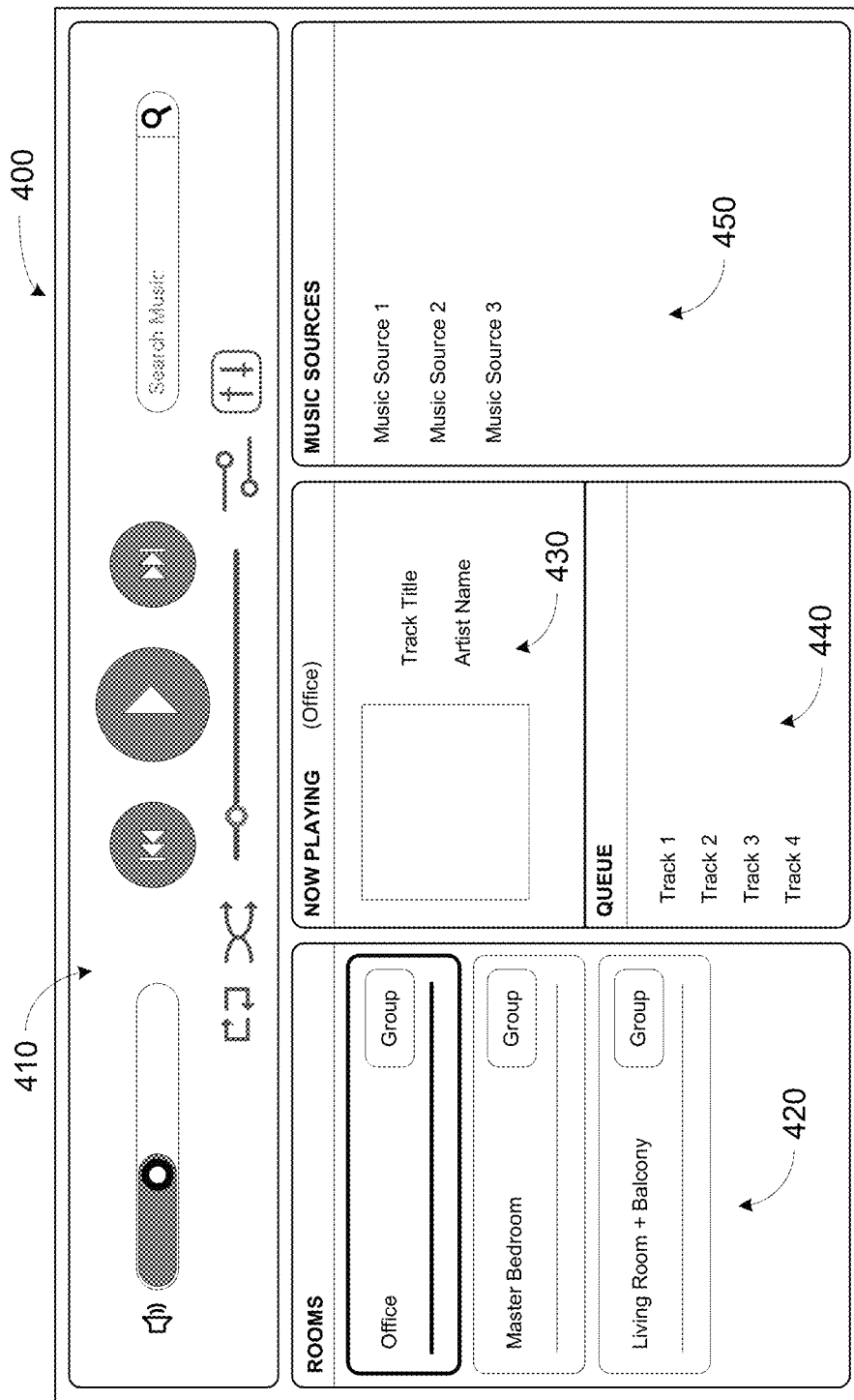
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

III. Example Techniques to Facilitate Calibration of Playback Devices

Figure 5:
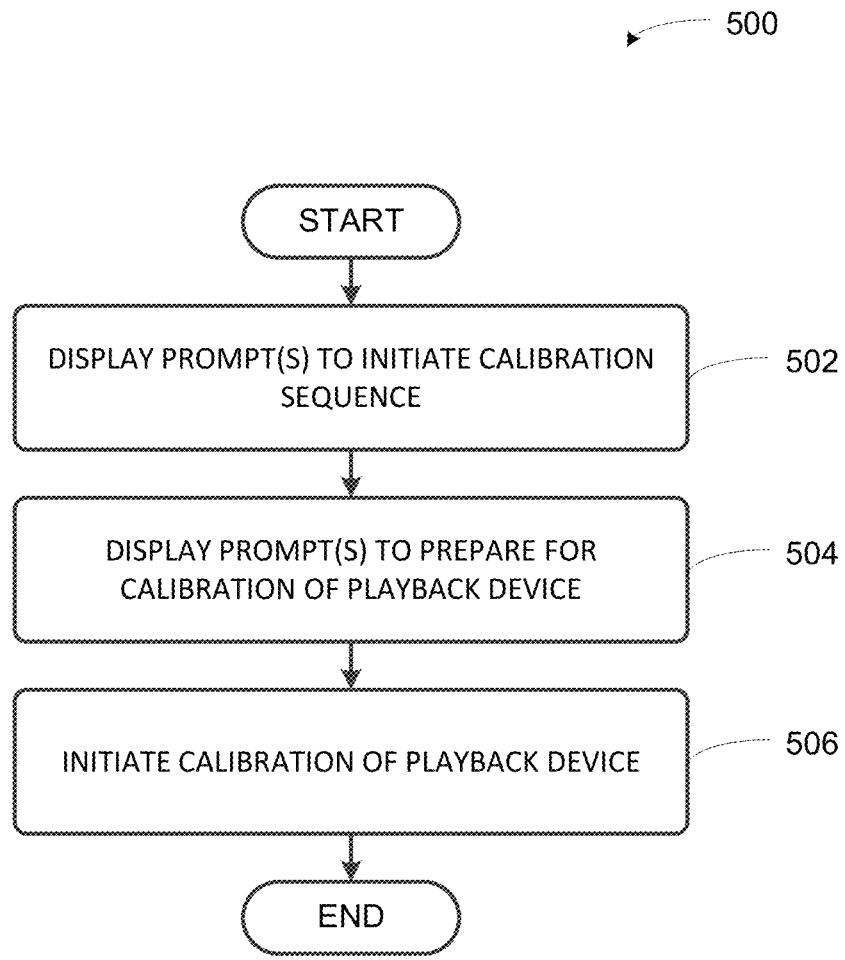
FIG. 5 shows an example flow diagram to facilitate the calibration of a playback device within a given environment using a control device.

As discussed above, techniques described herein may facilitate the calibration of one or more playback devices. FIG. 5 illustrates an example implementation 500 to use a control device to facilitate calibration of a playback device within a given environment by displaying one or more prompts to prepare the playback device, the environment, and/or the control device.

Implementation 500 shown in FIG. 5 present embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

By way of example, the following technique makes reference to a calibration procedure in which a single playback device is calibrated. However, in some cases, multiple playback devices may be calibrated during a calibration procedure. For instance, an example media playback system may include two or more playback devices that are associated with one another, such as by way of a zone, bonded pair, zone group, or other arrangement. Such arrangements of multiple speakers may function together in operation, and may likewise be calibrated together. The calibration procedure and prompts shown by a playback device to facilitate that calibration procedure may adapt to the specific configuration of the playback devices to be calibrated. For example, an example calibration procedure of two or more playback devices may involve multiple playback devices emitting respective calibration sounds, which may be detected by one or more control devices.

Further, some calibration procedures may involve calibration of multiple channels, as some playback devices may have multiple channels. For example, some example playback devices may include multiple speakers, each arranged as a separate channel. As another example, a sound bar-type playback device may include multiple channels (e.g., left, right, and center channels).

a. Display Prompt(s) to Initiate Calibration Sequence

At block 502, implementation 500 involves displaying one or more prompts to initiate a calibration sequence. As noted above, calibration of a playback device may involve adjusting one or more acoustic parameters of a playback device's speakers in an attempt to improve acoustic characteristic of those speakers within a given environment. In some embodiments, a control device, such as control device 126 of media playback system 100, may display an interface (e.g., control interface 400 of FIG. 4), that includes a prompt to initiate a calibration sequence that involves calibration of a playback device. Such a calibration sequence may calibrate the playback device for a given environment in which the playback device is located.

A control device may calibrate a playback device in various circumstances. In some cases, a control device may display such prompts during a set-up procedure for a media playback system (e.g., a procedure to configure one or more playback devices into a media playback system). In other cases, the control device may display such prompts upon detecting input data indicating a request to configure the media playback system (e.g., a request to configure a media playback system with an additional playback device).

In further embodiments, the control device may display such prompts when a playback device is moved within an environment in which it is operating. A playback device may include an accelerometer or other sensor that is sensitive to movement. The playback device may use such a sensor to detect when the playback device has been moved. In such circumstances, the playback device may transmit a message indicating that it has been moved, which may indicate to the control device that calibration should be performed.

Figure 6:
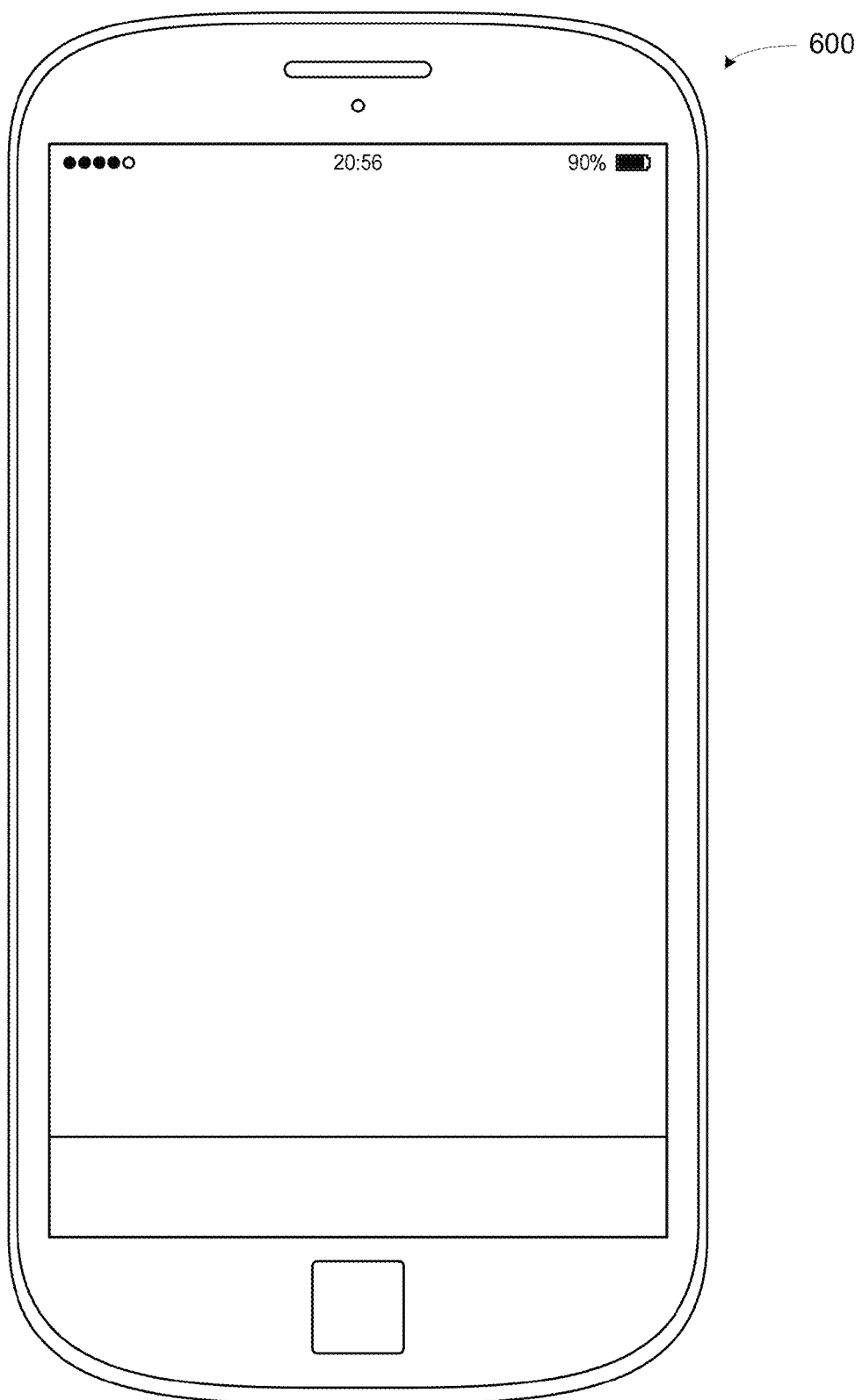
FIG. 6 shows an example control device.

FIG. 6 depicts a control device 600 (e.g., a smartphone) that includes one or more processors, a tangible computer-readable memory, a network interface, and a display. Control device 600 might be an example implementation of control device 126 or 128 of FIG. 1, or control device 300 of FIG. 3, or other control devices described herein. By way of example, reference will be made to control device 600 and certain control interfaces, prompts, and other graphical elements that control device 600 may display. Within examples, such interfaces and elements may be displayed by any suitable control device, such as a smartphone, tablet computer, laptop or desktop computer, personal media player, or a remote control device.

In some embodiments, a control device may display a prompt before initiating the calibration procedure. Such a prompt may indicate why calibration of the playback device is suggested, what the calibration procedure involves, and what the calibration procedure does. The prompt may further provide a selectable control that, when selected, initiates a calibration sequence. In some cases, the calibration sequence may include, as a first phase, a phase in which one or more of the control device, the playback device, or the environment is prepared for calibration). The prompt might also provide an option to defer the calibration procedure.

Figure 7:
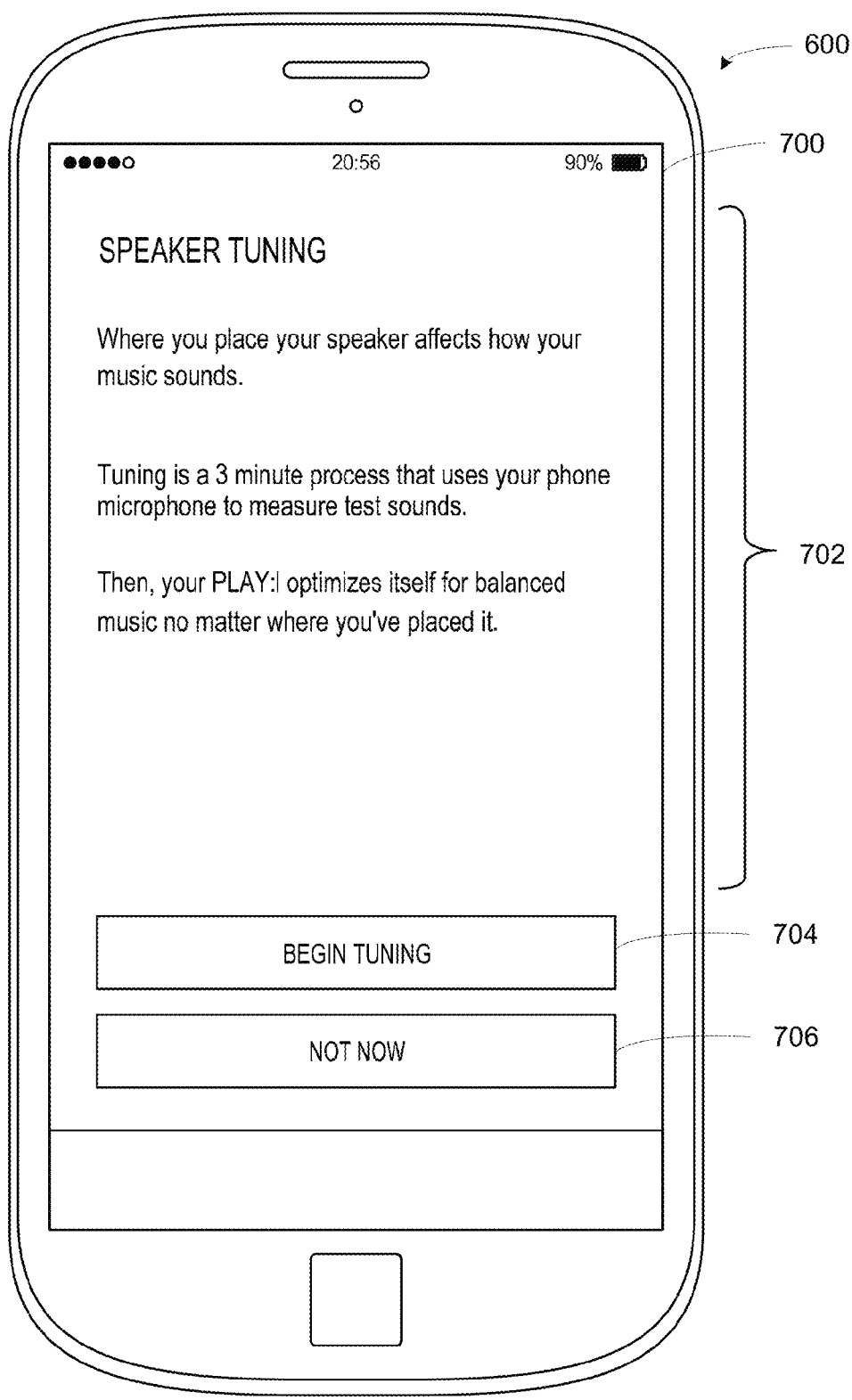
FIG. 7 shows a control device that is displaying an example control interface, according to an example implementation.

FIG. 7 depicts control device 600 which is displaying an example control interface 700. Control interface 700 includes a graphical region 702 which prompts to begin preparation for calibration of a playback device. As shown, graphical region 702 indicates why calibration of the playback device (e.g., a SONOS™ PLAY:1™ playback device) is suggested, what the calibration procedure involves, and what the calibration procedure does, among other possibilities. Control interface 700 also includes a selectable control 704, that when selected, initiates a procedure to calibrate a playback device. Such a procedure may include displaying the one or more prompts to prepare for the calibration. Control interface 700 also includes a selectable control 706 that can be used to decline to initiate the calibration procedure.

Figure 8A:
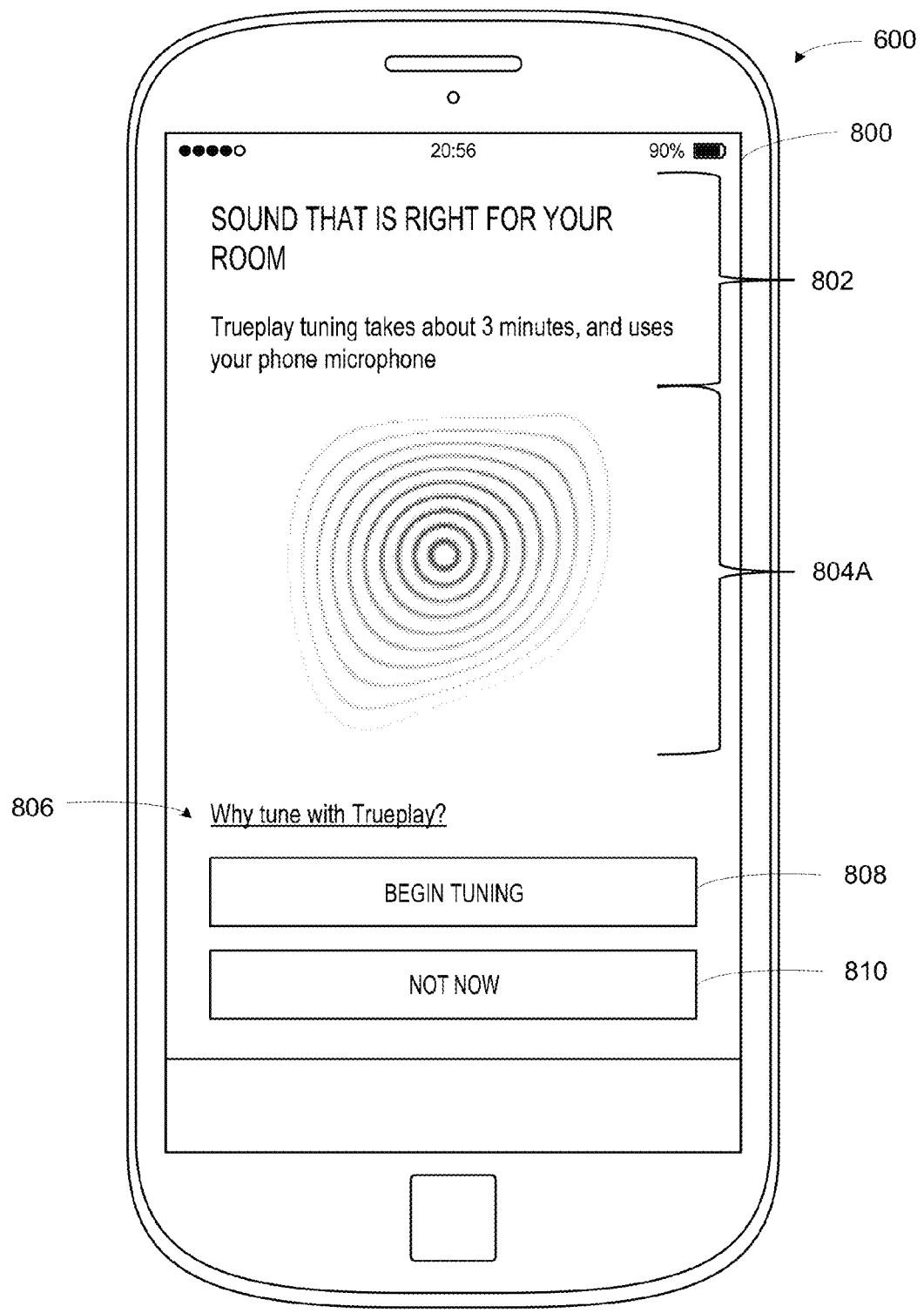
FIG. 8A shows a control device that is displaying an example control interface, according to an example implementation.

In FIG. 8A, control device 600 is displaying an example control interface 800 that prompts to initiate a calibration procedure. A control device might display control interface 800 in addition to or as an alternative to control interface 700. Control interface 800 includes a graphical region 802 which includes graphical elements indicating that the calibration procedure tunes the playback device for its environment. As shown, graphical region 802 also indicates how long the calibration procedure is expected to take and what hardware the calibration procedure uses.

Figure 8B:
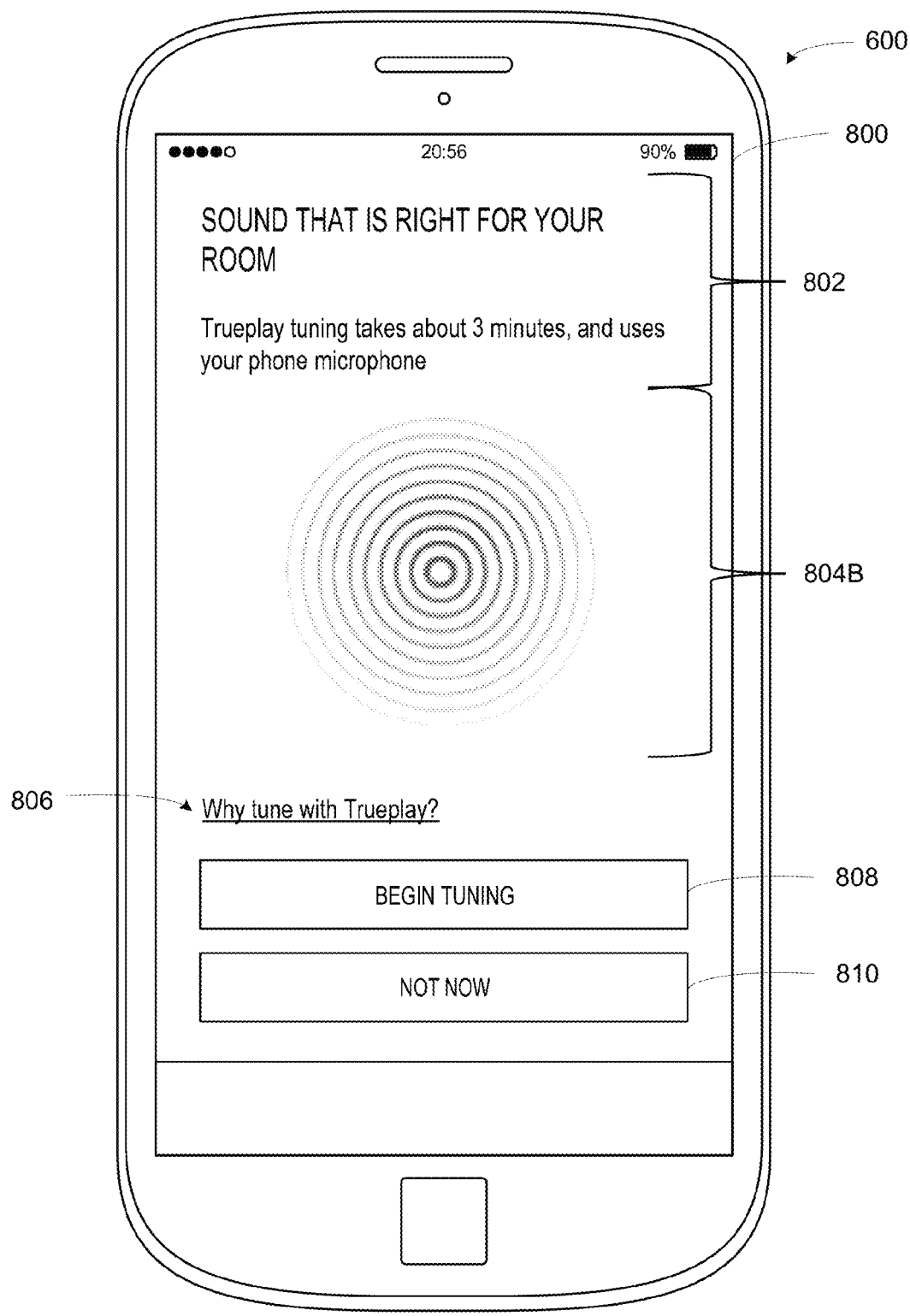
FIG. 8B shows a control device that is displaying the example control interface, according to the example implementation.

Control interface 800 may also indicate why the calibration procedure is recommended. For example, the control interface may include graphical elements indicating that a correction or adjustment may occur as part of the calibration procedure. In some embodiments, as shown in graphical region 804A, the control device may display a plurality of concentric ellipsoids that are contorted. As shown in graphical region 804B of FIG. 8B, the plurality of plurality of concentric ellipsoids may alternate to a circular (i.e., non-contorted) shape. Alternating between contorted and circular ellipsoids shapes may convey that the calibration procedure performs a correction or adjustment to the playback device.

Control interface 800 also includes a selectable control 806 that, when selected, displays more information about why performing the calibration procedure is recommended. For instance, selection of selectable control 806 may cause control device 600 to display control interface 900A of FIG. 9A.

Figure 9A:
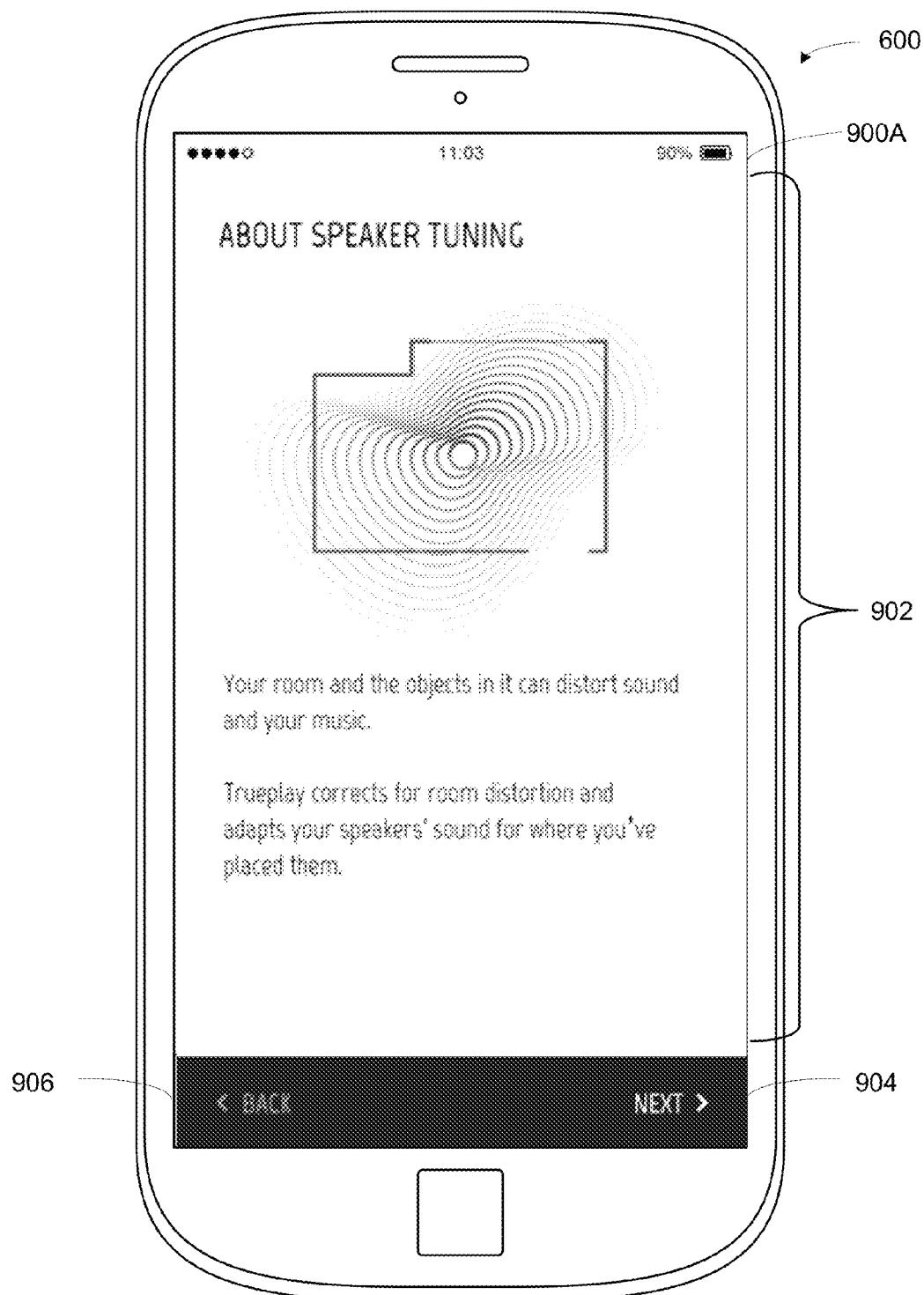
FIG. 9A shows a control device that is displaying another example control interface, according to an example implementation.

As shown in FIG. 9A, a control device, such as control device 600, may one or more graphical elements indicating that the calibration procedure calibrates the playback device for a particular position within the environment that the playback device has been placed. For instance, control interface 900A includes a graphical region 902A that indicates why calibration is suggested ("Your room and the objects in it can distort sound and your music.") and how calibration might improve user experience ("Trueplay corrects for room distortion and adapts your speakers' sound for where you've placed them.") Control interface 900A also includes selectable controls 904A and 906A. Selectable control 904A, when selected, may cause control device 600 to display graphical interface 900B of FIG. 9B. Selectable control 906, when selected, steps backward (e.g., to control interface 800).

Figure 9B:
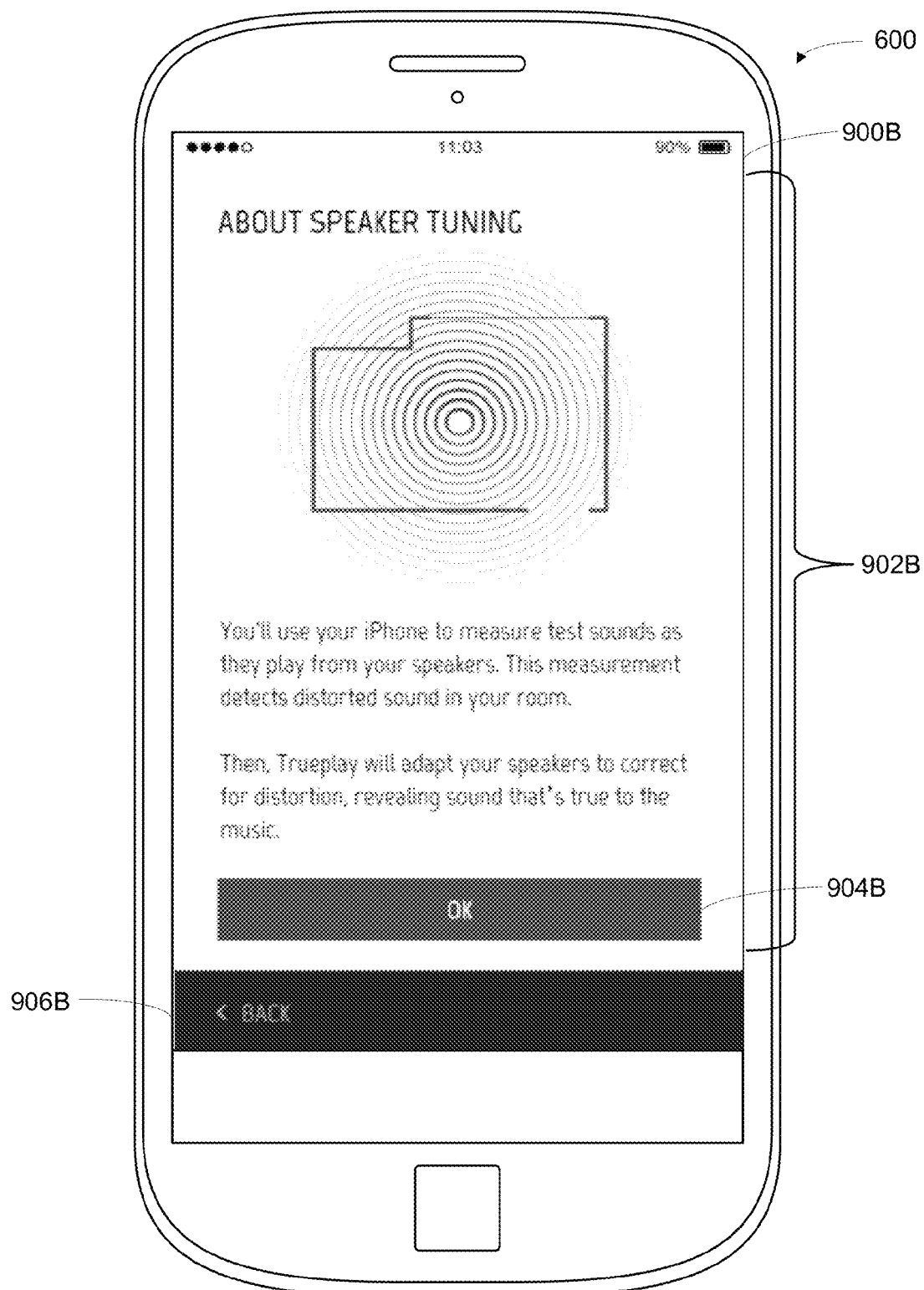
FIG. 9B shows the control device that is displaying the example control interface, according to the example implementation.

In FIG. 9B, control device 600 is displaying graphical interface 900B which includes a graphical region 902B. Graphical region 902B indicates what measurement(s) the calibration procedure involves ("You'll use your phone to measure test sounds as they play from your speakers. This measurement detects distorted sound in your room.") and how the calibration procedure will use those measurements to calibrate the playback device ("Then, Trueplay will adapt your speakers to correct for distortion, revealing sound that's true to your music."). Control interface 900B also includes selectable controls 904B and 906B. Selectable control 904B, when selected, may cause control device 600 to display graphical interface 800. Selectable control 906, when selected, steps backward (e.g., to control interface 900A).

Referring back to FIG. 8A, control interface 800 further includes selectable controls 808 and 810. Selectable control 808, when selected, may initiate a calibration procedure. In contrast, selectable control 810, when selected, may decline to initiate the calibration procedure and instead defer the calibration procedure to another time. As noted above, initiating the calibration procedure may involve proceeding to a first phase of the calibration procedure in which one or more of the environment, the control device, and the playback device are prepared for calibration.

b. Display Prompt(s) to Prepare for Calibration of a Playback Device

Referring back to FIG. 5, at block 504, implementation 500 involves displaying one or more prompts to displaying one or more prompts to prepare for calibration of a playback device. In some embodiments, a control device, such as control device 600 of FIG. 6, may display an interface, which includes one or more prompts to prepare for calibration of one or more playback devices (e.g., one or more playback devices of media playback system 100 of FIG. 1). Alternatively, the control device displays a series of prompts perhaps with each prompt directed to one or more aspects of preparing for calibration. The displayed prompts may include a prompt to prepare a playback device for calibration within a given environment, a prompt to prepare the given environment for calibration of the playback device, or a prompt to prepare the control device for calibration of the playback device, among other examples.

i. Prepare Playback Device for Calibration

In some embodiments, the displayed prompts include one or more prompts to prepare a playback device for calibration. A playback device may be prepared for calibration within a given environment by positioning the playback device within the environment at a location where the playback device is to be operated. Most operating environments (e.g., rooms of a house, office, or other building, or outdoors) are not uniform. Accordingly, acoustic characteristics of a playback device may vary from location to location within a given environment. Because of this variability, quality of calibration may be improved by calibrating the playback device in the location in which it will later be operated (i.e., listened to). To prepare the playback device for calibration, a control device may display a prompt to position the playback device to be calibrated at such a location within the given environment.

Figure 10:
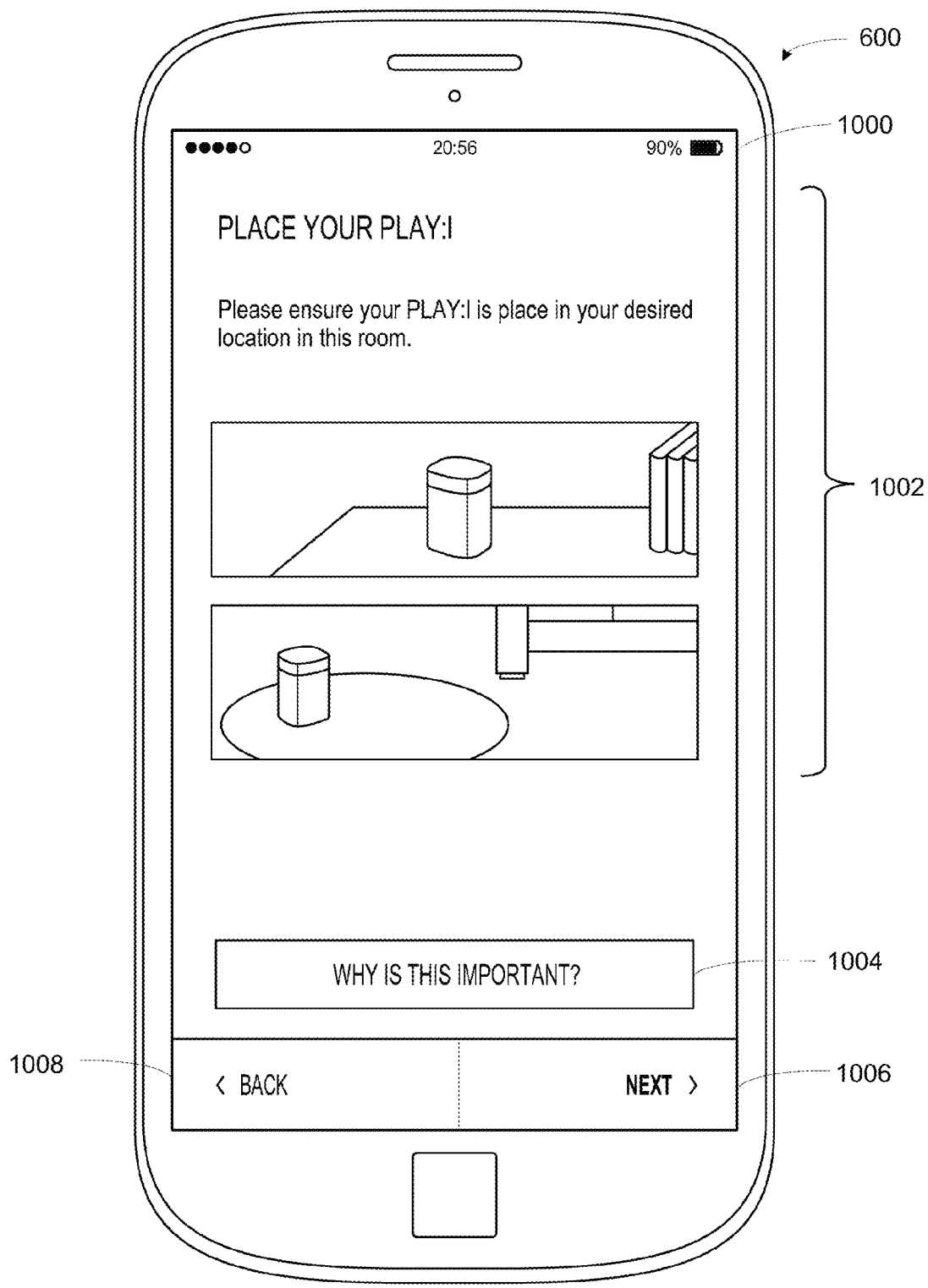
FIG. 10 shows a control device that is displaying yet another example control interface, according to an example implementation.

In FIG. 10, control device 600 is displaying example control interface 1000. Control interface 1000 includes a graphical region 1002 which prompts to position the playback device to be calibrated at a location within the environment (the room) at which the playback device will later be operated. As shown, graphical region 1002 depicts illustrative positioning of example playback devices within an environment, which may suggest how a playback device might be positioned within other environments.

Control interface 1000 also includes several selectable controls. Selectable control 1004, when selected, causes the control device to display an indication of why positioning the playback device in such a manner improves the calibration procedure (and, after calibration, possibly improves the functioning of the playback device). Selectable control 1006, when selected, advances the calibration procedure (e.g., by causing the control device to display a prompt to prepare another aspect of the media playback system or environment for calibration). Such a selection may indicate that the playback device is prepared for calibration. Selectable control 1008, when selected, steps backward in the calibration procedure (e.g., to control interface 800).

The prompt(s) to prepare a playback device for calibration may also include a prompt to orient the playback device in a direction in which the playback device is to be operated. Speakers of a playback device may exhibit directionality in that the speakers may sound differently depending on the direction in which they are oriented. For instance, by orienting a playback device such that one or more of its speakers are pointed at an obstacle in close proximity to the speakers, the obstacle may negatively affect the acoustic characteristics of the playback device. Such an orientation may also negatively impact quality of calibration. By orienting the playback device such that one or more of its speakers are pointed into the room in which it is operating (and possibly towards listeners located in the room), such negative effects may be avoided. At the same time, the nature of an environment and the objects within it (e.g., furniture) may suggest certain positioning of the playback device. Although positions and orientations that are convenient might not always be the best positions and orientations acoustically, calibration may help in improving the performance of the playback device in such location.

Accordingly, to prepare a playback device for calibration, a control device may display a prompt to orient the playback device to be calibrated in a direction in which the playback device is to be operated. In some embodiments, such a prompt may be implicit. For instance, graphical region 1002 may suggest orientation of a playback device in a particular manner by depicting an example playback device oriented in that manner. In other embodiments, the prompt may be explicit (e.g., a prompt that includes a graphical or textual instruction to orient the playback device in a particular manner).

Figure 11:
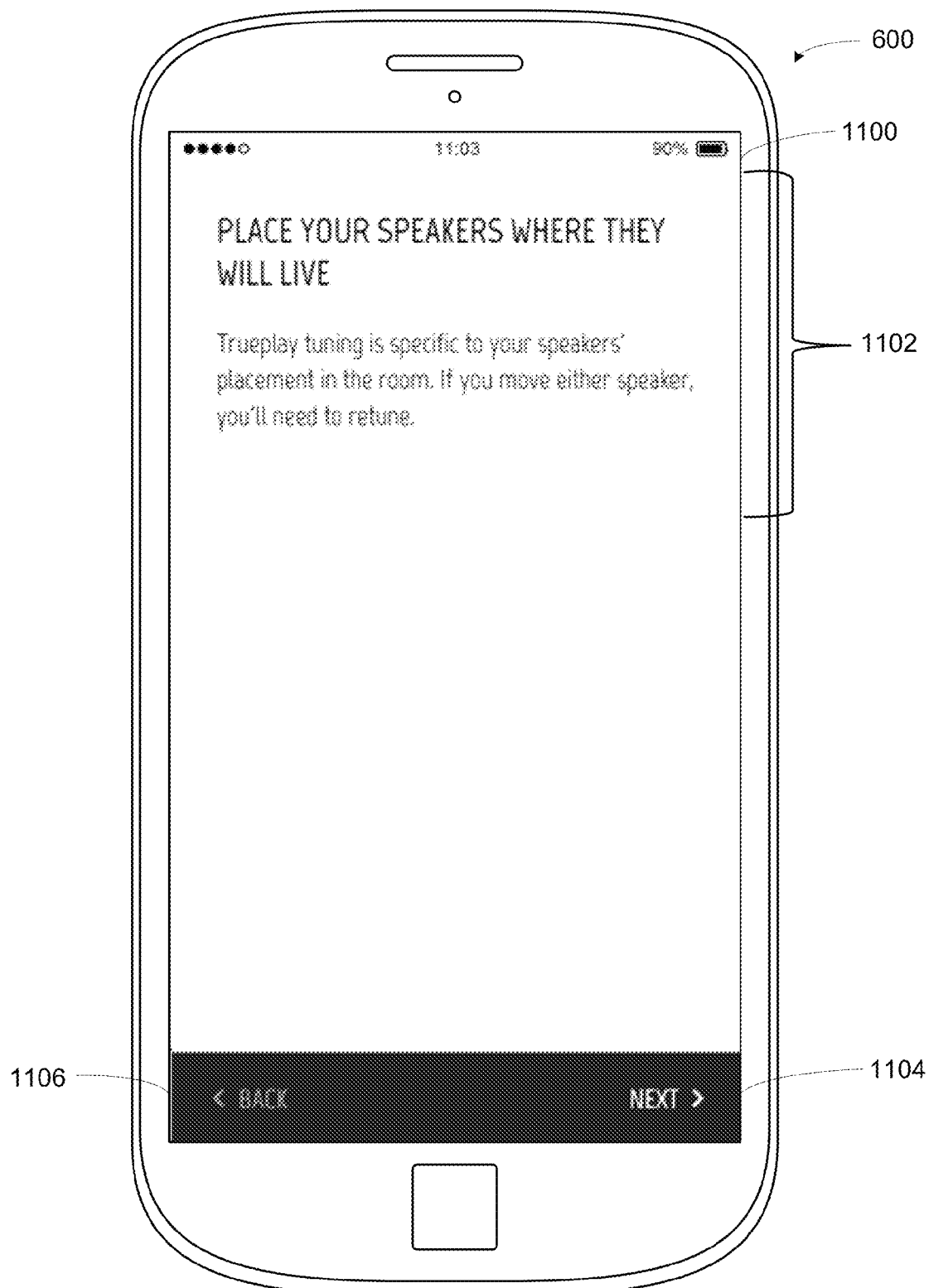
FIG. 11 shows a control device that is displaying another example control interface, according to an example implementation.

Referring now to FIG. 11, control device 600 is displaying example control interface 1100. Control interface is another example of a control interface that prompts to prepare a playback device for calibration by positioning the playback device within the environment at a location where the playback device is to be operated. Control interface 1100 includes a graphical region 1102 which prompts to position the playback device to be calibrated at a location within the environment (the room) at which the playback device will later be operated. In contrast to control interface 1000, control interface 1100 prompts to position the playback device by way of a textual prompt, rather than a combination of a textual and graphical prompt. A textual prompt might not suggest a particular position or orientation, which may suggest greater flexibility in position or orientation. Since calibration may improve performance of the playback device in unconventional positions or orientations, a prompt that does not suggest a particular position or orientation might be useful in conveying such flexibility.

Control interface 1100 also includes several selectable controls. Selectable control 1104, when selected, advances the calibration procedure (e.g., by causing the control device to display a prompt to prepare another aspect of the media playback system or environment for calibration). Like selectable control 1006, such a selection may indicate that the playback device is prepared for calibration. Selectable control 1006, when selected, steps backward in the calibration procedure (e.g., to control interface 800).

ii. Prepare Control Device for Calibration of Playback Device

In some cases, quality of calibration can be improved by preparing the control device for calibration. As noted above, some calibration procedures involve the control device using a microphone to listen for calibration sounds emitted by the playback device that is being calibrated. Preparing the control device for calibration may involve setting up the conditions under which this microphone will detect the calibration sounds emitted by the playback devices.

In some cases, a removable case or cover is installed on the control device. Such protection may be installed on control devices such as smartphones and tablets to protect the device from various hazards, such as drops or spills. However, some types of cases affect microphone reception. For instance, a removable case might fully or partially cover the microphone, which may attenuate sound before it reaches the microphone. To prepare an environment for calibration, a control device may display a prompt to remove any removable cases or covers from the control device.

Figure 12:
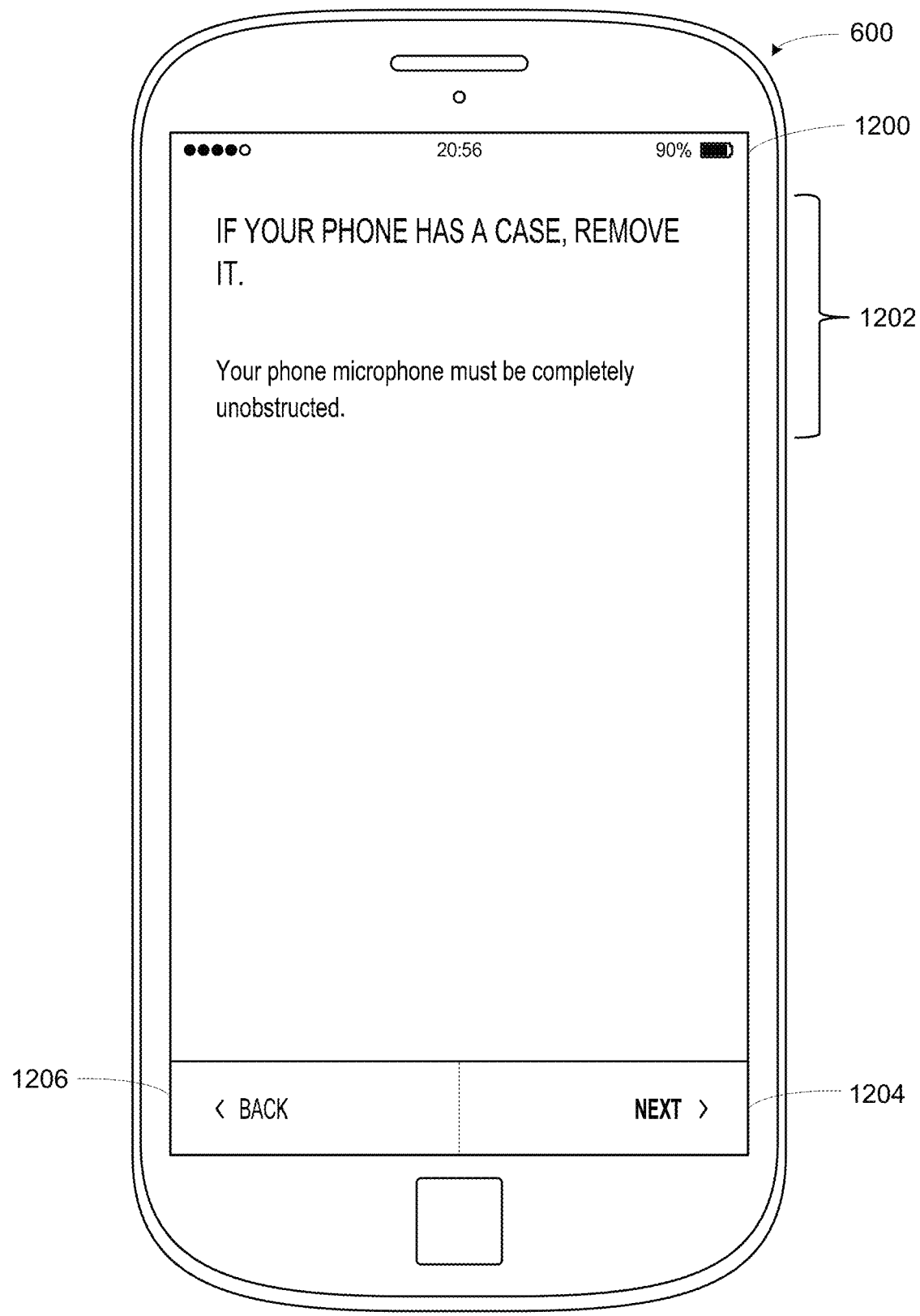
FIG. 12 shows a control device that is displaying a further example control interface, according to an example implementation.

To illustrate, in FIG. 12, control device 600 is displaying example control interface 1200. Control interface 1200 includes a graphical region 1202 which prompts to remove a case from control device 600 if a case is installed. As shown, graphical region 1202 suggests that the phone microphone should be unobstructed. Although graphical region 1202 suggests that the phone microphone must be completely unobstructed, some calibration procedures might not require such a condition. However, such a suggestion may be used to stress the importance of removing the case, which might be inconvenient.

Like several of the other example control interfaces, control interface 1200 includes several selectable controls. Selectable control 1204, when selected, advances the calibration procedure (e.g., by causing the control device to display a prompt to prepare another aspect of the media playback system or environment for calibration). Further, selectable control 1206, when selected, steps backward in the calibration procedure (e.g., to control interface 1000 or 1100).

Some operating systems may restrict programs from accessing to certain hardware, such as the microphone. Accordingly, in some cases, preparing the control device for calibration may involve removing such restrictions to grant access to the microphone such that it can be used to detect calibration sounds. The technique for granting access to the microphone may vary by operating system. Some control devices have operating systems that prompt for permission to grant access to the microphone when the microphone is accessed. Other control devices have a settings menu by which access to the access to the microphone can be granted. To facilitate access to the microphone, the control device may display instructions to grant access to the microphone of the control device. Such instructions may vary by device (e.g., by the operating system of the device). Alternative techniques to obtain access to the microphone are contemplated as well.

Some control devices, such as smartphones, have microphones that are mounted towards the bottom of the device, which may position the microphone nearer to the user's mouth during a phone call. However, when the control device is held in a hand during the calibration procedure, such a mounting position might be less than ideal for detecting the calibration sounds. For instance, in such a position, the hand might fully or partially obstruct the microphone, which may affect the microphone detecting calibration sounds emitted by the playback device. In some cases, rotating the control device such that its microphone is oriented upwards may improve the microphone's ability to detect the calibration sounds, which may improve the calibration quality.

In an attempt to position a control device in such an orientation, a control device may display a prompt to rotate the phone. In some cases, such as when a device's microphone is mounted near the bottom of the device, the control device may display a prompt to rotate the phone by 180 degrees about a horizontal axis such that the microphone is oriented upwards after the rotation. After such a rotation, the control device may be upside down relative to its intended orientation within a hand (e.g., with the microphone towards the top of the device, and perhaps with a speaker towards the bottom of the device).

Figure 13:
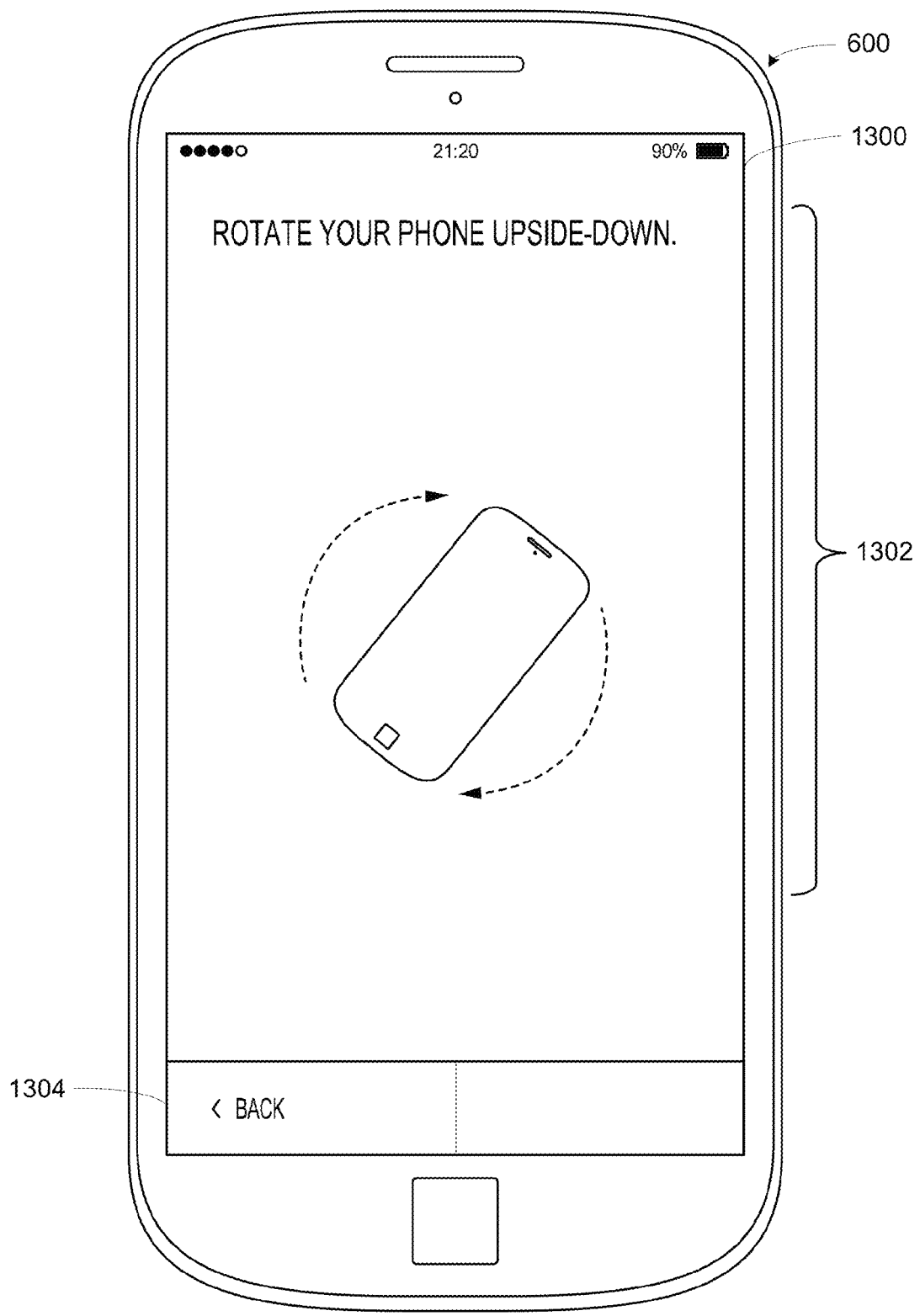
FIG. 13 shows a control device that is displaying another example control interface, according to an example implementation.

By way of example, in FIG. 13, control device 600 is displaying example control interface 1300. Control interface 1300 includes a graphical region 1302 which prompts to rotate control device 600 by 180 degrees. In addition to graphical region 1302, control interface 1300 also includes selectable control 1304. Like several other of the selectable controls, selectable control 1304, when selected, steps backward in the calibration procedure (e.g., to control interface 1200). In some embodiments, to advance the calibration procedure, control device 600 may detect that it has been rotated and responsively advance the calibration procedure (e.g., by causing the control device to display a prompt to prepare another aspect of the media playback system or perhaps to initiate the calibration procedure itself). In other embodiments, control interface 1300 may include a selectable control that, when selected, advances the calibration procedure. Advancing the calibration procedure may indicate that the control device is prepared for calibration.

In some cases, a device manufacturer may choose to mount a microphone in other positions on the phone. In such cases, rotating the phone might not orient the microphone in an improved orientation for detecting the calibration sounds. Further, such positions may be unpredictable. To avoid such issues, in some embodiments, the control device may identify the mounting position of a suitable microphone within the control device and display a prompt to rotate the phone based on that mounting position. For instance, the control device may query a server that maintains data (e.g., a database) correlating particular control device models to known mounting positions of the microphone. Such a query may return an indication of the particular mounting position of a microphone on the control device, which the control device may use to display a prompt for a particular rotation that is based on the mounting position.

Because the control device may be rotated in a hand after the control device displays a prompt to rotate the control device, the display of the control device may be upside down from the perspective of the user. Such an orientation may interfere with the user interacting with control interfaces or other elements shown on the display. To offset the rotation, the control device may display a control interface that is rotated relative to the previously displayed control interface(s). Such a control interface may offset the rotation of the device so as to orient the control interface in an appropriate orientation to view and interact with the control interface.

Figure 14:
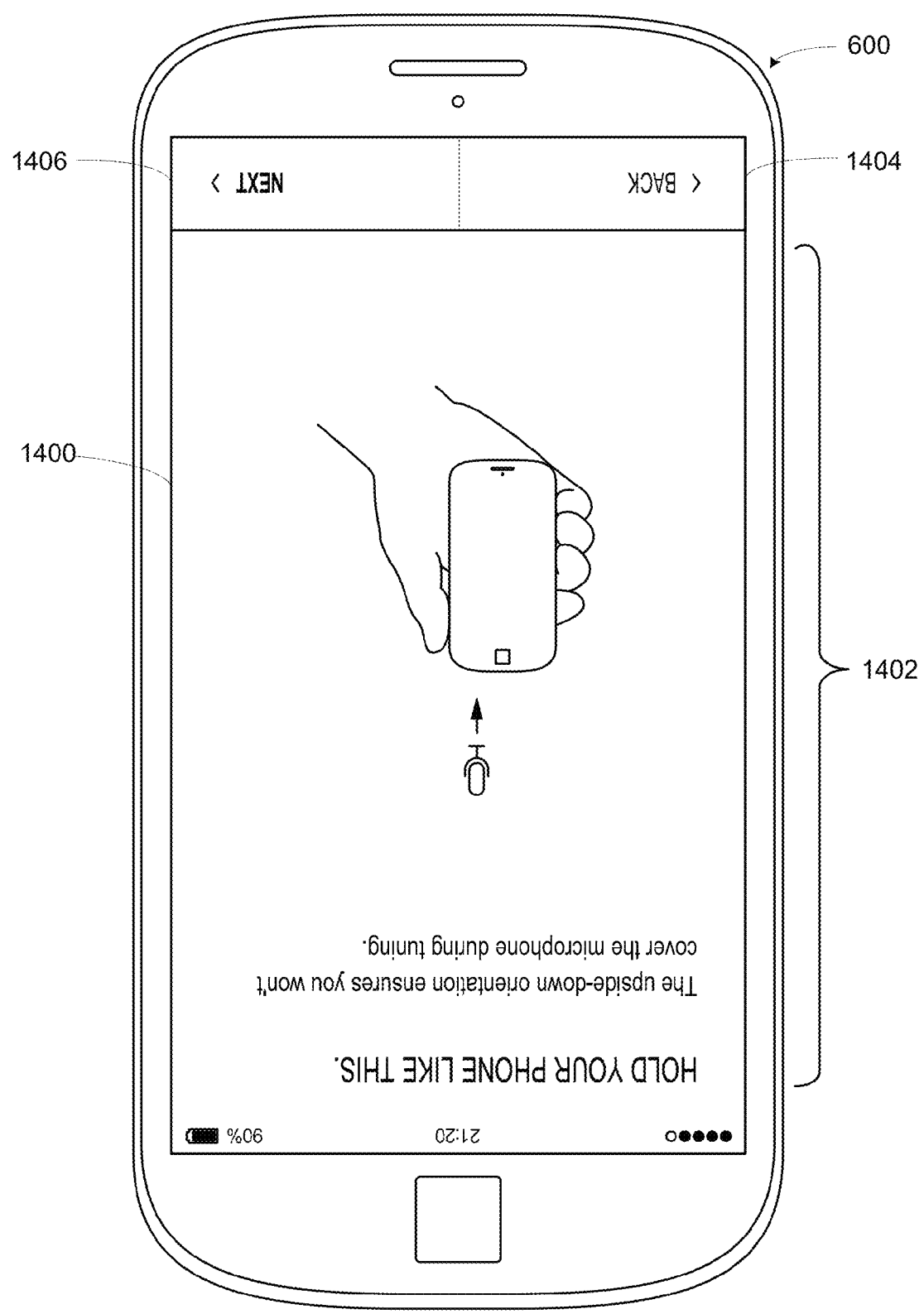
FIG. 14 shows a control device that is displaying yet another example control interface, according to an example implementation.
Figure 15:
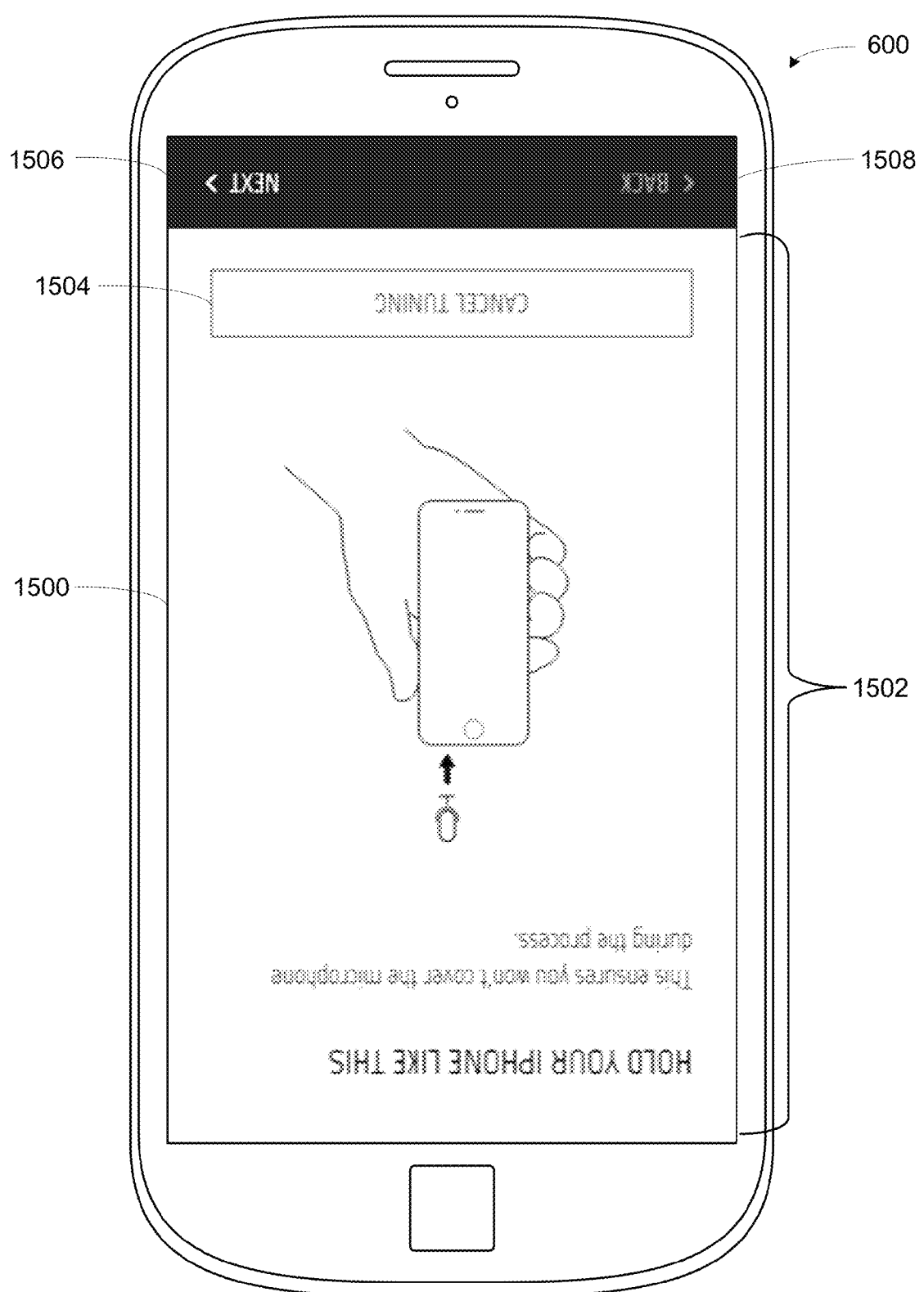
FIG. 15 shows a control device that is displaying an example control interface, according to an example implementation.

To illustrate, in FIG. 14, control device 600 is displaying example control interface 1400. Control interface 1400 includes a graphical region 1402 which prompts to hold the control device 600 in a particular orientation (perhaps after rotating control device 600 as prompted by graphical region 1300). While control interface 1400 may appear upside down on the page from some perspectives, from the perspective of a user holding control device 600 as illustrated in graphical region 1402, graphical region 1402 would appear right side up.

Control interface 1400 also includes selectable controls. Selectable control 1404, when selected, advances the calibration procedure (e.g., by causing the control device to display a prompt to continue preparing for calibration or to initiate the calibration procedure itself). Such a selection may indicate that the control device is prepared for calibration of the playback device. In contrast, selectable control 1406, when selected, steps backward in the calibration procedure (e.g., to control interface 1100, 1200, or 1300, among other possibilities).

In some cases, a control device may prompt rotation of the control device by displaying a control interface that is rotated 180 degrees from normal orientation. For instance, as an alternative to control interface 1300 and 1400, control device 600 may display control interface 1500. As shown, control interface 1500 is rotated upside down. A user may naturally rotate control device 600 by 180 degrees in order to view control interface 1500 right-side up. As shown, control interface 1500 includes a graphical region 1502 which prompts to hold control device 600 with the microphone upwards.

Control interface 1500 also includes selectable controls. Selectable control 1504 may cancel the calibration procedure, perhaps deferring the calibration procedure to a later time. Selectable control 1506, when selected, advances the calibration procedure (e.g., by causing the control device to display a prompt to continue preparing for calibration or to initiate the calibration procedure itself). Such a selection may indicate that the control device is prepared for calibration of the playback device. In contrast, selectable control 1508, when selected, steps backward in the calibration procedure (e.g., to control interface 1100, 1200, or 1300, among other possibilities).

iii. Prepare Environment for Calibration of Playback Device

In some cases, quality of calibration can be further improved by preparing the environment for calibration. As noted above, some calibration procedures involve causing the playback device that is being calibrated to emit one or more calibration sounds, which are then detected by another device (e.g., the control device or a second playback device) or the playback device itself. Because the calibration involves sound transmission, ambient noise within that environment can interfere with the calibration procedure. To prepare an environment for calibration, a control device may display a prompt to reduce ambient noise in the environment.

Figure 16:
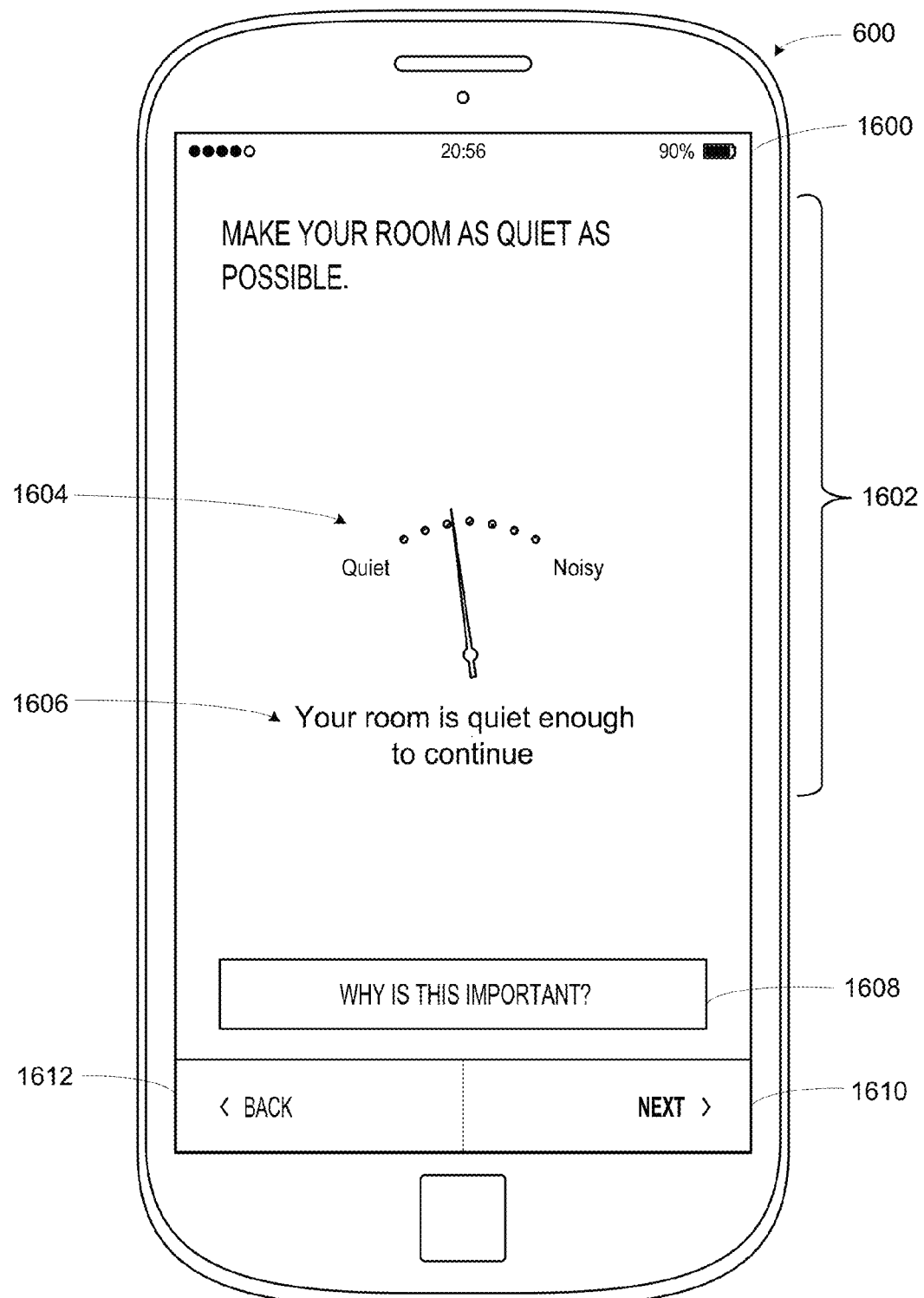
FIG. 16 shows a control device that is displaying yet another example control interface, according to an example implementation.

For example, in FIG. 16, control device 600 is displaying example control interface 1600. Control interface 1600 includes a graphical region 1602 which prompts to reduce ambient noise of the given environment in which the playback device is to be calibrated (i.e., the room or area in which the playback device has been positioned). As shown, graphical region 1602 suggests making the environment as quiet as possible. While this prompt may suggest making the environment as quiet as possible, reducing noise to below an acceptable threshold for calibration may be sufficient.

Note that while control interface 1600 is not shown in an inverted orientation in FIG. 16, in some embodiments, control interface 1600 may be inverted if a prompt to rotate the phone was previously displayed, such that the control device is likely being held upside down. Orientation of various control interfaces described herein may vary based upon whether a prompt to rotate the control device had been previously displayed.

In some embodiments, the control device may determine whether level of ambient noise within the environment is below a threshold level for calibration. The appropriate ambient noise level for calibration may vary by calibration procedure. Sound pressure levels consistent with a quiet room may be appropriate for some example calibration procedures (e.g., sound pressure levels in the range of 30-50 dB). To determine the level of ambient noise within the environment, a control device may include a microphone. By way of the microphone, the control device may detect ambient noise within the environment and determine whether the detected noise is below a threshold level such that the level is suitable for calibration.

In some cases, the control device may show an indication of the noise level within the environment, which may assist in reducing ambient noise level by a sufficient amount for calibration of the playback device. For instance, graphical region 1602 includes a meter 1604 indicating the sound pressure level in the environment. Such a meter may be divided into an acceptable range for calibration and an unacceptable range for calibration, so as to indicate when the ambient noise is at an appropriate level for calibration. Once the ambient noise level is below the threshold level for calibration, the control device may display an indication that the ambient noise within the environment is acceptable for calibration (e.g., indication 1606 within graphical region 1602).

Control interface 1600 also includes several selectable controls. Selectable control 1608, when selected, causes the control device to display an indication of why reducing the ambient noise level improves the calibration procedure. Selectable control 1610, when selected, advances the calibration procedure (e.g., by causing the control device to display a prompt to prepare another aspect of the media playback system or environment for calibration). Such a selection may indicate that the environment is prepared for calibration of the playback device. In contrast, selectable control 1612, when selected, steps backward in the calibration procedure (e.g., to one of control interface 1100-1500, among other possibilities).

Figure 17A:
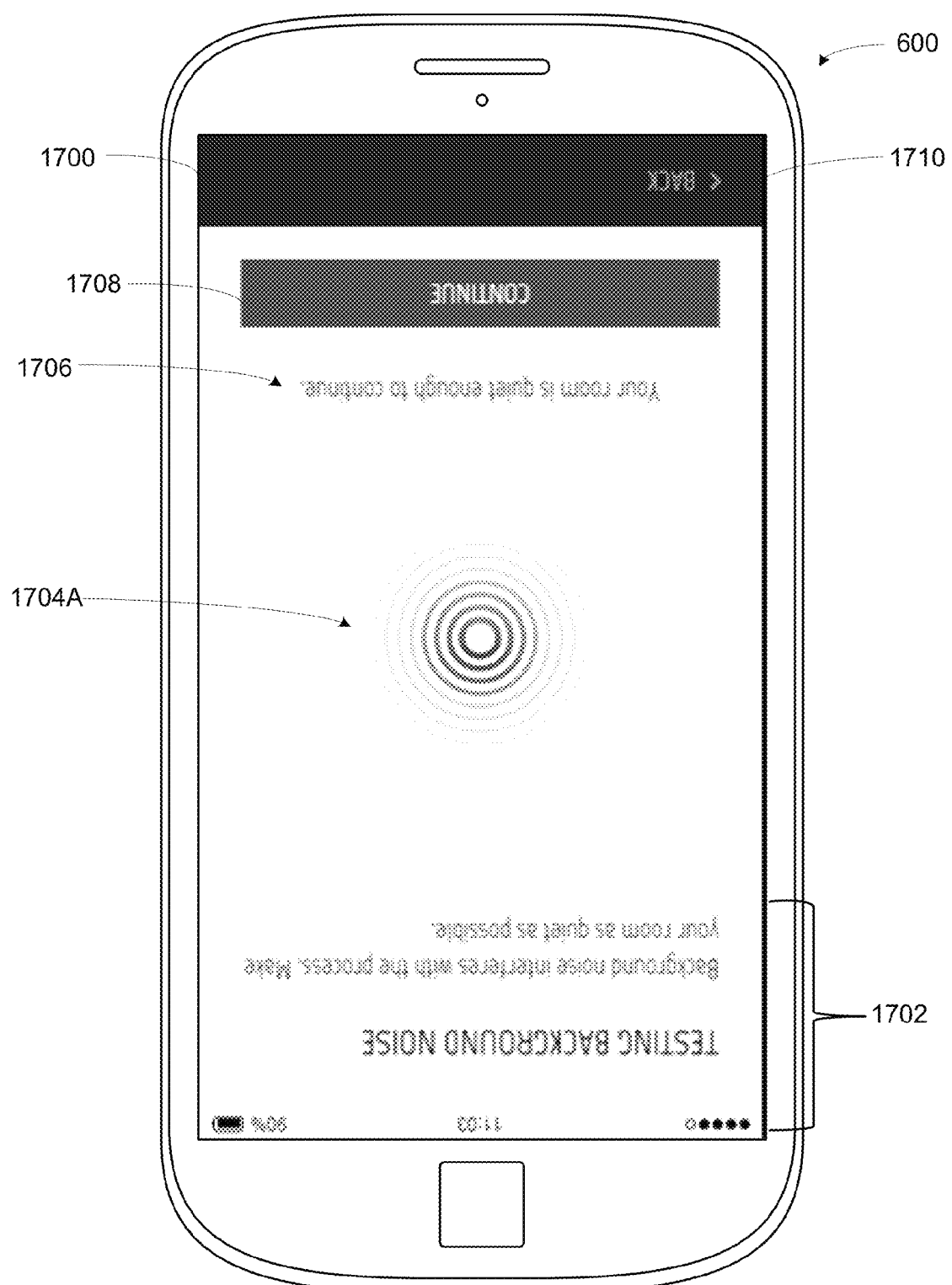
FIG. 17A shows a control device that is displaying an example control interface, according to an example implementation.

As shown in FIG. 17A, control device 600 is displaying graphical interface 1700, which includes another example of a prompt to reduce ambient noise within the environment. As shown, graphical interface 1700 includes a graphical region 1702. Graphical region 1702 indicates that background or ambient noise can interfere with the calibration procedure and suggests reducing noise within the environment.

As noted above, in some implementations, the control device may determine whether the ambient noise is in the environment is at a suitable level for calibration. For instance, a microphone of the control device may detect noise within the environment, and the control device may determine whether the sound pressure level of that noise is below a threshold level for calibration. The threshold level for calibration may relate to the capability of the playback device. If the playback device under calibration is only capable of emitting the calibration sound at a relatively low sound pressure level, then the noise threshold for calibration might be correspondingly low. However, if the playback device under calibration is capable of emitting the calibration sound at a relatively high sound pressure level, then the noise threshold for calibration might be set at a higher level, as the playback device may be able to overcome a relatively higher level of ambient noise. However, such a loud calibration noise might be unpleasant to listeners nearby the playback device.

While the control device is determining whether the sound pressure level of ambient noise within the environment is below the calibration threshold, the control device may displaying an indication that the control device is determining whether the ambient noise within the given environment is less than a calibration threshold. For instance, graphical region 1702 indicates that the control device is testing background noise. As noted above, in some implementations, the control device may display a meter indicating the sound pressure level of the environment. For example, control interface 1700 includes a meter 1704A.

As shown in FIG. 17A, meter 1704A includes a number of concentric circles. As shown, the three inner-most circles are highlighted by having a different appearance than the five outer-most circles in that these circles thicker and a different color, so as to delineate these circles from the remainder. The ratio of highlighted circles to all circles may correspond to the ratio of ambient noise in the environment to the threshold for calibration. By indicating such a ratio, meter 1704A may indicate the relative level of the ambient noise in the environment to the threshold for calibration.

The control device may test noise within the environment for a period of time, so as to determine whether the noise of the environment remains below the threshold level. As noted above, during some calibration procedures, the playback device will emit the calibration sound for a period of time. Spikes of loud ambient noise within that period of time may interfere with calibration. To test suitability of ambient noise for calibration, the control device may determine whether the noise of the environment remains below the threshold level for at least a minimum period of time. While testing noise within the environment, the control device may display an indication of whether the environment is quiet enough to continue with calibration. Such an indication may come in the form of a meter, such as meter 1704A. Alternatively, one or more graphical elements, such as graphical element 1706, may indicate whether the environment is quiet enough to continue.

Figure 17B:
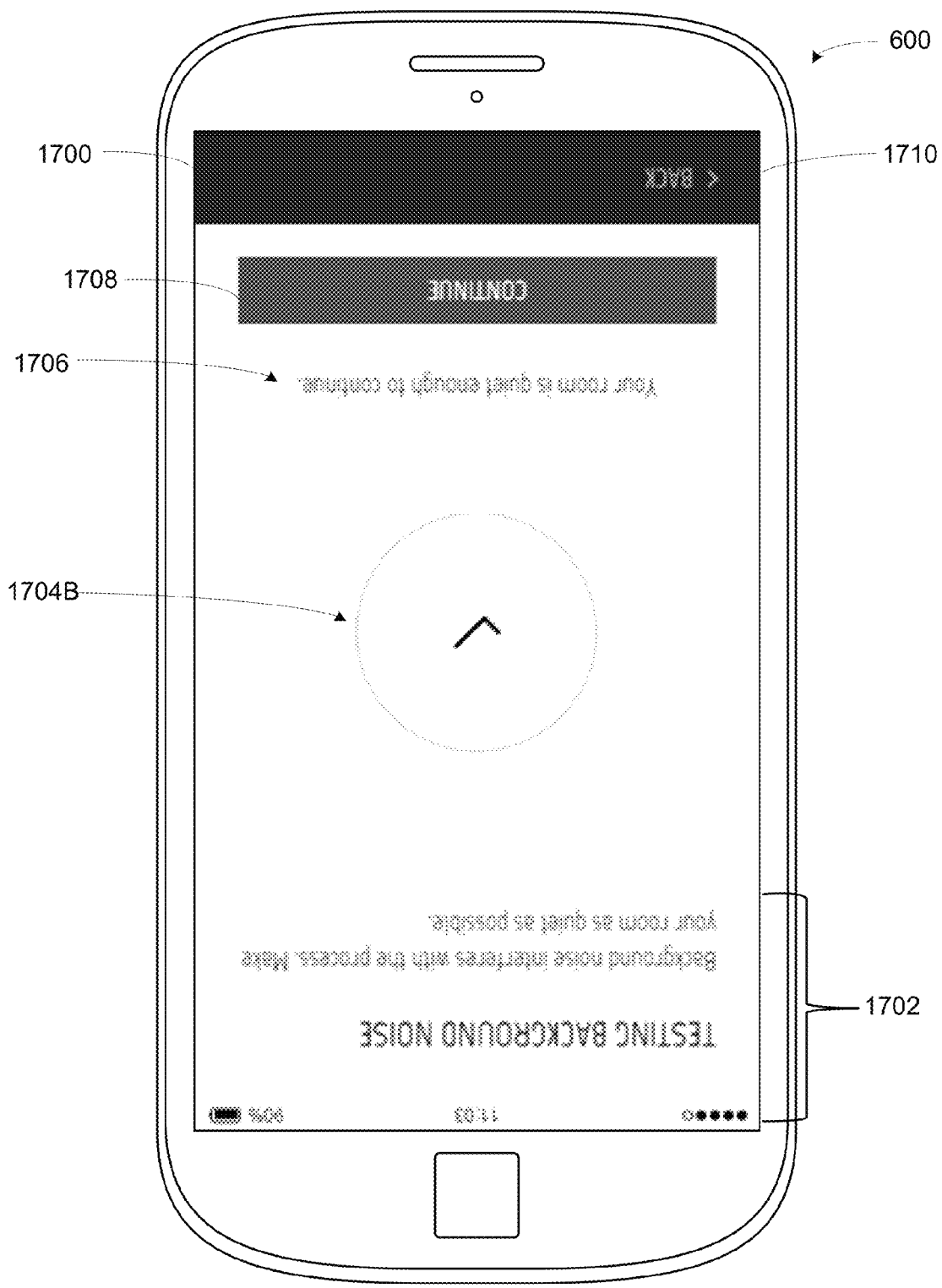
FIG. 17B shows the control device that is displaying the example control interface, according to the example implementation.

In some cases, the control device may determine that the sound pressure level within the given environment is below a threshold level for calibration. As noted above, such a determination may involve determining that the sound pressure level within the given environment remained below a threshold level for calibration for a given period of time (e.g., 5-10 seconds). The control device may indicate the outcome of such determinations by displaying an indication that sound pressure level within the given environment is within an acceptable range for calibration. For instance, as shown in FIG. 17B, meter 1700A may change appearance to become a graphical element 1700B which indicates that the sound pressure level within the given environment is below the threshold level for calibration.

Where the sound pressure level within the given environment is suitable for calibration, the calibration procedure may advance. In some cases, advancing the calibration procedure from control interface 1700 may involve preparing another aspect of the media playback system or environment for calibration. In other cases, the preparation phase may be completed and the calibration procedure may move into a second phase and proceed with calibration, perhaps by selection of selectable control 1708. Alternatively, selectable control 1710 may step backward through the calibration procedure.

iv. Prepare for Movement of the Control Device During Calibration

In some cases, the control device may display a video or animation that depicts how to move the control device within the environment during calibration. Such a video or animation may suggest moving the control device during calibration so as to detect the calibration sounds at two or more locations within the environment. In some cases, the control device may display such a video before initiating the calibration procedure, which may preview the step or steps that the user might perform to assist with the calibration.

Figure 18:
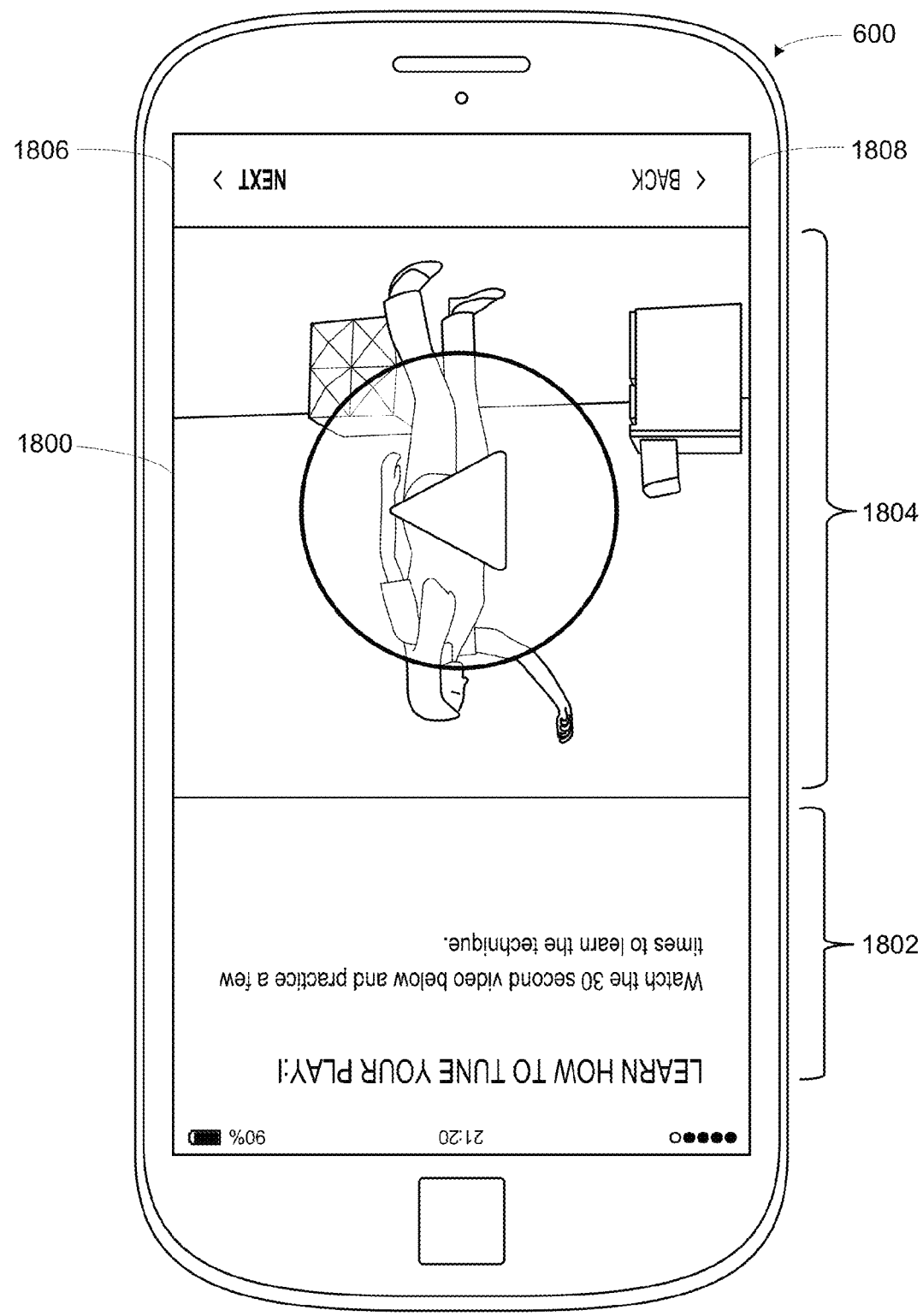
FIG. 18 shows a control device that is displaying a further example control interface, according to an example implementation.

By way of example, in FIG. 18, control device 600 is displaying control interface 1800 which includes graphical regions 1802 and 1804. Graphical region 1802 prompts to watch an animation in graphical region 1804. Such an animation may depict an example of how to move the control device within the environment during calibration. While an animation is shown in graphical region 1804 by way of example, the control device may alternatively show a video or other indication that illustrates how to move the control device within the environment during calibration. Control interface 1800 also includes selectable controls 1806 and 1808, which respectively advance and step backward in the calibration procedure.

Figure 19:
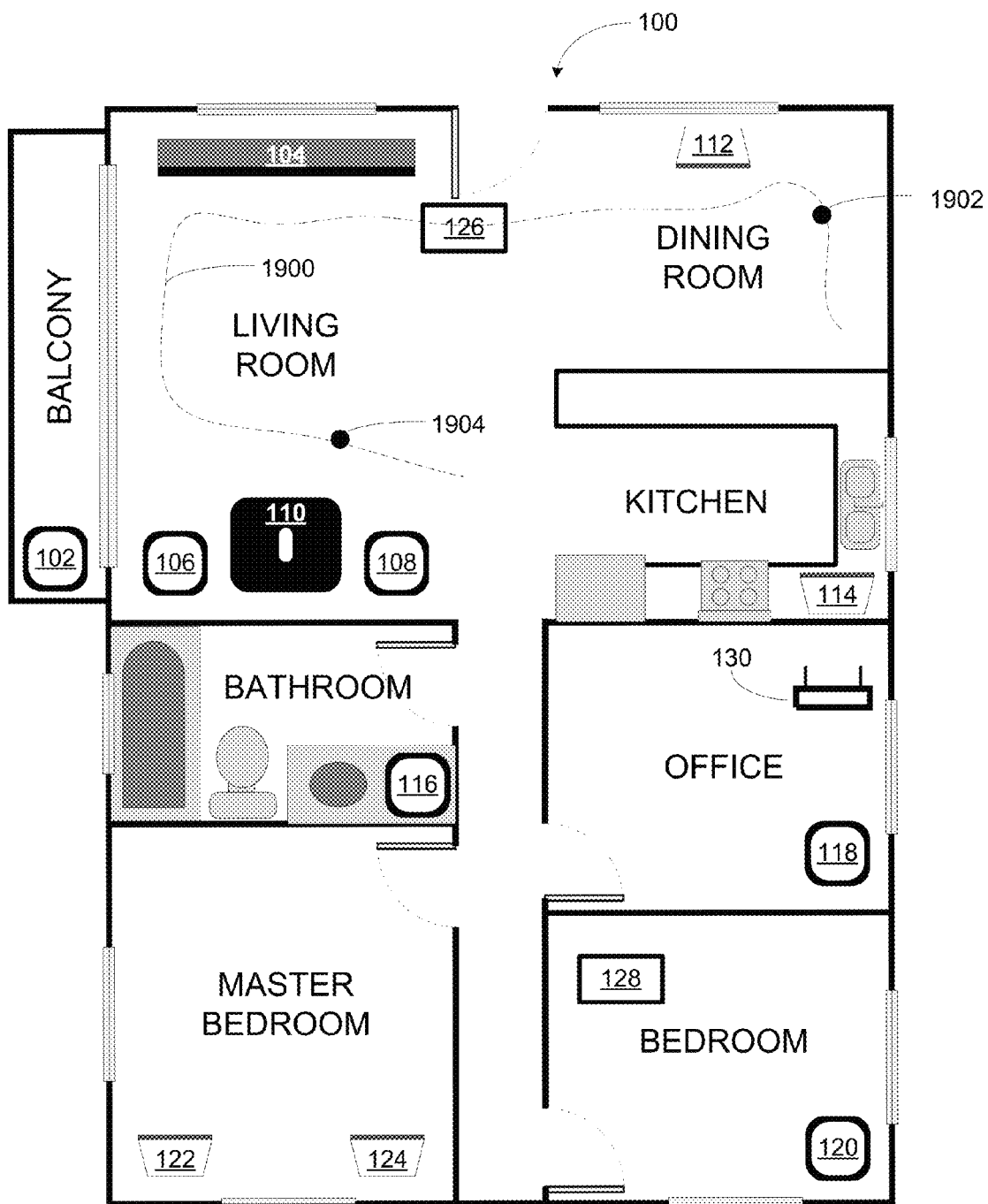
FIG. 19 shows an example movement through an example environment in which an example media playback system is positioned.

To illustrate movement of the control device during calibration, FIG. 19 shows media playback system 100 of FIG. 1. FIG. 19 shows a path 1900 along which a control device (e.g., control device 126) might be moved during calibration. As noted above, the control device may indicate how to perform such a movement in various ways, such as by way of a video or animation, among other examples.

In some embodiments, control device 126 may detect calibration signals emitted by a playback device (e.g., playback device 108) at various points along the path (e.g., point 1902 and/or point 1904). Alternatively, the control device may record the calibration signal along the path. In some embodiments, the playback device may play a periodic calibration signal (or perhaps repeat the same calibration signal) such that the playback device records an instance of the calibration signal at different points along the paths. Comparison of such recordings may indicate how the acoustic characteristics change from one physical location in the environment to another, which influences the calibration settings chosen for the playback device in that environment.

Figure 20:
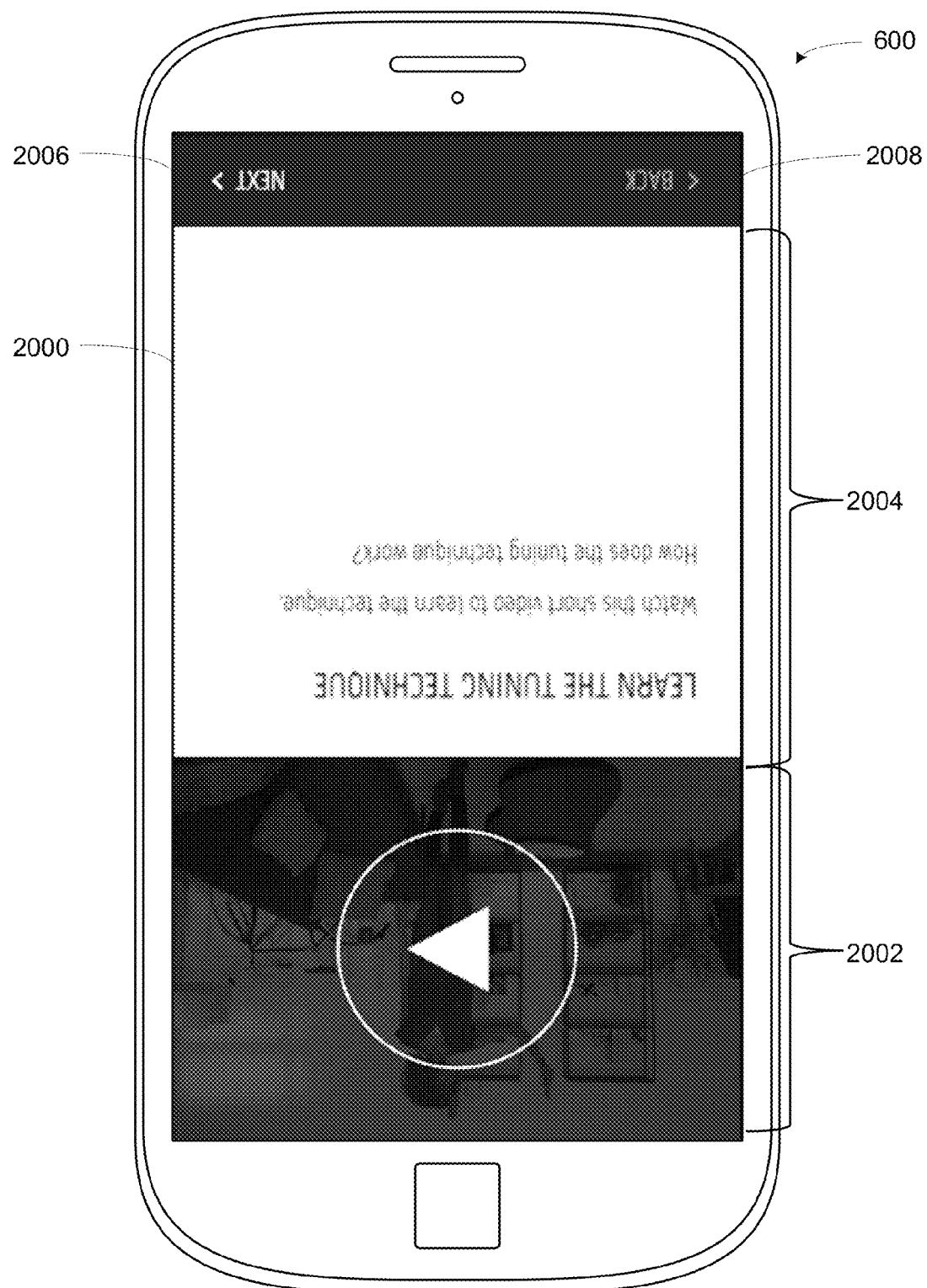
FIG. 20 shows a control device that is displaying an example control interface, according to an example implementation.

As another example, in FIG. 20, control device 600 is displaying control interface 2000 which includes graphical regions 2002 and 2004. Graphical region 2002 includes a video depicting an example of how to move the control device within the environment during calibration. Graphical region 2004 prompts to watch the video in graphical region 2002. Control interface 2000 also includes selectable controls 2006 and 2008, which respectively advance and step backward in the calibration procedure.

In some embodiments, the control device might require that at least a portion of the video or animation be played back before the calibration procedure is advanced. Such a requirement may promote knowledge of how to move the control device during calibration so as to obtain samples from multiple locations within the environment. For example, referring to FIG. 20, control device 600 might require at least 50% (or some other portion) of the video in graphical region 2002 to be played back before selection of selectable control 2006 will cause the calibration procedure to advance. While the video is playing back the requisite portion, control device 600 might de-activate selectable control 2006, or might not display selectable control 2006 at all. Once the requisite portion has been played back, control device 600 may activate or display selectable control 2006 such that selection of selectable control 2006 causes control device 2006 to advance the calibration procedure.

In some cases, the control device might not require that the portion of the video or animation be played back, as the video or animation has been previously played back (such that a familiarity with movement of the control device during calibration has already been established). For instance, control device 600 may determine whether the video in graphical region 2002 has been previously played back. Where the video has not been previously played back, control device 600 may display selectable control 2006 after a threshold portion of the video has been played back. Where the video has been previously played back, control device 600 may display selectable control 2006 before the threshold portion of the video has been played back.

Among examples, different entities may play back the video, which may affect familiarity with the calibration procedure. For example, while in a first iteration of the calibration procedure, a first user may have viewed the video depicting movement of the control device during calibration, a second user who has not viewed the video may be involved in a second iteration of the calibration procedure and not be familiar with how to move the control device. In an attempt to avoid such familiarity, determining whether the video in graphical region 2002 has been previously played back may be tied to certain entities. For instance, in some cases, control device 600 may determine whether the video in graphical region 2002 has been previously played back by control device 600 (as opposed to some other control device, since some example media playback systems may include multiple control devices (e.g., media playback system 100)). Alternatively, a given user account may be logged in or active on control device 600 during the calibration procedure, and control device 600 may determine whether the video in graphical region 2002 has been previously played back by that user account (as opposed to another user account). In further cases, control device 600 may determine whether the video has been previously played back by a control device of the media playback system that includes control device 600 and the playback device under calibration. Other examples are possible as well.

Within example implementations, the control device may detect input data indicating that certain conditions are satisfied such that the control device should proceed to calibration. Such conditions may involve the playback device, the control device, and/or the environment being prepared for calibration. For instance, the control device may detect input data indicating that the playback device is prepared for calibration, input data indicating that the environment is prepared for calibration of the playback device, and/or input data indicating that the control device is prepared for calibration of the playback device. In some embodiments, such input data may generated by advancing through the corresponding control interfaces and prompts, perhaps by way of selectable controls, as advancement through a particular prompt may indicate to the control device that the preparation instructed in that prompt has been performed.

c. Initiate Calibration of Playback Device

In FIG. 5, at block 506, implementation 500 involves initiating calibration of the playback device. A control device may initiate calibration after receiving an indication that the playback device, the control device, and/or the environment are ready to perform the calibration. Initiating calibration of the playback device may involve sending an instruction that causes the playback device to begin the calibration.

In particular, to initiate calibration, the control device may transmit a command that instructs the playback device to emit one or more pre-determined calibration sounds. The control device may transmit such a command by way of a network interface. Upon receiving such a command, the playback device may emit one or more calibration sounds. The playback device may listen for such calibration sounds. Recordings of the calibration sounds emitted by the playback device may be analyzed to determine calibration settings for the environment.

The calibration sound may be periodic such that the repetitions of the calibration sound continue for a calibration interval. During the calibration interval, the control device may be moved throughout the environment. With such movement, repetitions of the calibration sound may be detected at respective locations within the environment. Detected repetitions may differ from one another based on the particular acoustics of the respective locations where each repetition was detected.

Different calibration procedures may use different calibration sounds. Some calibrations may use a combination of different calibration sounds. Within examples, the calibration sound may be an impulse (like a clap or a spark) or a sine sweep, among other examples. The calibration sound may be either audible (i.e. within 20-20,000 Hz) or inaudible (e.g., greater than 20,000 Hz). In some cases, the playback device may emit audible music and an inaudible calibration sound, which may improve user experience as the user can listen to the music during the calibration procedure.

While some example implementations described herein utilize a microphone of a control device in example calibration procedures, other example calibration procedures contemplated herein may involve a microphone that is not incorporated into the control device. Such a standalone microphone might be connected into the control device or the playback device, so as to facilitate recording of the emitted calibration sounds.

In some cases, the control device may initiate calibration upon detecting selection of a selectable control, that when selected, initiates calibration of the playback device. Within embodiments, the control device might not make such a control available (i.e. displayed) until the control device has detected input data indicating that certain conditions are satisfied such that the control device should proceed to calibration. For instance, the control device may display such a selectable control upon detecting input data indicating that the playback device is prepared for calibration, the environment is prepared for calibration of the playback device, and the control device is prepared for calibration of the playback device. Such restriction may help to prevent a user from prematurely initiating calibration.

Figure 21:
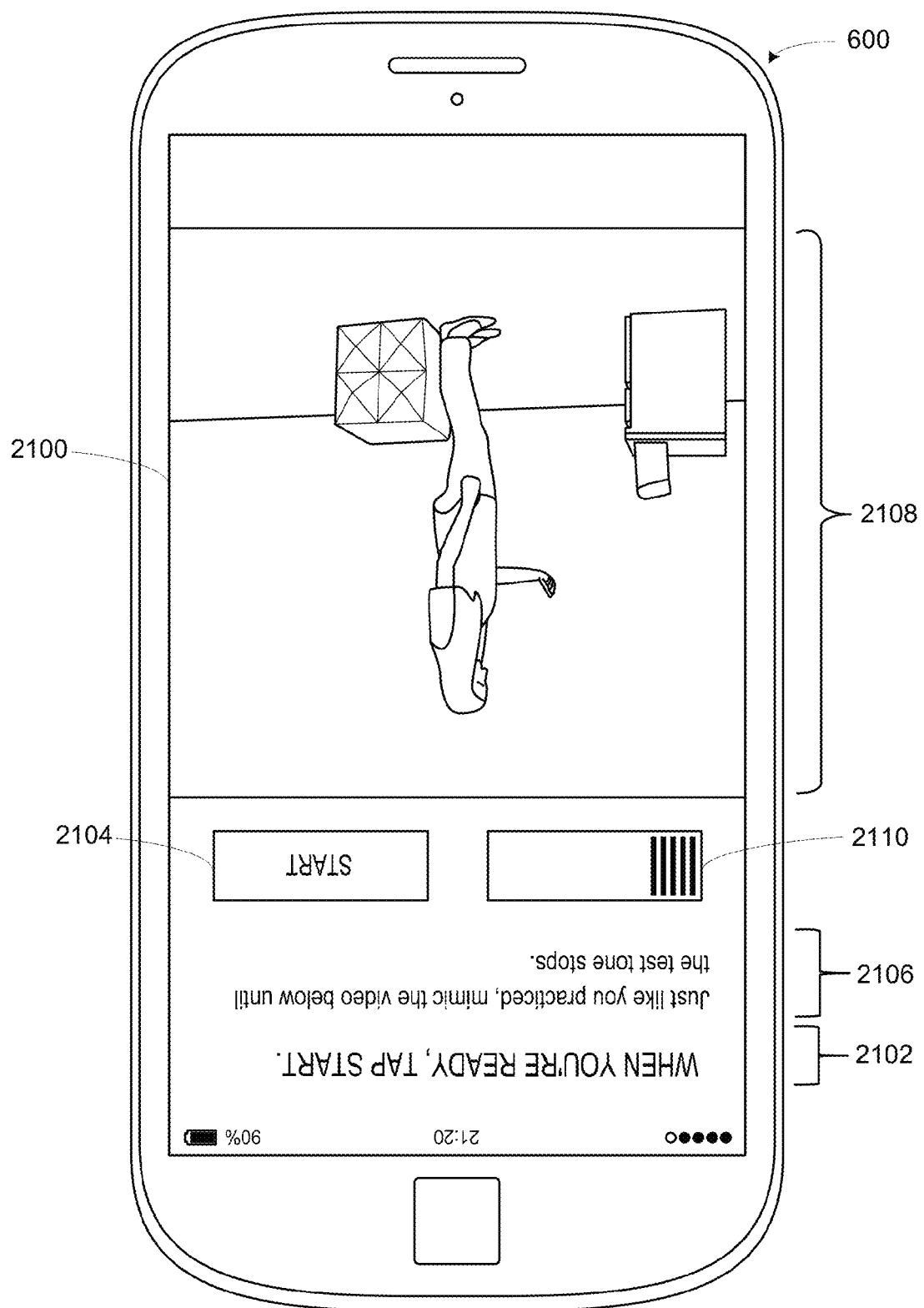
FIG. 21 shows a control device that is displaying another example control interface, according to an example implementation.

To illustrate such a selectable control, FIG. 21 shows control device 600 which is displaying an example control interface 2100. Control interface 2100 includes a graphical region 2102 that prompts to tap selectable control 2104 (Start) when ready. When selected, selectable control 2104 may initiate the calibration procedure.

Like some other control interfaces, control interface 2100 may appear upside down on the page from some perspectives. However, from the perspective of a user holding control device 600 as illustrated in graphical region 2106, graphical region 2102 would appear right side up. Displaying control interface 2100 in this orientation may suggest to continue holding control device 600 in the rotated orientation, which may improve the quality of calibration by orienting the microphone upwards.

As noted above, in some cases, calibration may be facilitated by moving the control device during the calibration procedure (e.g., while the playback device is emitting a calibration sound). To suggest such movement, the control device may display a prompt to move the control device within the environment for a given duration of time (e.g., for the duration of the calibration procedure). In some embodiments, such as when the playback device emits an audible calibration sound, the control device may display a prompt to move the control device within the environment until the playback device stops emitting the one or more pre-determined calibration sounds. For instance, graphical interface 2100 includes a graphical region 2106 that includes a prompt to move the control device within the environment (as shown on the video in graphical region 2108). Such a prompt may assist the user in determining when the calibration procedure is finished such that he or she can stop moving the control device within the environment.

As noted above, control interface 2100 further includes a graphical region 2108 that includes a video depicting how to assist in the calibration procedure. As noted above, some calibration procedures may be facilitated by a user. In an attempt to get the user to assist in the calibration, the control device may display a video or animation depicting the step or steps to be performed during the calibration. While, as noted above, such a video may be displayed before calibration, in some embodiments, the video may alternatively or additionally displayed during calibration.

Figure 22:
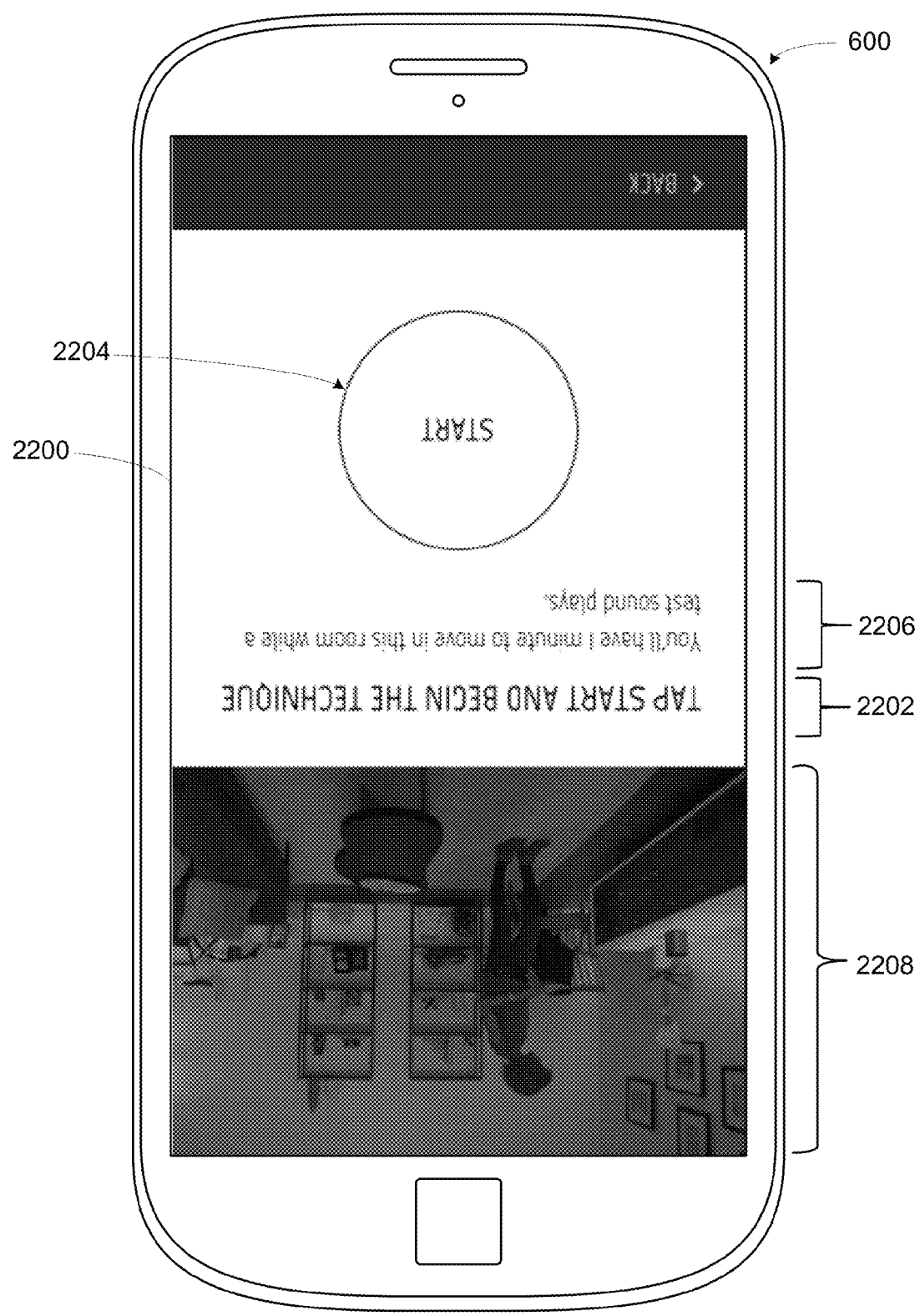
FIG. 22 shows a control device that is displaying yet another example control interface, according to an example implementation.

As another example, FIG. 22 shows control device 600 which is displaying an example control interface 2200. Control interface 2200 includes a graphical region 2202 that prompts to tap selectable control 2204 (Start) when ready. When selected, selectable control 2204 may initiate the calibration procedure. Graphical interface 2200 also includes a graphical region 2206 that includes a prompt to move the control device within the environment (as shown on the video in graphical region 2208). As with other control interfaces, the particular combination of graphical elements and regions may vary by implementation. For instance, in some implementations, graphical interface 2200 might not include a graphical region 2208 that includes a video. Or, graphical interface 2200 might include a graphical region that shows a different video or an animation.

While the playback device emits the calibration sound, the control device may display a control interface. Such a control interface may include an indication that the control device is listening for the presence of the calibration sound. Such an indication may be displayed while the control device attempts to detect or latch onto the emitted calibration tone. In some examples, a graphical region, such as selectable control 2204 of FIG. 22, may animate, such as by displaying a swirling pattern, while the control device attempts to detect the emitted calibration tone. Such an animation may indicate that the control device is in the process of detecting the emitted calibration tone. After the control device detects the presence of the calibration sound, the control device may continue to record the calibration sound using a microphone.

Figure 23A:
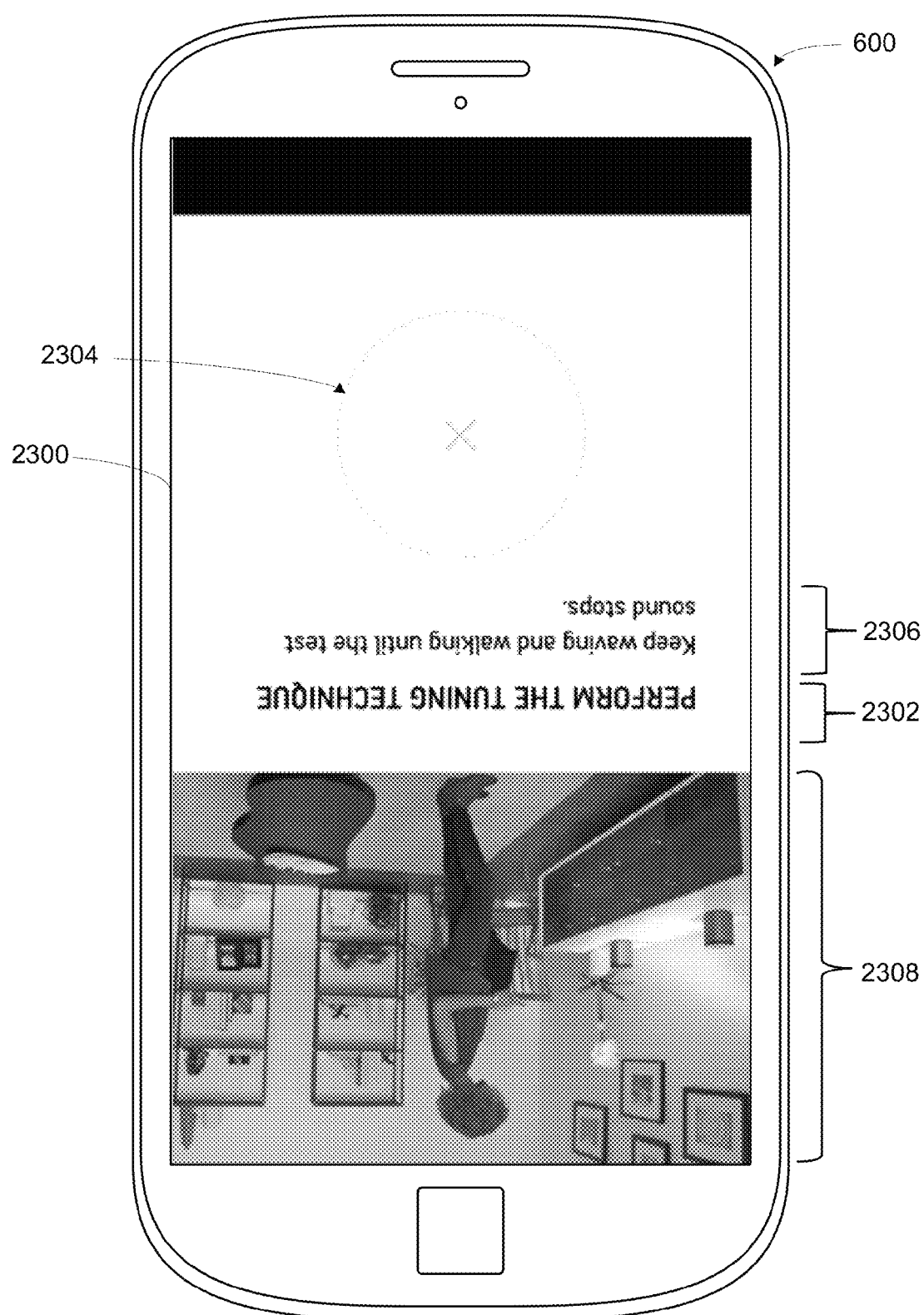
FIG. 23A shows a control device that is displaying an example control interface, according to an example implementation.

While detecting the calibration sound, the control device may display a control interface indicating that the control device and the playback device are performing the calibration. To illustrate, in FIG. 23A, control device 600 is displaying control interface 2300. Control interface 2300 includes a graphical region 2302 indicating that the calibration ("The Tuning Technique") is being performed. Control interface 2300 also includes a progress bar 2304 indicating the duration of time remaining in the calibration interval (i.e., how much longer the playback device will emit the calibration sound). Such a progress bar may also indicate how long to continue to move the control device within the environment. Control interface 2300 further includes a graphical region 2306 that includes a reminder to continue moving the control device until the calibration sound stops playing. In addition, a video in graphical region 2308 may playback so as to continue to demonstrate example movement of the control device.

As the calibration sound continues to be emitted by the playback device and detected by the control device, the control device may update the progress bar to indicate progress through the calibration. For example, in FIG. 23B, progress bar 2304 indicates that the calibration is partially complete. In some embodiments, a portion of the progress bar may pulse in substantial synchrony with periods of the calibration sound, so as to provide visual feedback between the progress bar and the calibration sound. For instance, in some cases, progress indicator 2310 may pulse or blink in substantial synchrony with periods of the calibration sound. In other embodiments, a circular progress bar, such as progress bar 2304, may pulse in synchrony with periods of the calibration sound by displaying a circular graphical element that expands in radius from the circular progress bar during periods of the calibration sound. Such an animated circular graphical element may provide the appearance that the entire progress bar is pulsing in synchrony with periods of the calibration sound. In the center of progress bar 2304, selectable control 2312 may cause the control device to interrupt the calibration, such as by pausing or cancelling the process.

Figure 24:
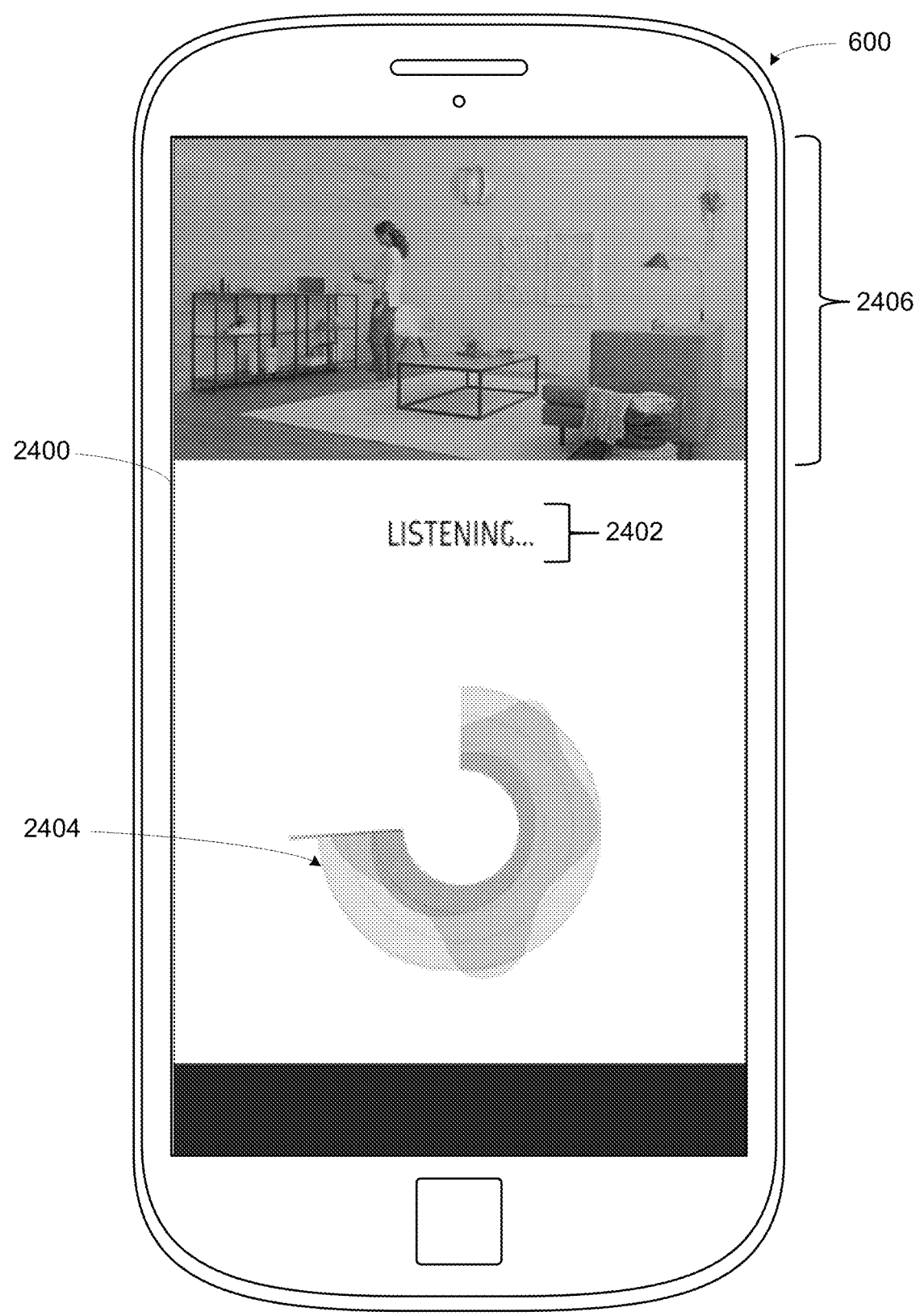
FIG. 24 shows a control device that is displaying an example control interface, according to an example implementation.

As another example, in FIG. 24, control device 600 is displaying control interface 2400. Control interface 2400 includes a graphical region 2402 indicating that control device 600 is detecting the calibration sound. Control interface 2400 also includes a progress bar 2402 indicating the duration of time remaining in the calibration interval. In addition, control interface 2400 includes a graphical region 2406 that includes a video depicting an example movement of the control device.

Within examples, the control device may display an indication of sound detected by the microphone during the calibration. For instance, the control device may display a meter or gauge indicating sound pressure level detected by the microphone. To illustrate, control interface 2100 includes a meter 2110 indicating sound pressure level detected by the microphone of control device 600. Such a meter may indicate that control device 600 is detecting calibration sounds emitted by the playback device.

In some cases, during the calibration of the playback device, the control device may detect whether it is being moved within the environment. If the control device detects that it is stationary, the control device may attempt to remind the user to move the control device within the environment. For instance, the control device may display a prompt that includes a reminder to move the control device within the environment during calibration. As another example, the control device may emit an audible sound intended to indicate that the control device should be moved during calibration of the playback device.

After the playback device emits the calibration sound during the calibration interval, the recordings of the calibration sounds may be analyzed to determine calibration settings for the playback device. In some embodiments, the control device may analyze the calibration sounds itself. Alternatively, the control device may transmit the recordings (or a portion thereof) to another computing system (perhaps a computing system with more processing power, such as a personal computer or server (e.g., a server involved in providing a cloud computing service). During the analysis, the control device (or the other computing system) may determine a calibration profile for the playback device. Such a calibration profile may offset certain acoustic characteristics of the environment to calibrate the playback device to a desired equalization (e.g., a flat response) or perhaps a flat response adjusted by a desired equalization.

Some examples techniques for analyzing such recordings are described in U.S. patent application Ser. No. 13/536,493 filed Jun. 28, 2012, entitled "System and Method for Device Playback Calibration," U.S. patent application Ser. No. 14/216,306 filed Mar. 17, 2014, entitled "Audio Settings Based On Environment," and U.S. patent application Ser. No. 14/481,511 filed Sep. 9, 2014, entitled "Playback Device Calibration," which are incorporated herein in their entirety.

Figure 25:
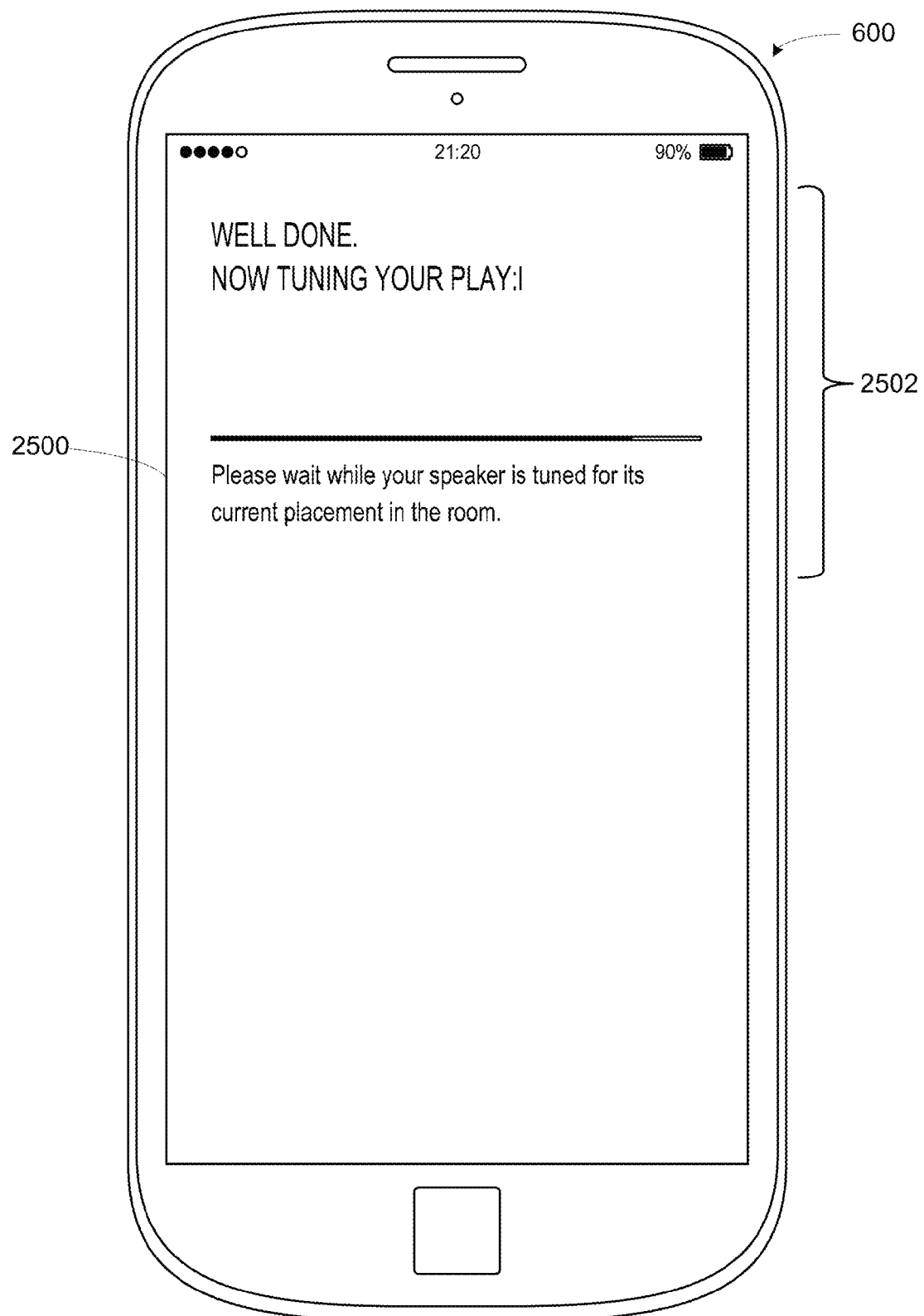
FIG. 25 shows a control device that is displaying another example control interface, according to an example implementation.

While the recordings of the calibration sounds are analyzed to determine the calibration settings for the playback device, the control device may display an indication of the calibration procedure's status. For instance, the control device may display a progress bar indicating progress of the control device in analyzing the recordings to determine the calibration settings for the playback device. By way of example, in FIG. 25, control device 600 is displaying control interface 602H which includes a graphical region 2502. Graphical region 2502 indicates that tuning (calibrating) of the playback device is in progress and includes a progress bar to show progress of the calibration process.

Figure 26:
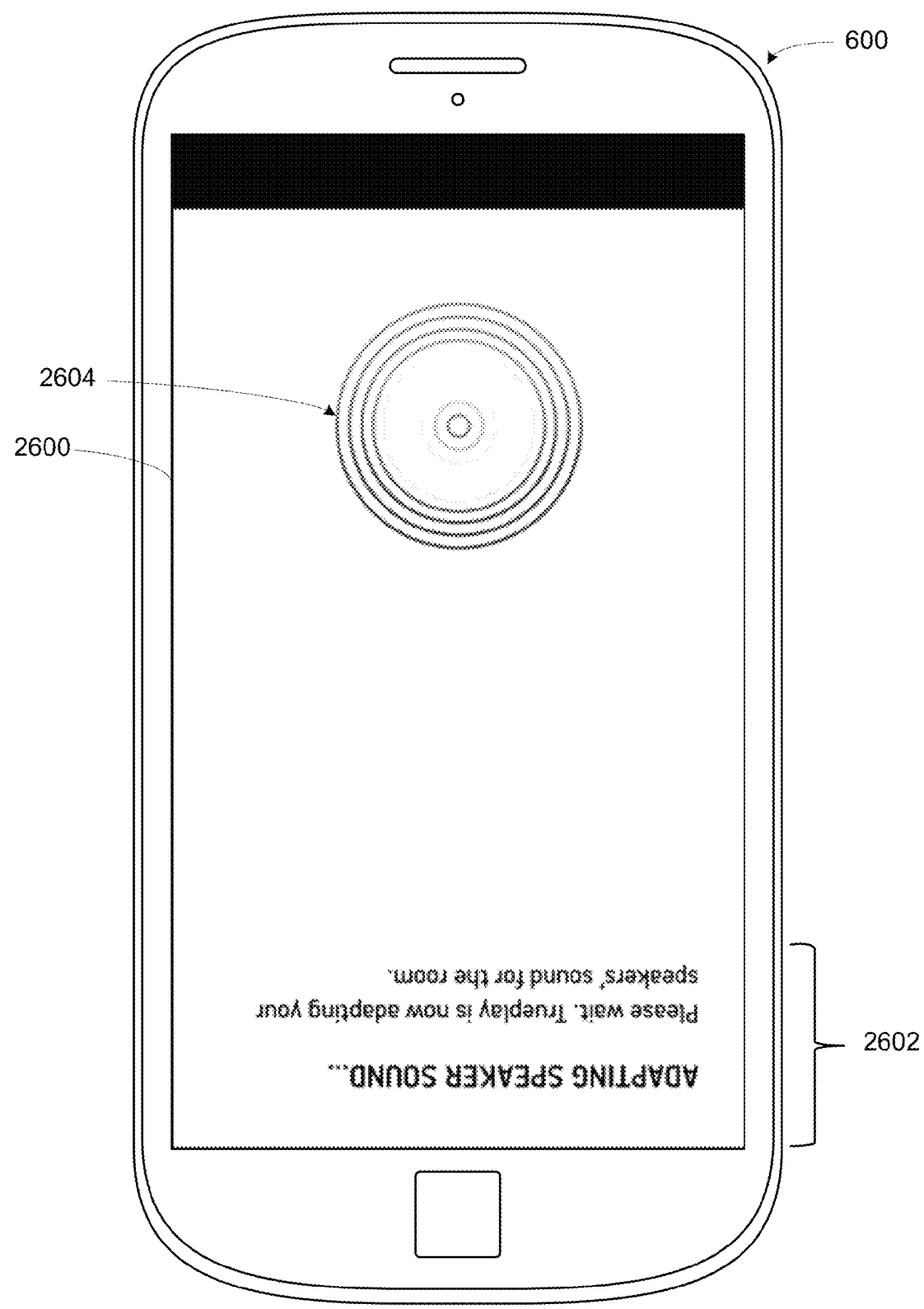
FIG. 26 shows a control device that is displaying yet another example control interface, according to an example implementation.

As another example, in FIG. 26, control device 600 is displaying control interface 2600. Control interface 2600 includes a graphical region 2602 which indicates that the control device is adapting the sound of the playback device. Control interface 2600 also includes a graphical element 2604 that animates while the calibration sounds are analyzed.

Figure 27:
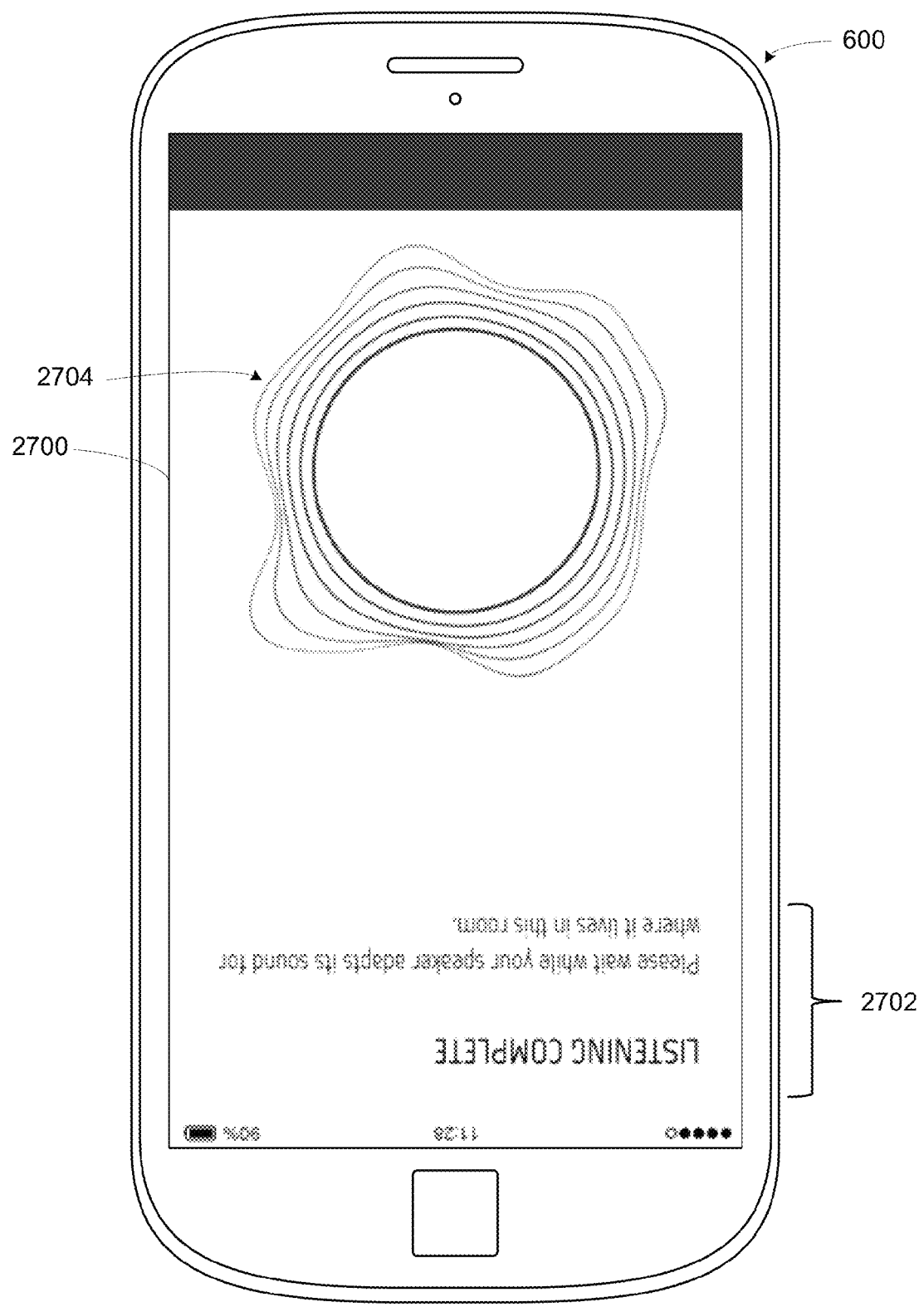
FIG. 27 shows a control device that is displaying a further example control interface, according to an example implementation.

As a further example, in FIG. 27, control device 600 is displaying control interface 2700. Control interface 2700 includes a graphical region 2702 which indicates that the control device is adapting the sound of the playback device. Control interface 2700 also includes a graphical element 2604 that animates while the calibration sounds are analyzed. As shown, graphical element 2604 includes a plurality of concentric ellipsoids that are contorted from a circular shape. Upon the completing the analysis, control device 600 may display the plurality of concentric ellipsoids in the circular shape (i.e., not contorted, as circles).

Figure 28:
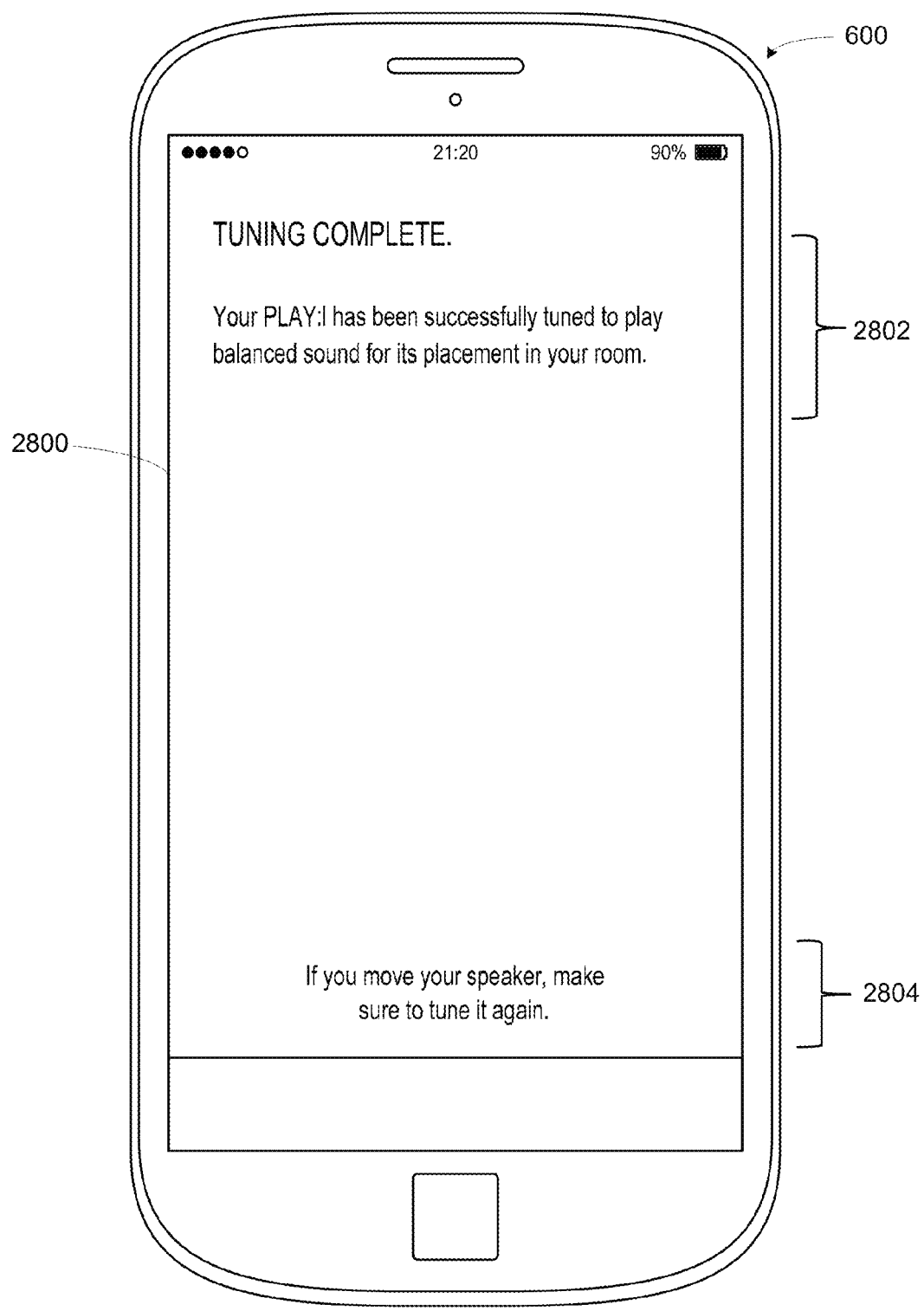
FIG. 28 shows a control device that is displaying an example control interface, according to an example implementation.

After the calibration procedure finishes, the control device may display an indication of that status. To illustrate, in FIG. 28, control device 600 is displaying control interface 2800 which includes a graphical region 2802. Graphical region 2802 indicates that tuning (calibrating) of the playback device has completed. Graphical region 2804 includes a reminder to perform the calibration procedure again if the calibrated playback device is from the position in which it was calibrated.

Figure 29:
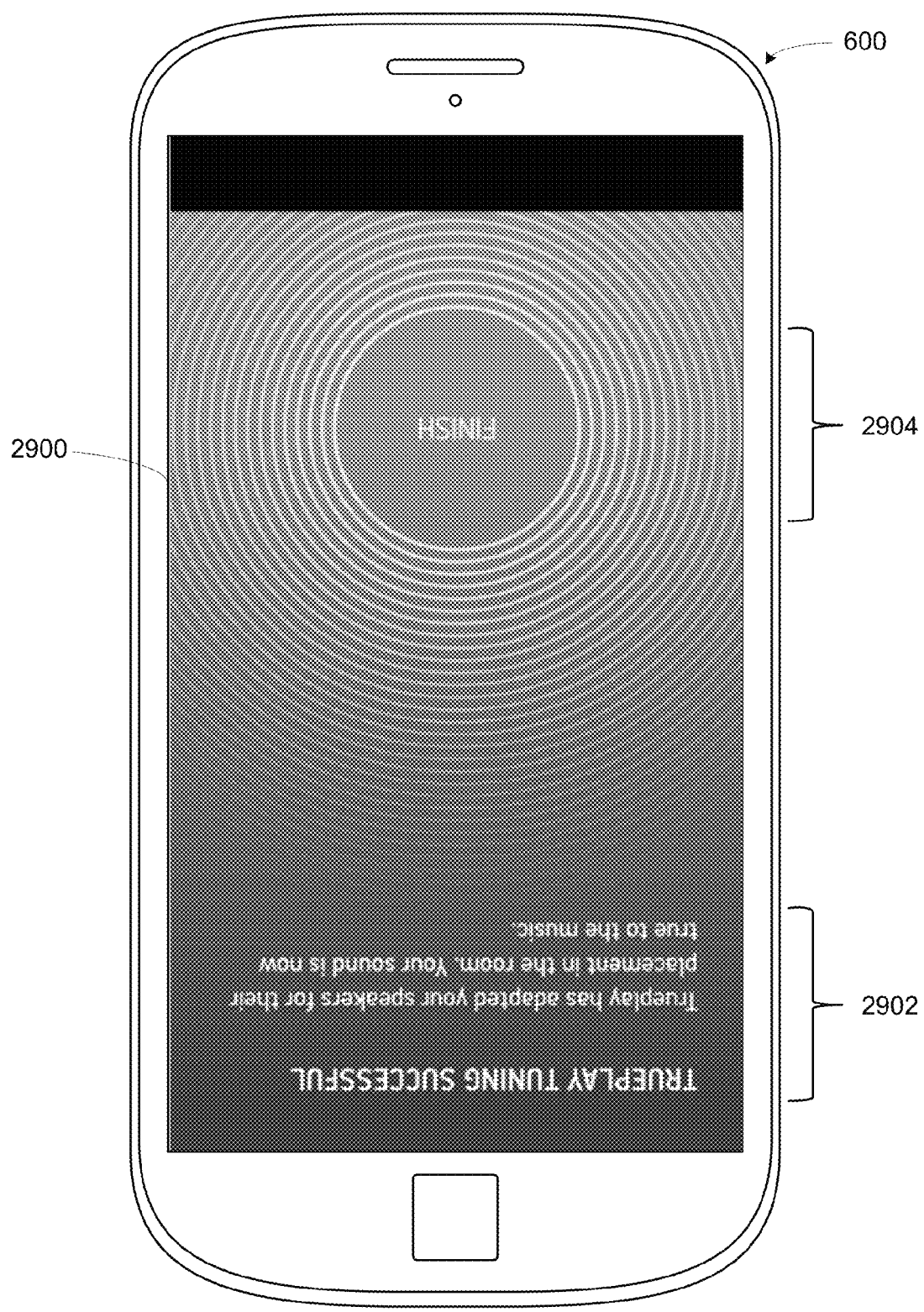
FIG. 29 shows a control device that is displaying another example control interface, according to an example implementation.

As another example, in FIG. 29, control device 600 is displaying control interface 2900. Graphical region 2902 of control interface 2900 indicates that tuning (calibrating) of the playback device has completed. Graphical region 2902 includes a reminder to perform the calibration procedure again if the calibrated playback device is from the position in which it was calibrated. Graphical interface 2900 also includes a selectable control 2904 that, when selected, finishes the calibration.

Figure 30:
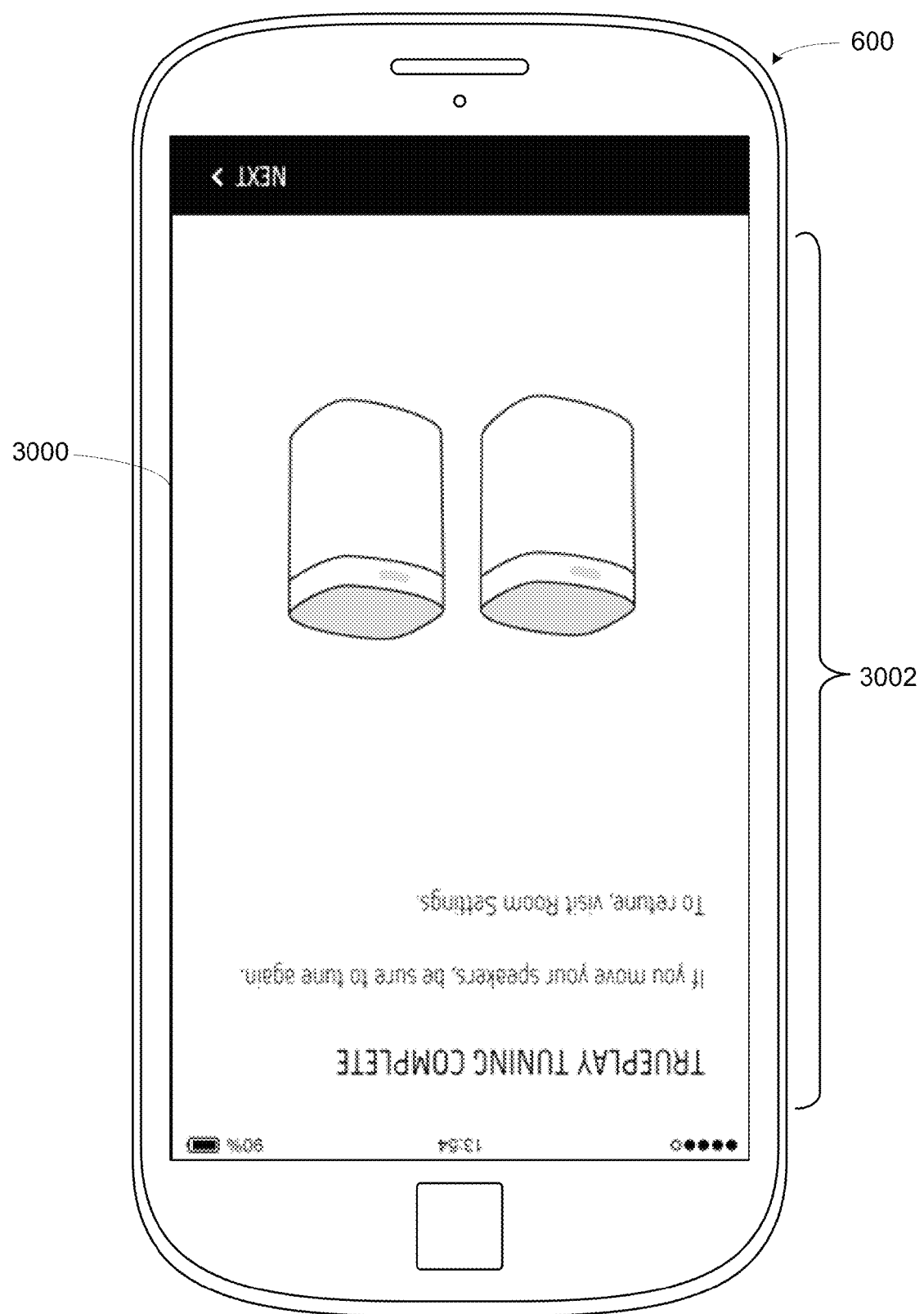
FIG. 30 shows a control device that is displaying yet another example control interface, according to an example implementation.

As yet another example, in FIG. 30, control device 600 is displaying control interface 3000 which includes a graphical region 3002. Graphical region 3002 indicates that that tuning (calibrating) of the playback device has completed and also includes a reminder to perform the calibration procedure again if the calibrated playback device is from the position in which it was calibrated.

In some examples, after the calibration procedure completes, the control device display a prompt to rotate the phone by 180 degrees about a horizontal axis such that the microphone is oriented downwards after the rotation. After such a rotation, the control device may be rightside up relative to its intended orientation within a hand (e.g., with the speaker towards the top of the device, and with the microphone towards the bottom of the device). Subsequent control interfaces may be displayed right-side up, rather than inverted, to account for this change in orientation.

In some embodiments, a control device may determine a degree of adjustment made by the calibration and display an indication of this degree on a control interface. For instance, in some cases, the control device may determine whether the determined calibration profile adjusts an equalization of the playback device by more or less than a threshold degree. Within examples, the threshold may be representative of an audible difference. Adjustments that exceed the threshold may be discernible by the average listener, while adjustments that are less than the threshold might not be as easily discernible.

In some examples, the control device may display graphical elements indicating the degree of adjustment. For instance, based on determining that the determined calibration profile adjusts the equalization of the playback device by more than the threshold degree, the control device may display one or more graphical elements indicating that the calibration of the playback device significantly adjusted equalization of the playback device. In contrast, when the determined calibration profile adjusts the equalization of the playback device by less than the threshold degree, the control device may display one or more graphical elements indicating that the calibration of the playback device subtlety adjusted equalization of the playback device. For instance, in an example implementation, a control device may display text stating: "Subtle changes were made to your device, as your playback device was well-placed." Other examples are possible as well.

As noted above, implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the implementation.

IV. Example Techniques to Facilitate Calibration of Playback Devices

Figure 31:
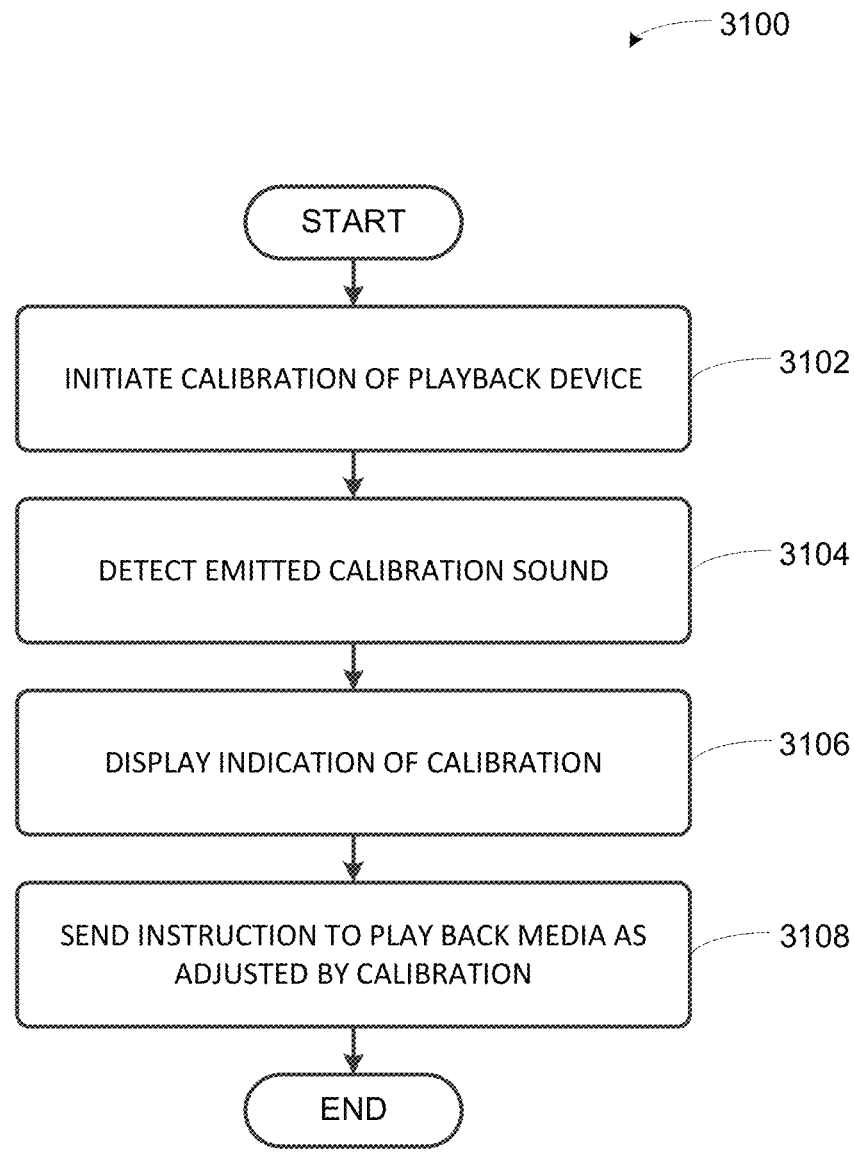
FIG. 31 shows an example flow diagram to facilitate the calibration of a playback device within a given environment using a control device.

As a further example, implementation 3100 shown in FIG. 31 presents another example technique to facilitate calibration of a playback device. Like implementation 500 shown in FIG. 5, implementation 3100 shown in FIG. 31 presents embodiments that can be implemented within an operating environment including, for example, the media playback system 100 of FIG. 1, one or more of the playback device 200 of FIG. 2, one or more of the control device 300 of FIG. 3, or one or more of control device 600 of FIG. 6. Further, operations illustrated by way of example as being performed by a media playback system can be performed by any suitable device, such as a playback device or a control device of a media playback system. Implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 3102, implementation 3100 involves initiating calibration of a playback device. For instance, a control device, such as control device 600, may send an instruction that initiates a calibration sequence in which a playback device is calibrated for a given environment in which the playback device is located. As discussed above, initiating a calibration sequence may involve sending an instruction that causes a playback device to emit a periodic calibration sound for a pre-determined calibration interval.

At block 3104, implementation 3100 involves detecting an emitted calibration sound. As noted above, initiating a calibration may involve sending an instruction that causes a playback device to emit a calibration sound. While the playback device is emitting the periodic calibration sound, the control device may detect the emitted calibration sound via a microphone.

Figure 23B:
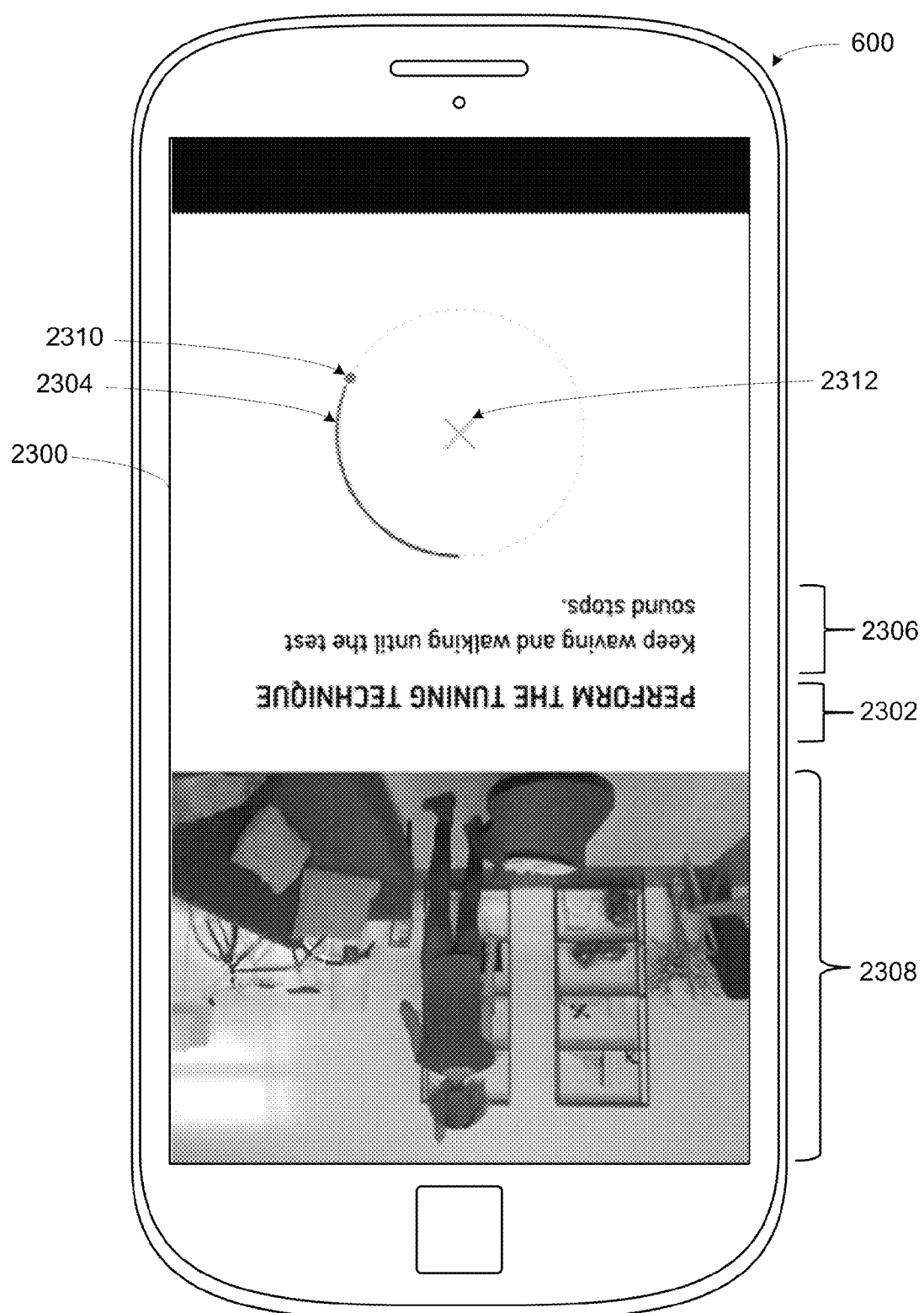
FIG. 23B shows the control device that is displaying the example control interface, according to the example implementation.

Implementation 3100 may also involve displaying, on a graphical display, a progress bar that indicates a duration of time remaining in the calibration interval. For instance, control device 600 may display control interface 2300, 2400, or 2500, among other examples, which include respective progress bars indicating the duration of time remaining in the calibration interval. In some embodiments, at least a portion of the progress bar may pulse in synchrony with periods of the calibration sound, possibly as shown in FIG. 23B.

Referring again to FIG. 31, at block 3106, implementation 3100 involves displaying an indication of the calibration. For example, the control device may display an indication that the playback device is being calibrated for its particular position within the given environment while determining a calibration profile for the playback device that offsets acoustics of the given environment based on the detected calibration sound. Examples include control interface 2600 of FIG. 26 and control interface 2700 of FIG. 27, among other possibilities.

At block 3108, implementation 3100 involves sending an instruction to play back media as adjusted by the calibration. For instance, the control device may send an instruction that causes the calibrated playback device to play back media as adjusted by a determined calibration profile. As described in connection with block 506, such a calibration profile may offset a portion of the acoustics of the environment.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture. The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

(Feature 1) A network device, comprising a microphone, a processor; and memory configured for: displaying, on a graphical display, a prompt to initiate a calibration sequence that involves calibration of a playback device for a given environment in which the playback device is located; displaying, on the graphical display, a sequence of one or more prompts to prepare the playback device for calibration within the given environment; displaying, on the graphical display, a sequence of one or more prompts to prepare the given environment for calibration of the playback device; and upon detecting selection of a selectable control that, when selected, initiates calibration of the playback device, initiating calibration of the playback device.

(Feature 2) The network device of feature 1, wherein displaying the prompt to initiate calibration of the playback device comprises displaying a plurality of concentric ellipsoids that alternate between circular and contorted ellipsoid shapes while the prompt to initiate calibration is displayed.

(Feature 3) The network device of feature 1, wherein displaying the prompt to initiate the calibration sequence comprises displaying one or more graphical elements indicating that the calibration procedure calibrates the playback device for a particular position within the given environment in which the playback device has been placed.

(Feature 4) The network device of feature 1, wherein displaying the prompt to initiate calibration of the playback device comprises displaying a selectable control that, when selected, displays one or more graphical elements indicating that the calibration procedure calibrates the playback device for a particular position within the environment that the playback device has been placed.

(Feature 5) The network device of any of features 1 to 4, wherein displaying the sequence of one or more prompts to prepare the playback device for calibration within the given environment comprises displaying a prompt to position the playback device at a position within the given environment at which the playback device will be operated.

(Feature 6) The network device of any of features 1 to 5, wherein displaying the sequence of one or more prompts to prepare the given environment for calibration of the playback device comprises displaying, on a control interface, an indication that the control device is determining whether the ambient noise within the given environment is less than a calibration threshold; and displaying a number of concentric circles, wherein the number of displayed concentric circles is proportional to a sound pressure level within the given environment.

(Feature 7) The network device of any of features 1 to 6, wherein further configured for determining that the sound pressure level within the given environment is below a threshold level for calibration; and displaying an indication that sound pressure level within the given environment is within an acceptable range for calibration.

(Feature 8) The network device of any of features 1 to 7, further configured for displaying a video that depicts at least a portion of the calibration procedure; determining that at least a threshold portion of the video has been played; and based on determining that the threshold portion of the video has been played, displaying a selectable control that, when selected, causes the graphical display to display a prompt to initiate calibration, wherein the prompt includes the selectable control that, when selected, initiates calibration of the playback device.

(Feature 9) The network device of any of features 1 to 8, further configured for displaying a prompt to play back a video that depicts at least a portion of the calibration procedure; determining whether the video has been previously played back by the control device during a previous iteration of the calibration procedure; when the video has not been previously played back by the control device during a previous iteration of the calibration procedure, causing the graphical display to display a prompt to initiate calibration after a threshold portion of the video has been played back, wherein the prompt includes the selectable control that, when selected, initiates calibration of the playback device; and when the video has been previously played back by the control device during a previous iteration of the calibration procedure, causing the graphical display to display the prompt to initiate calibration before the threshold portion of the video has been played back.

(Feature 10) The network device of any of features 1 to 9, wherein initiating calibration of the playback device comprises sending an instruction that causes the playback device to emit a periodic calibration sound for a pre-determined calibration interval; and while the playback device is emitting the periodic calibration sound, displaying a progress bar that indicates a duration of time remaining in the calibration interval, wherein at least a portion of the progress bar pulses in synchrony with periods of the calibration sound.

(Feature 11) The network device of feature 10, wherein displaying the progress bar that indicates the duration of time remaining in the calibration interval comprises displaying a circular progress bar that pulses in synchrony with periods of the calibration sound by displaying a circular graphical element that expands in radius from the circular progress bar during periods of the calibration sound.

(Feature 12) The network device of feature 10, wherein displaying the progress bar that indicates the duration of time remaining in the calibration interval comprises displaying a progress bar that includes a progress indicator that pulses in synchrony with periods of the calibration sound and indicates the duration of time remaining in the calibration interval.

(Feature 13) The network device of any of features 1 to 12, wherein initiating calibration of the playback device comprises: sending an instruction that causes the playback device to emit a periodic calibration sound for a pre-determined calibration interval; and while the control device listens for the periodic calibration sound, causing the graphical display to display an indication that the control device is listening for the presence of the periodic calibration sound within the given environment.

(Feature 14) The network device of any of features 1 to 13, further configured for detecting at least a portion of a calibration sound emitted by the playback device; while the control device analyzes the detected calibration sound, displaying a plurality of concentric ellipsoids that are contorted from a circular shape; and after the control device analyzes the detected calibration sound, displaying the plurality of concentric ellipsoids in the circular shape.

(Feature 15) The network device of any of features 1 to 14, further configured for determining a calibration profile that offsets acoustic characteristics of the given environment to calibrate the playback device to a calibration equalization.

(Feature 16) The network device of any of features 1 to 15, further configured for determining that the determined calibration profile adjusts an equalization of the playback device by more than a threshold degree; and based on determining that the determined calibration profile adjusts the equalization of the playback device by more than the threshold degree, displaying one or more graphical elements indicating that the calibration of the playback device significantly adjusted equalization of the playback device.

(Feature 17) The network device of feature 1 to 16, further configured for determining that the determined calibration profile adjusts an equalization of the playback device by less than a threshold degree; and based on determining that the determined calibration profile adjusts the equalization of the playback device by more than the threshold degree, displaying one or more graphical elements indicating that the calibration of the playback device subtlety adjusted equalization of the playback device.

(Feature 18) A network device, comprising a microphone, a processor; and memory configured for sending an instruction that initiates a calibration sequence in which a playback device is calibrated for a given environment in which the playback device is located, wherein the initiating the calibration sequence comprises sending an instruction that causes a playback device to emit a periodic calibration sound for a pre-determined calibration interval; while the playback device is emitting the periodic calibration sound, detecting, via a microphone, the emitted calibration sound and displaying, on a graphical display, a progress bar that indicates a duration of time remaining in the calibration interval, wherein at least a portion of the progress bar pulses in synchrony with periods of the calibration sound; and while determining a calibration profile for the playback device that offsets acoustics of the given environment based on the detected calibration sound, displaying an indication that the playback device is being calibrated for its particular position within the given environment; and sending an instruction that causes the playback device to play back media as adjusted by the determined calibration profile.

(Feature 19) The network device of Feature 18, wherein displaying an indication that the playback device is being calibrated comprises while the control device determines the calibration profile for the playback device, displaying a plurality of concentric ellipsoids that are contorted from a circular shape; and upon the control device determining the calibration profile, displaying the plurality of concentric ellipsoids in the circular shape.

(Feature 20) A method comprising: sending, by a control device, an instruction that causes a playback device to emit a periodic calibration sound for a pre-determined calibration interval; while the playback device is emitting the periodic calibration sound, detecting, via a microphone, the emitted calibration sound and displaying, on a graphical display, a progress bar that indicates a duration of time remaining in the calibration interval, wherein at least a portion of the progress bar pulses in synchrony with periods of the calibration sound; and while determining a calibration profile for the playback device that offsets acoustics of a given environment in which the playback device is located, displaying an indication that the playback device is being calibrated for a particular position within the given environment; and sending an instruction that causes the playback device to play back media as adjusted by the determined calibration profile.

We claim:

1. Tangible, non-transitory, computer-readable media having stored therein instructions executable by one or more processors to cause a control device to perform operations comprising:
    causing a graphical display to display a prompt to initiate a calibration sequence that involves calibration of a playback device for a given environment in which the playback device is located;
    causing the graphical display to display a sequence of one or more prompts to prepare the playback device for calibration within the given environment;
    causing the graphical display to display a sequence of one or more prompts to prepare the given environment for calibration of the playback device; and
    upon detecting selection of a selectable control, initiating calibration of the playback device, wherein initiating calibration of the playback device comprises:

causing the graphical display to display a plurality of concentric ellipsoids that alternate between circular and contorted ellipsoid shapes to indicate that the playback device is being calibrated; and causing the graphical display to display one or more concentric ellipsoids that are in a circular shape to indicate that the playback device has been calibrated.

2. The tangible, computer-readable media of claim 1, wherein causing the graphical display to display the prompt to initiate the calibration sequence of the playback device for the given environment in which the playback device is located comprises:

causing the graphical display to display one or more graphical elements indicating that the calibration sequence calibrates the playback device for a particular position within the given environment in which the playback device has been placed.

3. The tangible, computer-readable media of claim 1, wherein causing the graphical display to display the prompt to initiate calibration of the playback device for the given environment in which the playback device is located comprises:

causing the graphical display to display a selectable control that, when selected, displays one or more graphical elements indicating that the calibration sequence calibrates the playback device for a particular position within the given environment that the playback device has been placed.

4. The tangible, computer-readable media of claim 1, wherein causing the graphical display to display the sequence of one or more prompts to prepare the playback device for calibration within the given environment comprises causing the graphical display to display a prompt to position the playback device at a position within the given environment at which the playback device will be operated.

5. The tangible, computer-readable media of claim 1, wherein causing the graphical display to display the sequence of one or more prompts to prepare the given environment for calibration of the playback device comprises:

causing the graphical display to display, on a control interface, an indication that the control device is determining whether ambient noise within the given environment is less than a calibration threshold; and causing the graphical display to display a number of concentric circles, wherein the number of displayed concentric circles is proportional to a sound pressure level within the given environment.

6. The tangible, computer-readable media of claim 5, wherein the operations further comprise:

determining that the sound pressure level within the given environment is below a threshold level for calibration; and causing the graphical display to display an indication that sound pressure level within the given environment is within an acceptable range for calibration.

7. The tangible, computer-readable media of claim 1, wherein the operations further comprise:

displaying a video that depicts at least a portion of the calibration sequence;

determining that at least a threshold portion of the video has been played; and based on determining that the threshold portion of the video has been played, displaying a selectable control that, when selected, causes the graphical display to display a prompt to initiate calibration, wherein the prompt includes the selectable control that, when selected, initiates calibration of the playback device.

8. The tangible, computer-readable media of claim 1, wherein the operations further comprise:

causing the graphical display to display a prompt to play back a video that depicts at least a portion of the calibration sequence;

determining whether the video has been previously played back by the control device during a previous iteration of the calibration sequence;

when the video has not been previously played back by the control device during a previous iteration of the calibration sequence, causing the graphical display to display a prompt to initiate calibration after a threshold portion of the video has been played back, wherein the prompt includes the selectable control that, when selected, initiates calibration of the playback device; and when the video has been previously played back by the control device during a previous iteration of the calibration sequence, causing the graphical display to display the prompt to initiate calibration before the threshold portion of the video has been played back.

9. The tangible, computer-readable media of claim 1, wherein initiating calibration of the playback device further comprises:

sending an instruction that causes the playback device to emit a periodic calibration sound for a pre-determined calibration interval; and while the playback device is emitting the periodic calibration sound, causing the graphical display to display a progress bar that indicates a duration of time remaining in the pre-determined calibration interval, wherein at least a portion of the progress bar pulses in synchrony with periods of the periodic calibration sound.

10. The tangible, computer-readable media of claim 9, wherein causing the graphical display to display the progress bar that indicates the duration of time remaining in the pre-determined calibration interval comprises causing the graphical display to display a circular progress bar that pulses in synchrony with periods of the periodic calibration sound by displaying a circular graphical element that expands in radius from the circular progress bar during periods of the periodic calibration sound.

11. The tangible, computer-readable media of claim 9, wherein causing the graphical display to display the progress bar that indicates the duration of time remaining in the calibration interval comprises causing the graphical display to display a progress bar that includes a progress indicator that pulses in synchrony with periods of the periodic calibration sound and indicates the duration of time remaining in the pre-determined calibration interval.

12. The tangible, computer-readable media of claim 1, wherein initiating calibration of the playback device comprises:

sending an instruction that causes the playback device to emit a periodic calibration sound for a pre-determined calibration interval; and while the control device listens for the periodic calibration sound, causing the graphical display to display an indication that the control device is listening for the presence of the periodic calibration sound within the given environment.

13. The tangible, computer-readable media of claim 1, wherein the operations further comprise:

detecting at least a portion of a calibration sound emitted by the playback device; and while the control device analyzes the detected calibration sound, causing the graphical display to display the plurality of concentric ellipsoids that alternate between circular and contorted ellipsoid shapes.

14. The tangible, computer-readable media of claim 1, wherein the operations further comprise:
    determining a calibration profile that offsets acoustic characteristics of the given environment to calibrate the playback device to a calibration equalization.

15. The tangible, computer-readable media of claim 14, wherein the operations further comprise:
    determining that the determined calibration profile adjusts an equalization of the playback device by more than a threshold level; and
    based on determining that the determined calibration profile adjusts the equalization of the playback device by more than the threshold level, displaying one or more graphical elements indicating that the calibration of the playback device significantly adjusted equalization of the playback device.

16. The tangible, computer-readable media of claim 14, wherein the operations further comprise:
    determining that the determined calibration profile adjusts an equalization of the playback device by less than a threshold level; and
    based on determining that the determined calibration profile adjusts the equalization of the playback device by more than the threshold level, causing the graphical display to display one or more graphical elements indicating that the calibration of the playback device subtlety adjusted equalization of the playback device.

17. Tangible, non-transitory computer-readable media having stored therein instructions executable by one or more processors to cause a control device to perform operations comprising:
    sending an instruction that initiates a calibration sequence in which a playback device is calibrated for a given environment in which the playback device is located, wherein initiating the calibration sequence comprises sending an instruction that causes a playback device to emit a periodic calibration sound for a pre-determined calibration interval;
    while the playback device is emitting the periodic calibration sound, (i) detecting, via a microphone, the emitted calibration sound and (ii) causing a graphical display to display a progress bar that indicates a duration of time remaining in the pre-determined calibration interval, wherein at least a portion of the progress bar pulses in synchrony with periods of the periodic calibration sound;
    while determining a calibration profile for the playback device that offsets acoustics of the given environment based on the detected calibration sound, causing the graphical display to display an indication that the playback device is being calibrated for its particular position within the given environment, wherein causing the graphical display to display the indication that the playback device is being calibrated for the particular position within the given environment comprises causing the graphical display to display a plurality of concentric ellipsoids that alternate between circular and contorted ellipsoid shapes to indicate that the playback device is being calibrated; and
    sending an instruction that causes the playback device to play media as adjusted by the determined calibration profile.

18. The tangible, non-transitory computer-readable media of claim 17, wherein causing the graphical display to display the indication that the playback device is being calibrated comprises:
    upon the control device determining the calibration profile, causing the graphical display to display the plurality of concentric ellipsoids in a circular shape.

19. A method comprising:
    sending, by a control device, an instruction that causes a playback device to emit a periodic calibration sound for a pre-determined calibration interval;
    while the playback device is emitting the periodic calibration sound, detecting, via a microphone, the emitted calibration sound and causing a graphical display to display a progress bar that indicates a duration of time remaining in the pre-determined calibration interval, wherein at least a portion of the progress bar pulses in synchrony with periods of the periodic calibration sound; and
    while determining a calibration profile for the playback device that offsets acoustics of a given environment in which the playback device is located, causing the graphical display to display an indication that the playback device is being calibrated for a particular position within the given environment, wherein causing the graphical display to display the indication that the playback device is being calibrated for the particular position within the given environment comprises causing the graphical display to display a plurality of concentric ellipsoids that alternate between circular and contorted ellipsoid shapes to indicate that the playback device is being calibrated; and
    sending an instruction that causes the playback device to play back media as adjusted by the determined calibration profile.

20. The tangible, non-transitory computer-readable media of claim 17, wherein displaying the indication that the playback device is being calibrated comprises:
    upon the control device determining the calibration profile, causing the graphical display to display the plurality of concentric ellipsoids in a circular shape.

* * * * *